(12) United States Patent
Maeda et al.

(10) Patent No.: US 8,102,895 B2
(45) Date of Patent: Jan. 24, 2012

(54) RADIO TRANSMISSION APPARATUS, RADIO RECEPTION APPARATUS, TRANSCEIVER, AND RADIO COMMUNICATION METHOD

(75) Inventors: Tatsuo Maeda, Kanagawa (JP); Sachio Iida, Chiba (JP)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 12/166,025

(22) Filed: Jul. 1, 2008

(65) Prior Publication Data
US 2008/0273576 A1 Nov. 6, 2008

(30) Foreign Application Priority Data
Jul. 2, 2007 (JP) .................... 2007-174034

(51) Int. Cl.
*H04B 1/00* (2006.01)
(52) U.S. Cl. .................... 375/135; 375/136
(58) Field of Classification Search .............. 375/132, 375/134, 135, 136; 455/63.3, 118, 260, 255, 455/552.1
See application file for complete search history.

(56) References Cited

U.S. PATENT DOCUMENTS
7,373,113 B2 * 5/2008 Lee et al. .................... 455/552.1
7,894,503 B2 * 2/2011 Azenkot et al. ................ 375/132
2009/0304044 A1 * 12/2009 Van De Beek et al. ....... 375/132

FOREIGN PATENT DOCUMENTS
JP 2005-129993 5/2005
JP 2006-121546 5/2006

* cited by examiner

*Primary Examiner* — Chieh M Fan
*Assistant Examiner* — Janice Tieu
(74) *Attorney, Agent, or Firm* — Finnegan, Henderson, Farabow, Garrett & Dunner, L.L.P.

(57) ABSTRACT

A radio transmission apparatus that uses a plurality of band groups and that transmits a signal subjected to frequency hopping between a plurality of bands in each band group at a local frequency apart from the center frequency of each band includes a local frequency generating unit that generates a local frequency lower than the center frequency of each band in a first band group in the transmission with the first band group. The local frequency generating unit generates a local frequency higher than the center frequency of each band in a second band group in the transmission with the second band group, the local frequency to be generated being the same as the local frequency generated in the transmission with the first band group.

17 Claims, 41 Drawing Sheets

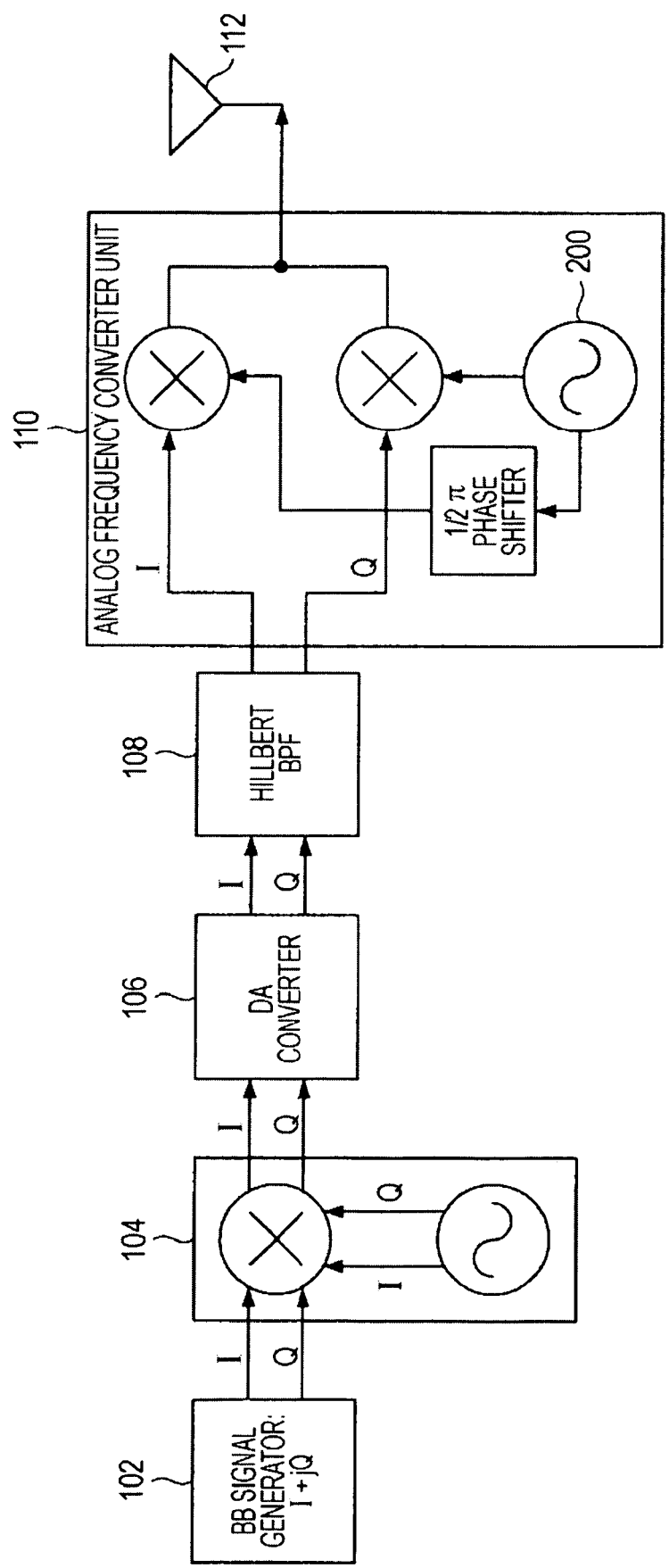

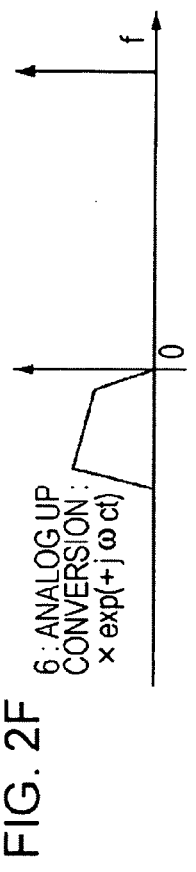
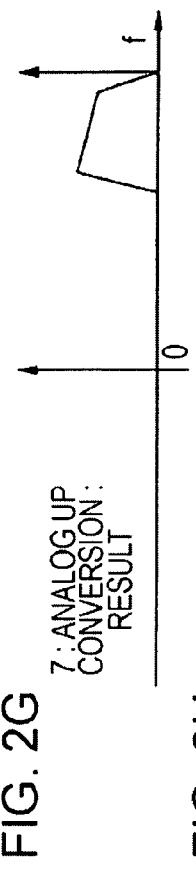
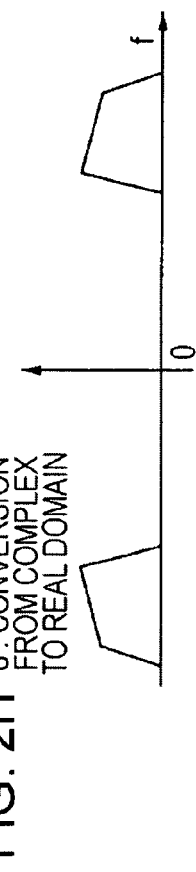
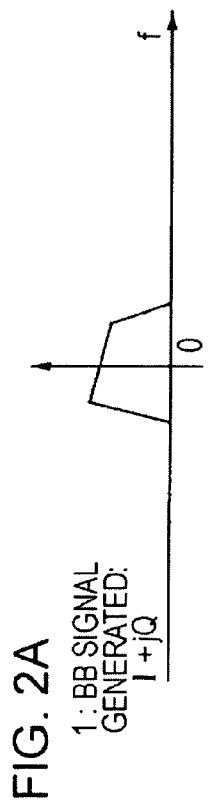
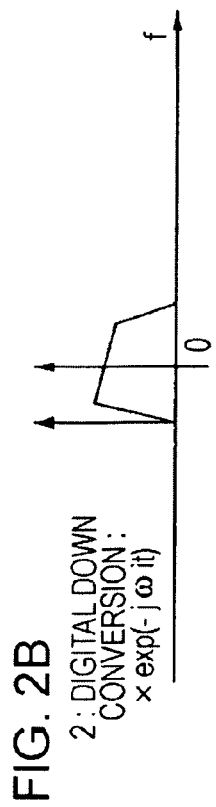
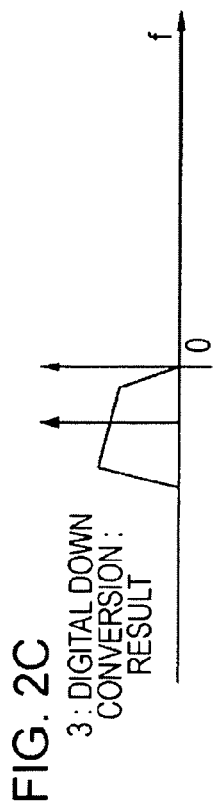
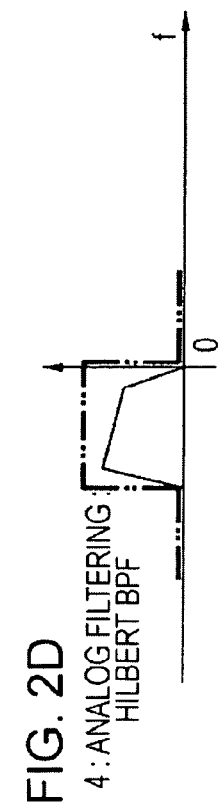
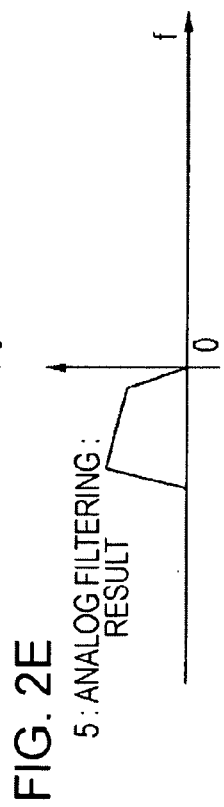
FIG. 2A 1: BB SIGNAL GENERATED: I+jQ
FIG. 2B 2: DIGITAL DOWN CONVERSION: ×exp(−jωit)
FIG. 2C 3: DIGITAL DOWN CONVERSION RESULT
FIG. 2D 4: ANALOG FILTERING: HILBERT BPF
FIG. 2E 5: ANALOG FILTERING RESULT
FIG. 2F 6: ANALOG UP CONVERSION: ×exp(+jωct)
FIG. 2G 7: ANALOG UP CONVERSION RESULT
FIG. 2H 8: CONVERSION FROM COMPLEX TO REAL DOMAIN

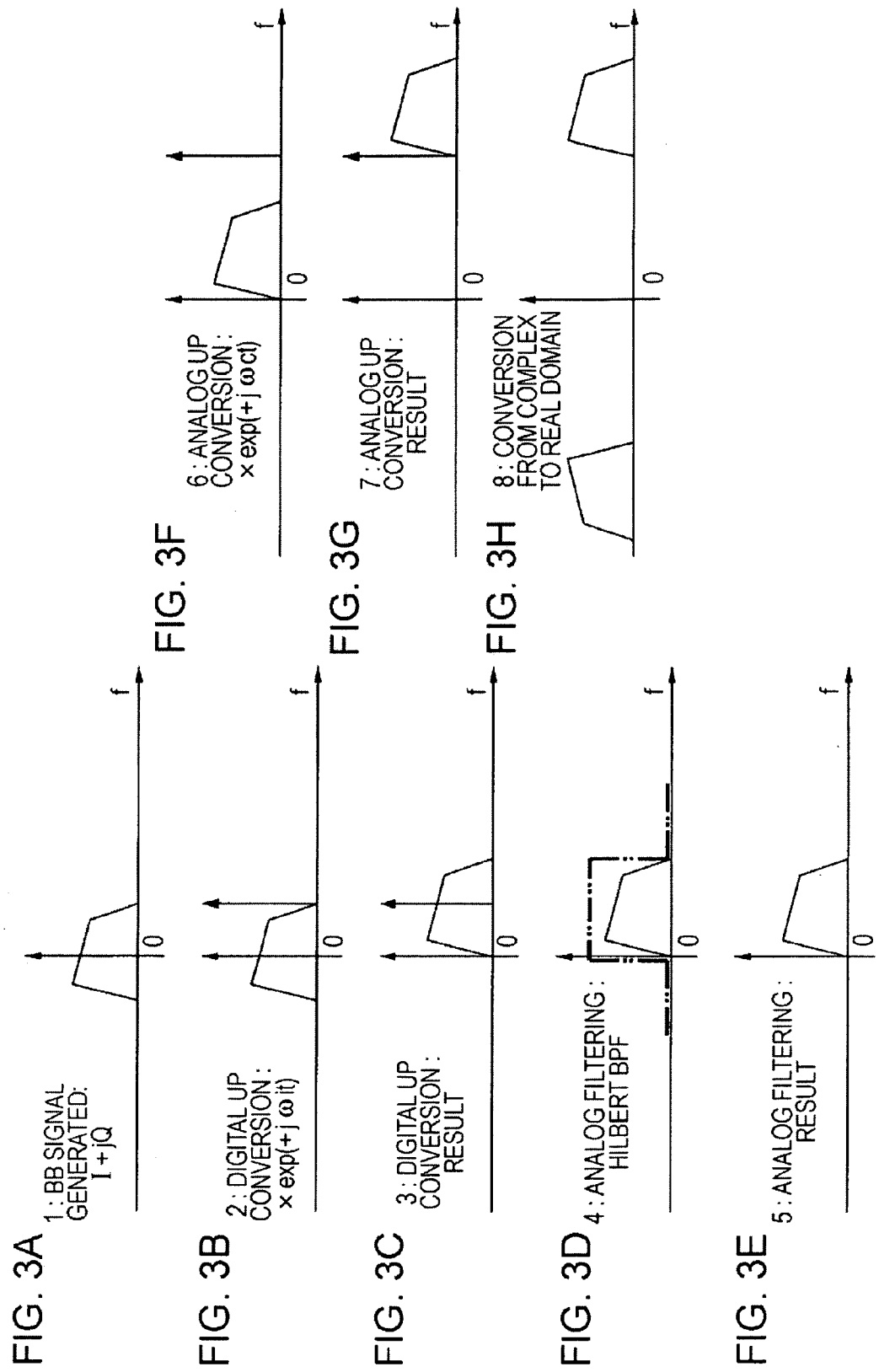

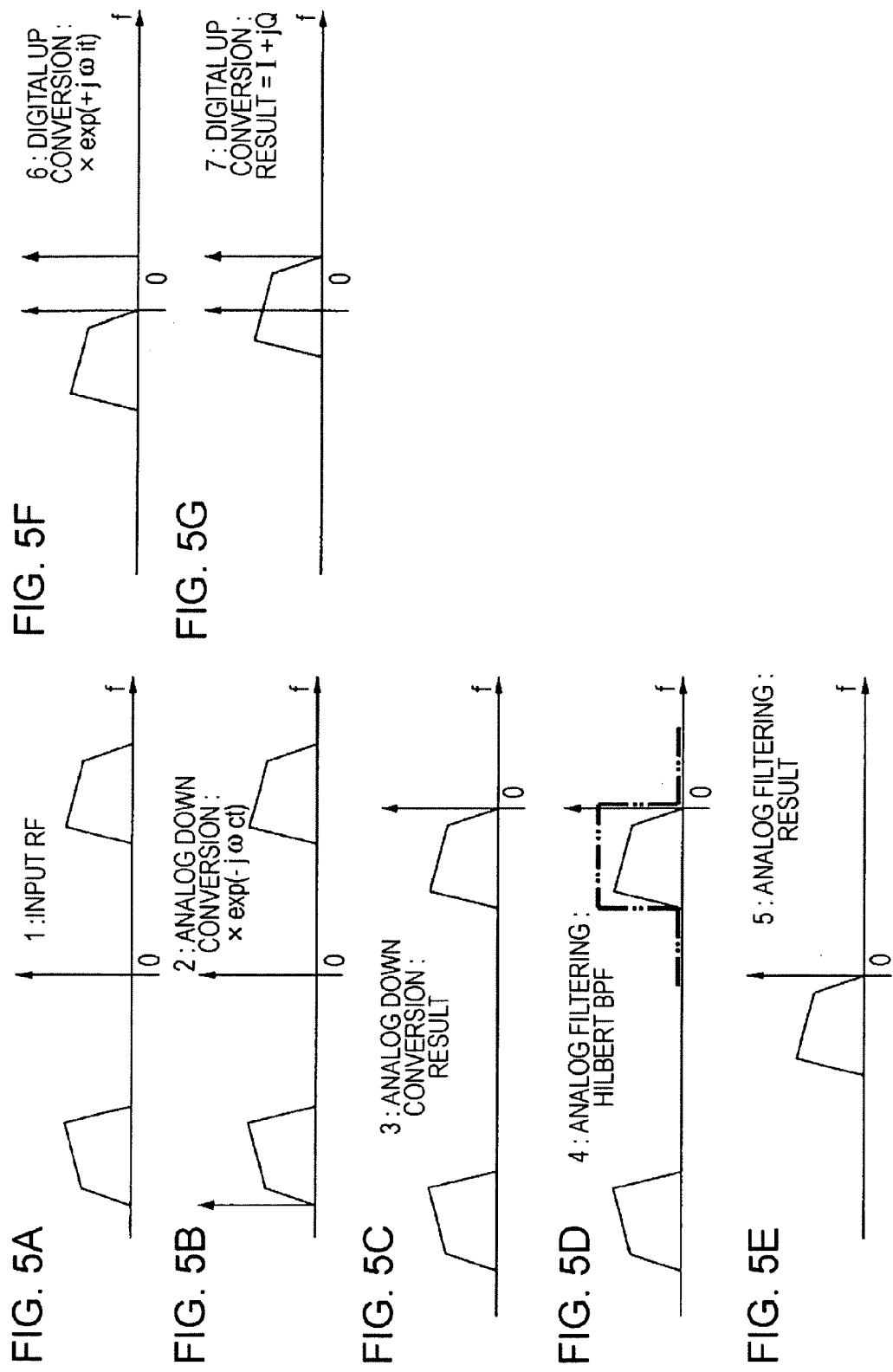

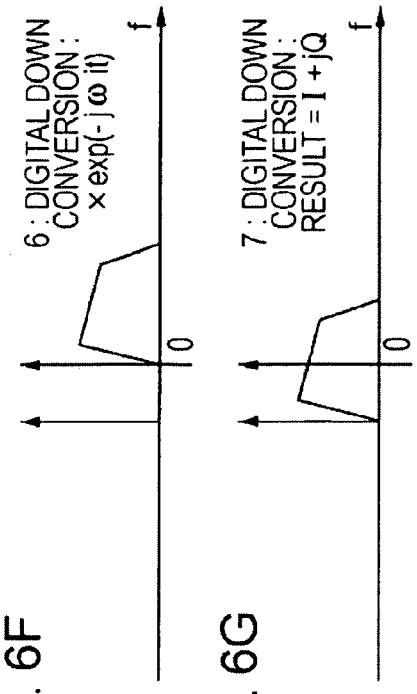
FIG. 6A 1: INPUT RF
FIG. 6B 2: ANALOG DOWN CONVERSION: ×exp(-jω ct)
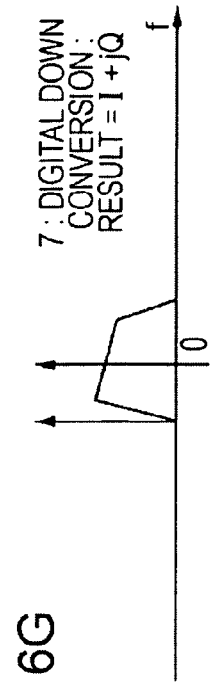
FIG. 6C 3: ANALOG DOWN CONVERSION RESULT
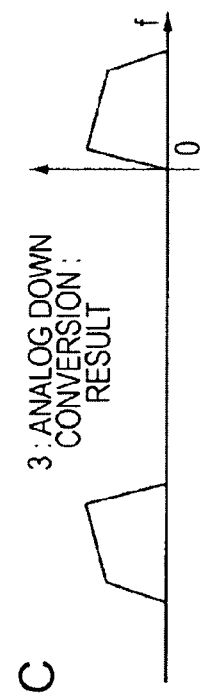
FIG. 6D 4: ANALOG FILTERING: HILBERT BPF
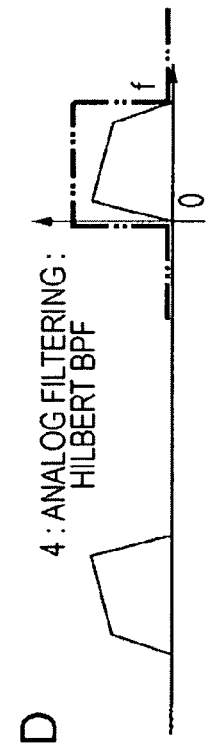
FIG. 6E 5: ANALOG FILTERING: RESULT
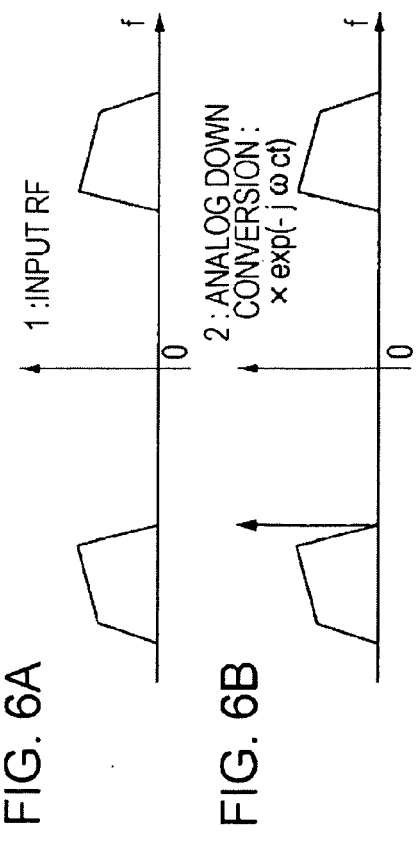
FIG. 6F 6: DIGITAL DOWN CONVERSION: ×exp(-jω it)
FIG. 6G 7: DIGITAL DOWN CONVERSION RESULT = I+jQ
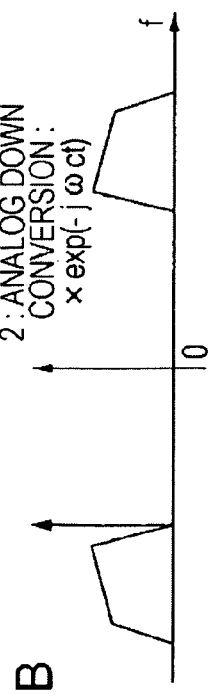
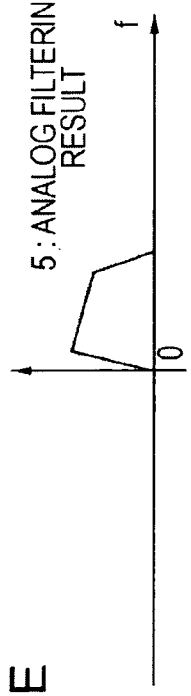

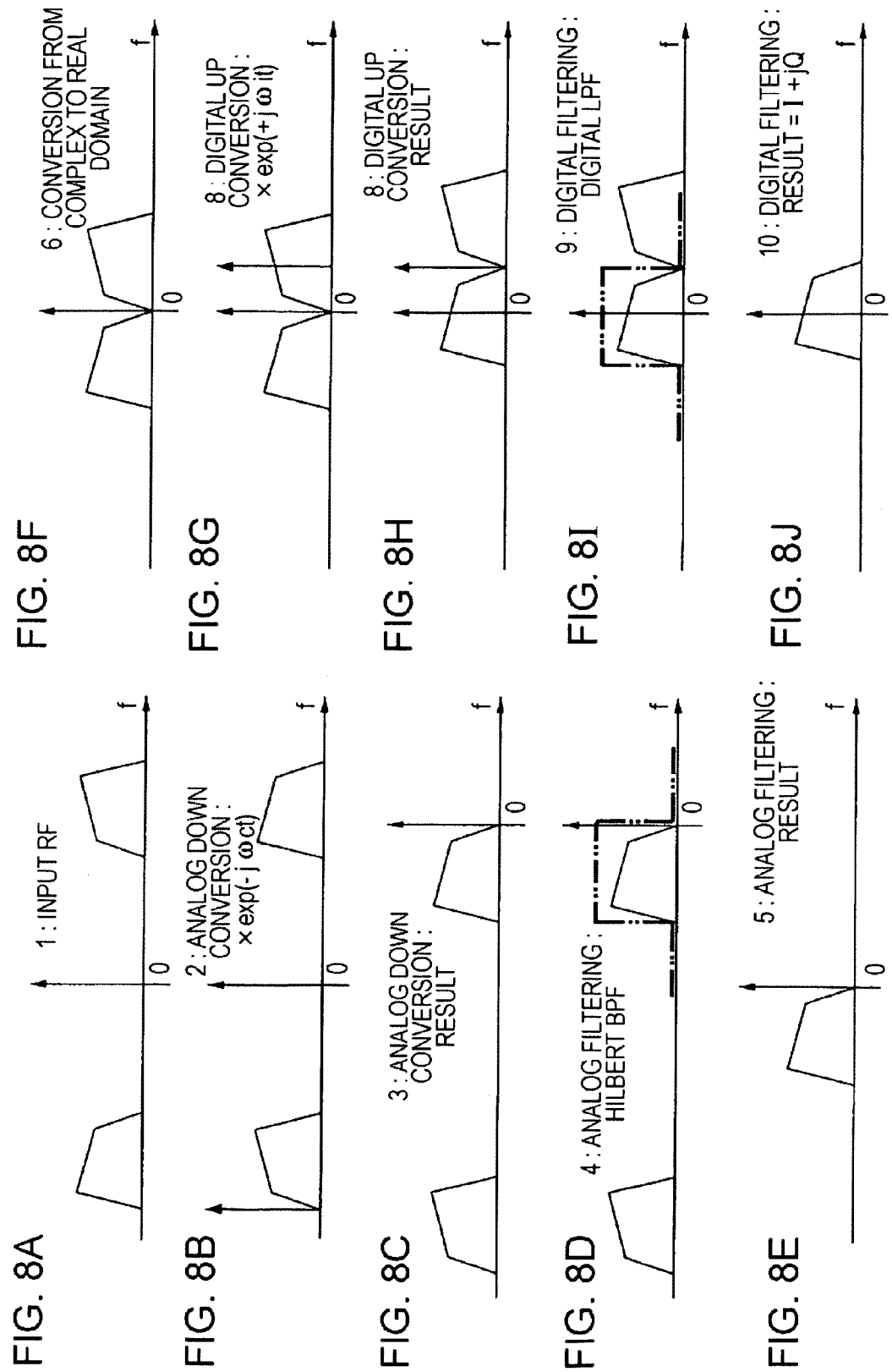

FIG. 10

| BAND GROUP | BAND ID | LOWER FREQUENCY [MHz] | CENTER FREQUENCY [MHz] | UPPER FREQUENCY [MHz] | ZERO IF SYSTEM LOCAL FREQUENCY [MHz] | LOW IF SYSTEM LOWER LOCAL FREQUENCY [MHz] | LOW IF SYSTEM UPPER LOCAL FREQUENCY [MHz] | LOW IF SYSTEM (PRESENT EMBODIMENT) LOCAL FREQUENCY [MHz] |
|---|---|---|---|---|---|---|---|---|
| 3 | 7 | 6336 | 6600 | 6864 | 6600 | 6336 | 6864 | 6864 |
|   | 8 | 6864 | 7128 | 7392 | 7128 | 6864 | 7392 | 7392 |
|   | 9 | 7392 | 7656 | 7920 | 7656 | 7392 | 7920 | 7920 |
| 4 | 10 | 7920 | 8184 | 8448 | 8184 | 7920 | 8448 | 7920 |
|   | 11 | 8448 | 8712 | 8976 | 8712 | 8448 | 8976 | 8448 |
|   | 12 | 8976 | 9240 | 9504 | 9240 | 8976 | 9504 | 8976 |
| 6 | 9 | 7392 | 7656 | 7920 | 7656 | 7392 | 7920 | 7920 |
|   | 10 | 7920 | 8184 | 8448 | 8184 | 7920 | 8448 | 8448 |
|   | 11 | 8448 | 8712 | 8976 | 8712 | 8448 | 8976 | 8976 |

FIG. 15

| | | | | | | | |
|---|---|---|---|---|---|---|---|
| THREE-COMPONENT SYNTHESIS | PHASE | — | — | −45 | 0 | +45 | — | — |
| | RATIO | — | — | 5 | 7 | 5 | — | — |
| FIVE-COMPONENT SYNTHESIS | PHASE | — | −60 | −30 | 0 | +30 | +60 | — |
| | RATIO | — | 7 | 12 | 14 | 12 | 7 | — |
| SEVEN-COMPONENT SYNTHESIS | PHASE | −67.5 | −45 | −22.5 | 0 | +22.5 | +45 | +67.5 |
| | RATIO | 5 | 9 | 12 | 13 | 12 | 9 | 5 |

FIG. 18

| HARMONICS [ORDER] | 3rd | 5th | 7th | 9th | 11th | 13th | 15th | 17th | 19th |
|---|---|---|---|---|---|---|---|---|---|
| FREQ. [GHz] | 1.5 | 2.5 | 3.5 | 4.5 | 5.5 | 6.5 | 7.5 | 8.5 | 9.5 |
| INPUT [dB] | -9.8 | -14.9 | -18.7 | -22.2 | -25.7 | -29.4 | -33.9 | -40.0 | -51.1 |
| 3 PHASE [dB] | -55.8 | -60.8 | -18.7 | -22.2 | -71.6 | -75.4 | -33.9 | -40.0 | -90.0 |
| 5 PHASE [dB] | -90.0 | -60.6 | -64.4 | -90.0 | -25.7 | -29.4 | -90.0 | -85.4 | -90.0 |
| 7 PHASE [dB] | -57.4 | -58.6 | -64.3 | -67.8 | -69.7 | -77.0 | -33.9 | -40.0 | -90.0 |

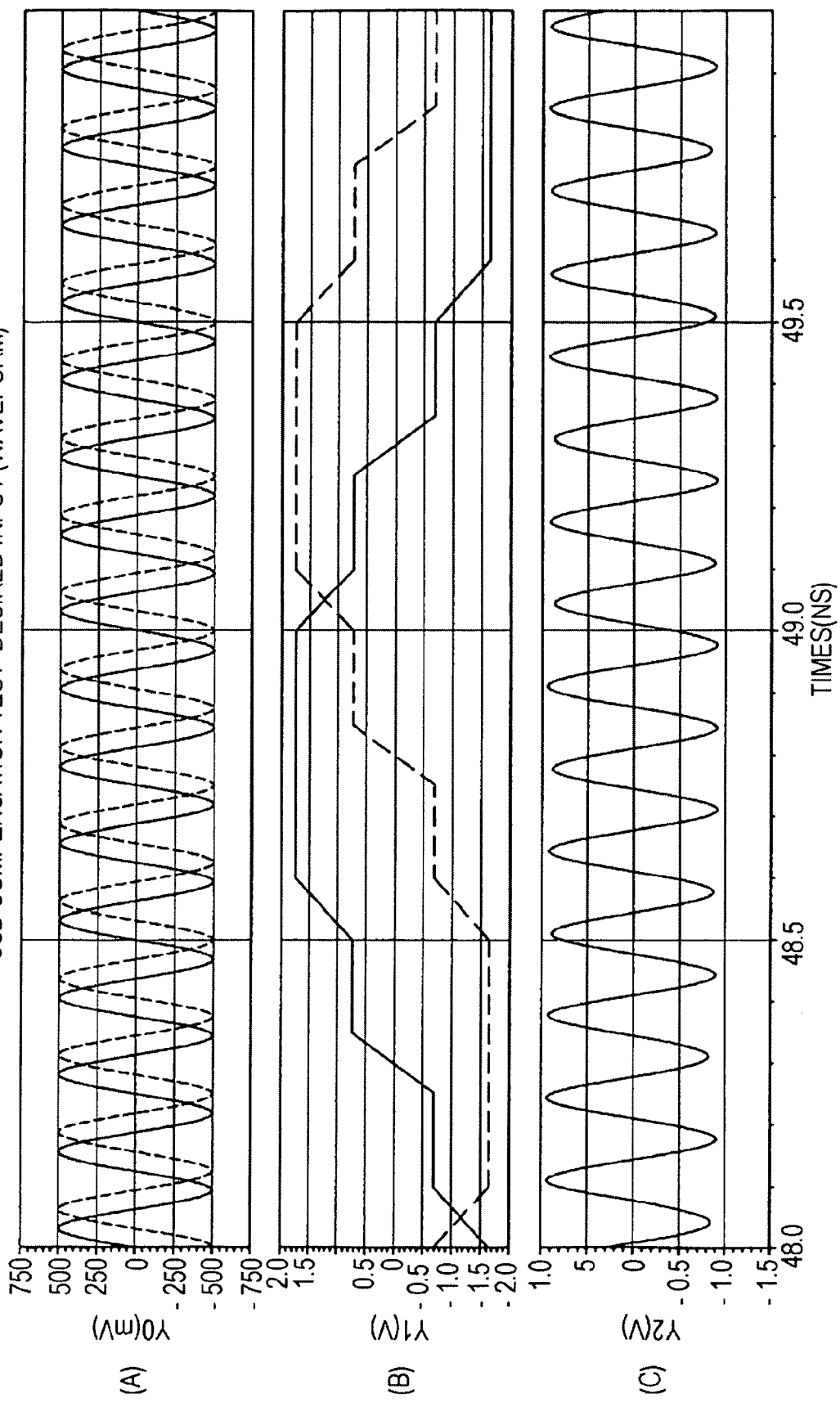

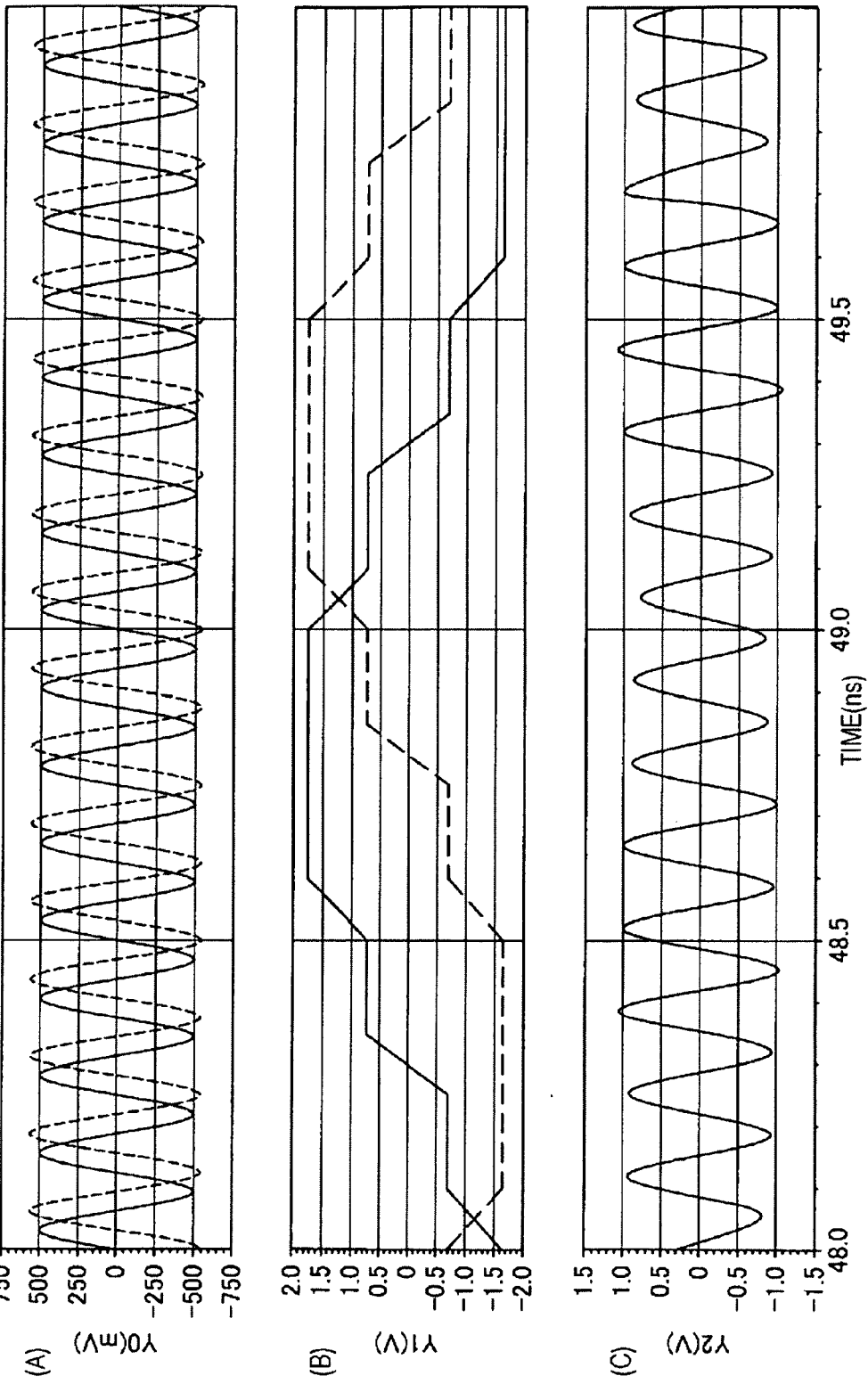

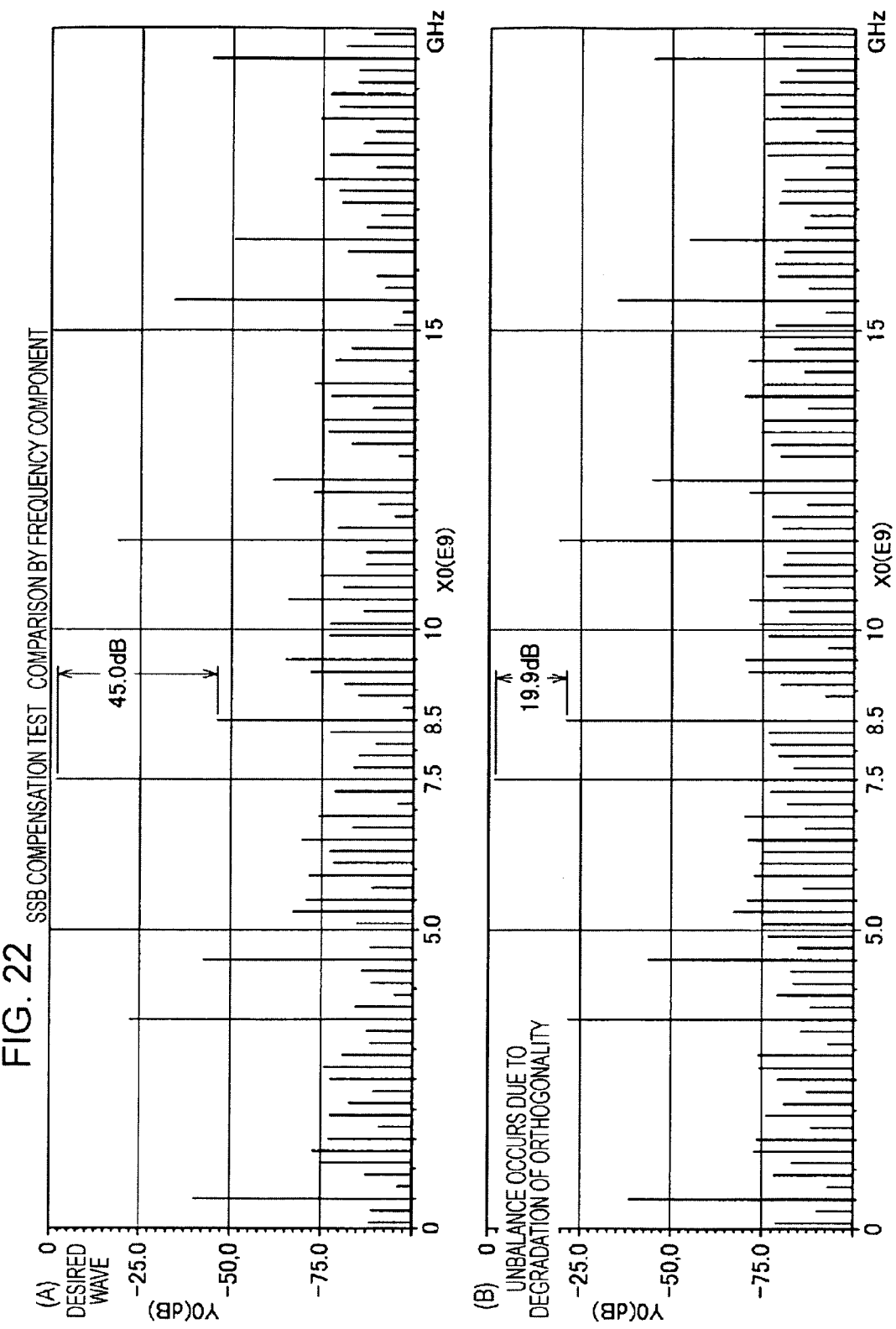

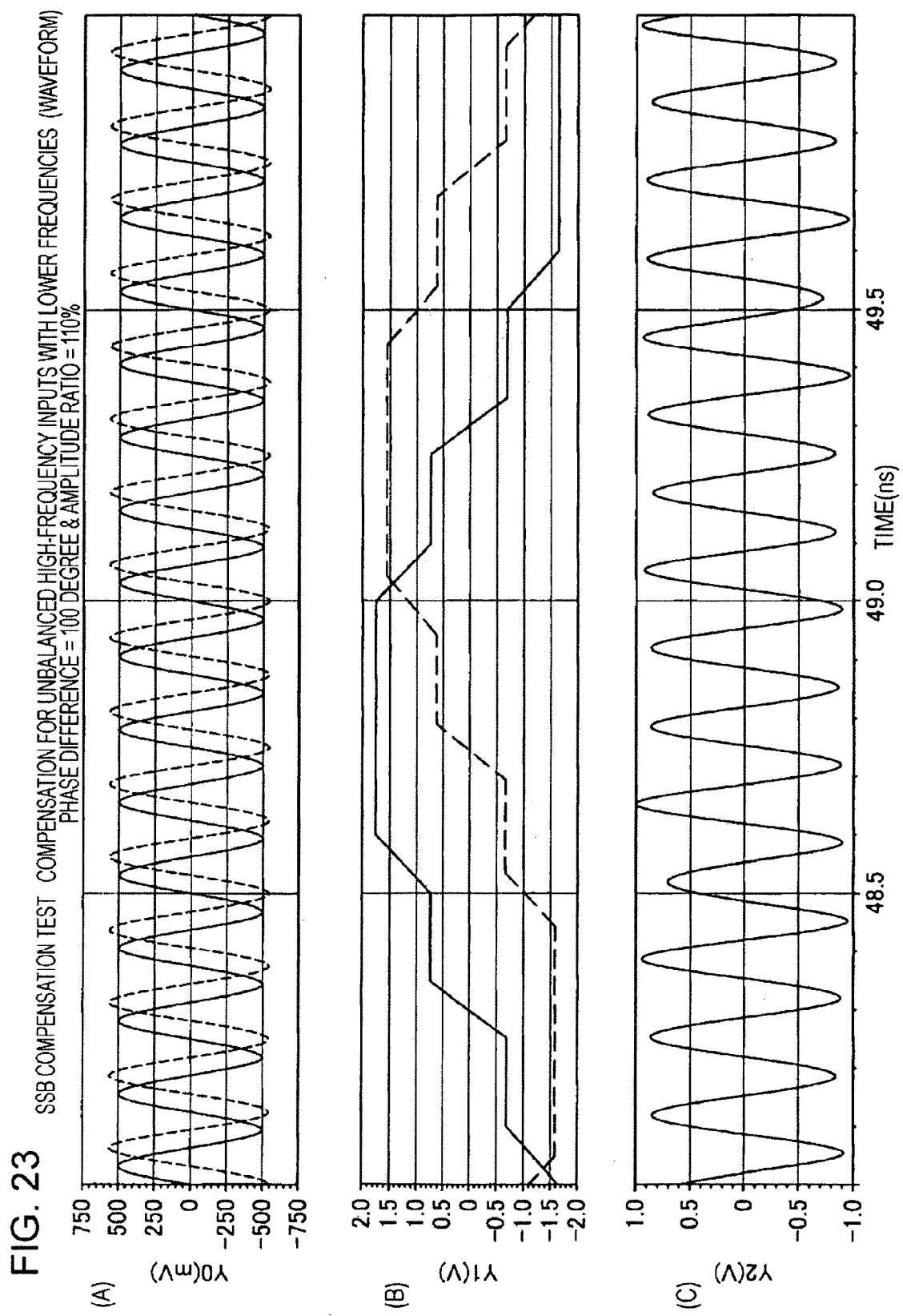

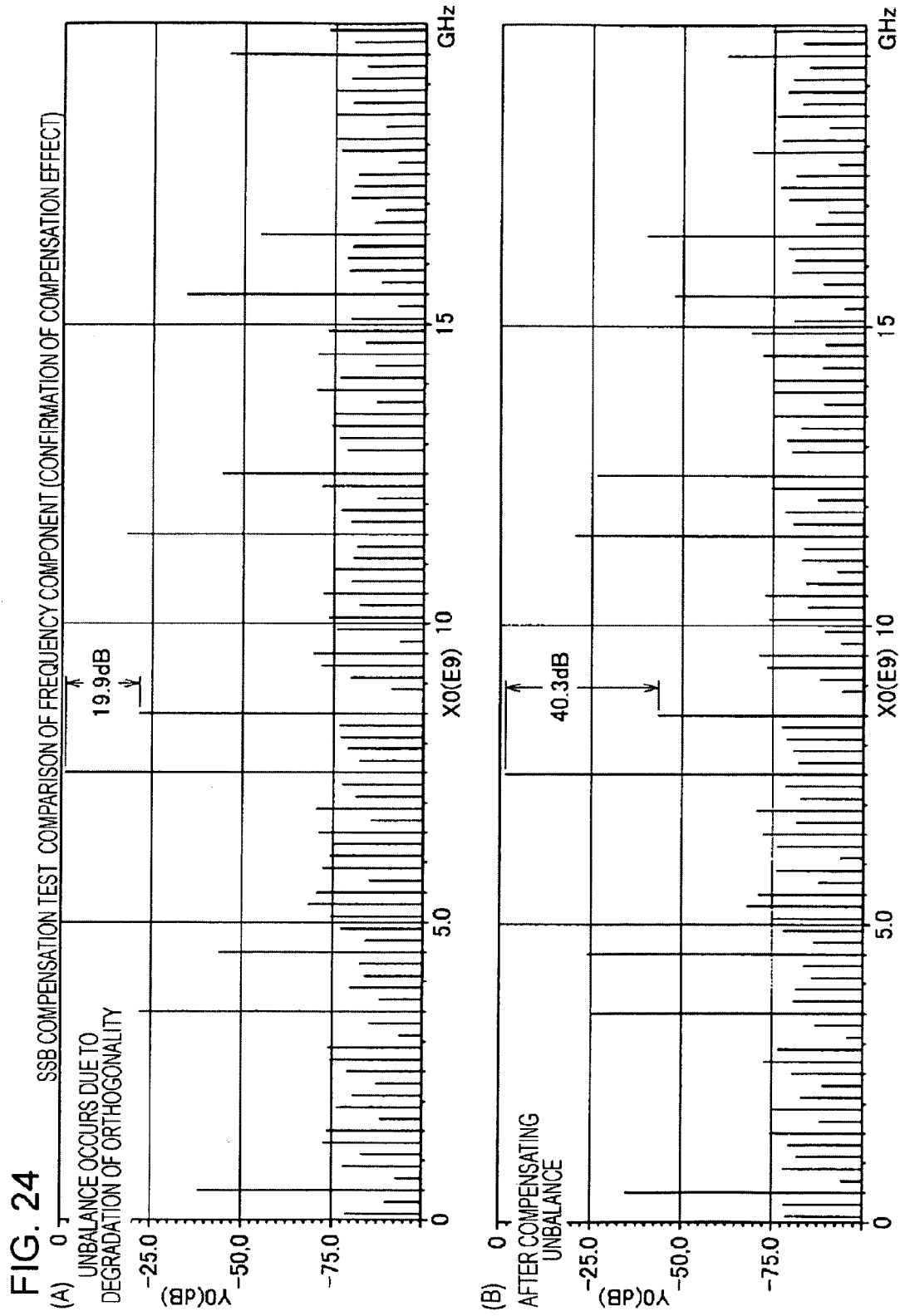

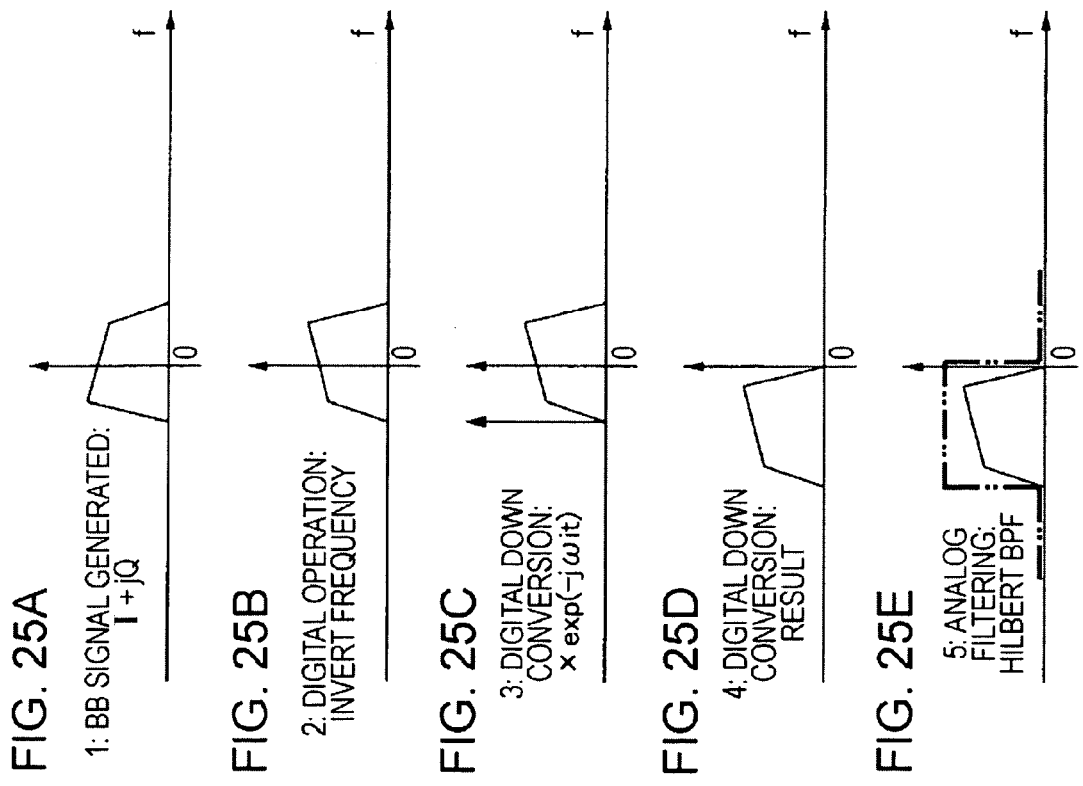

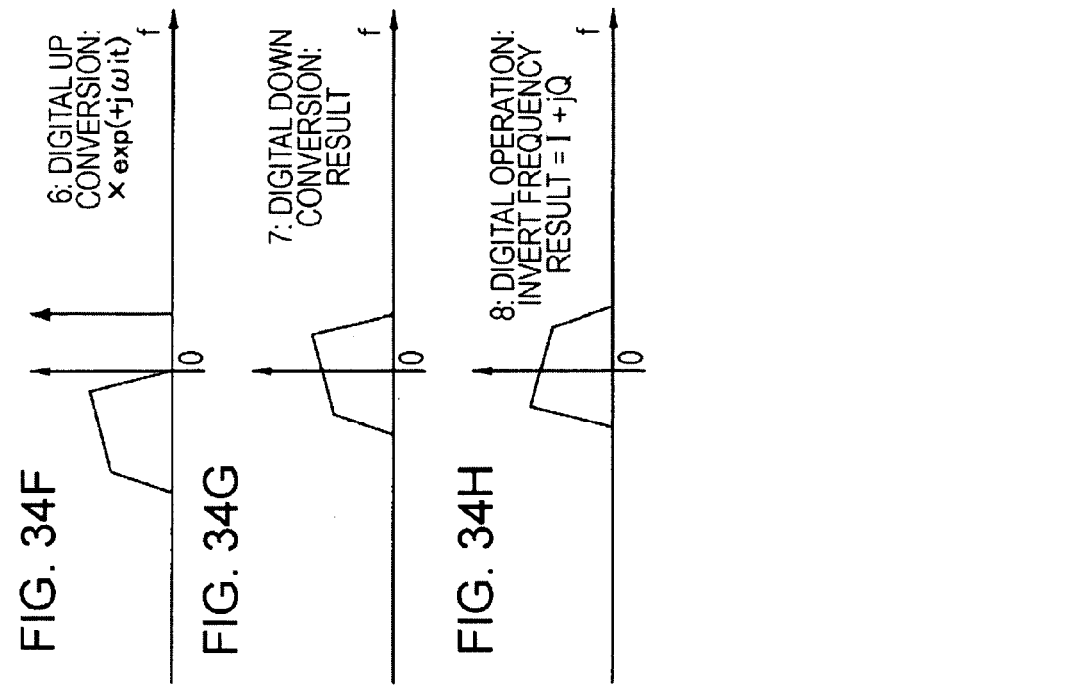
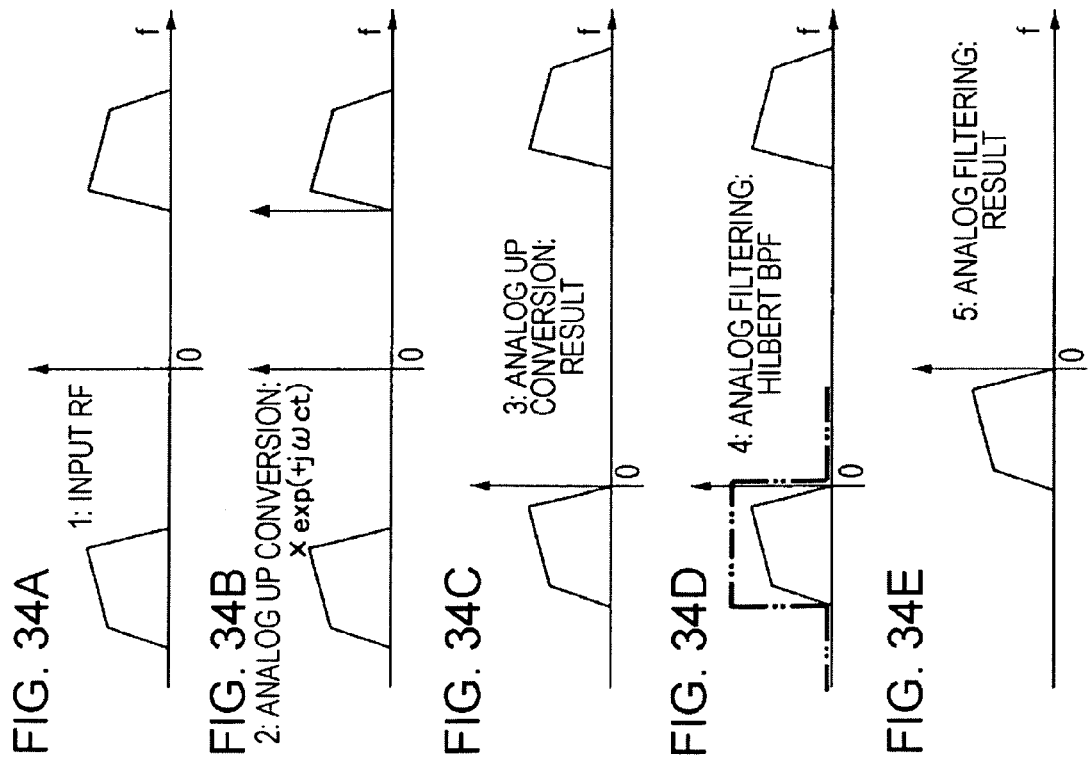

1: INPUT RF

2: ANALOG UP CONVERSION:
× exp(+jωct)

3: ANALOG UP CONVERSION: RESULT

4: ANALOG FILTERING: HILBERT BPF

5: ANALOG FILTERING: RESULT

6: CONVERSION FROM COMPLEX TO REAL DOMAIN

7: DIGITAL DOWN CONVERSION:
× exp(-jωit)

8: DIGITAL DOWN CONVERSION: RESULT

9: DIGITAL FILTERING: DIGITAL LPF

10: DIGITAL FILTERING: RESULT = I + jQ

RADIO TRANSMISSION APPARATUS, RADIO RECEPTION APPARATUS, TRANSCEIVER, AND RADIO COMMUNICATION METHOD

CROSS REFERENCES TO RELATED APPLICATIONS

The present invention contains subject matter related to Japanese Patent Application JP 2007-174034 filed in the Japanese Patent Office on Jul. 2, 2007, the entire contents of which are incorporated herein by reference.

BACKGROUND OF THE INVENTION

1. Field of the Invention

The present invention relates to a radio transmission apparatus, a radio reception apparatus, a transceiver, and a radio communication method.

2. Description of the Related Art

Methods for radio communication in a very wide frequency band called Ultra Wideband (UWB) has been developed in radio communication fields in recent years. Although development of a 4-GHz band called Low Band in the UWB has been emphasized in related art, it is necessary to shift the development field from the Low Band to High Band (6 GHz to 10 GHz) in order to support the coexistence with various communication methods.

In such a situation, multiband orthogonal frequency division multiplexing (OFDM) developed by an industry organization called WiMedia has become mainstream. In the multiband OFDM by the WiMedia, the UWB bandwidth is divided into frequency units of about 1.5 GHz. Each frequency unit is called a band group (BG).

FIG. 41 illustrates band groups defined by the WiMedia. Of the band groups in FIG. 41, a band group #1 is allocated to the low band and band groups #3, #4, #5, and #6 are allocated to the high band. Of the band groups in the high band, the band group #5 is assumed to be used for special applications because the band group #5 has higher frequencies and the bandwidth of only 1 GHz is allocated to the band group #5. Accordingly, the challenge is to design radio apparatuses supporting the band groups #3, #4, and #6 as general high band products.

As illustrated in FIG. 41, each of the band groups #3, #°, and #6 in the high band is further divided into three bands each having a bandwidth of 528 GHz. High-speed hopping among the three bands is defined in the WiMedia specifications.

It is noted that the hopping causes various problems in analog circuit design of the radio apparatuses. Specifically, the problems concern direct current (DC) offset by the hopping and phase continuity of oscillators. For example, Japanese Unexamined Patent Application Publication No. 2005-129993 discloses a method of resolving problems of direct-conversion transmitter-receivers by producing the multiband OFDM UWB transmitter-receivers in Low Intermediate Frequency (Low IF) configurations. Japanese Unexamined Patent Application Publication No. 2006-121546 discloses a method of acquiring the center frequency of each band in frequency synthesis apparatuses for the hopping without any error in phase or amplitude.

SUMMARY OF THE INVENTION

However, in the case of high-band radio apparatuses used in the higher frequencies, it is necessary to provide for the hopping to each band in the three band groups #3, #4, and #6 in the high band. Consequently, it is supposed that the configuration of multiband generators (MBGs) generating the hopping frequencies becomes very complicated in the high-band radio apparatuses, compared with low-band radio apparatuses each having one band group.

It is desirable to provide new and improved radio transmission apparatus, radio reception apparatus, transceiver, and radio communication method, which are capable of providing for the hopping in multiple band groups and capable of generating multiple local frequencies with a simple configuration.

According to an embodiment of the present invention, a radio transmission apparatus that uses a plurality of band groups and that transmits a signal subjected to frequency hopping between a plurality of bands in each band group at a local frequency apart from the center frequency of each band includes a local frequency generating unit that generates a local frequency lower than the center frequency of each band in a first band group in the transmission with the first band group. The local frequency generating unit generates a local frequency that is higher than the center frequency of each band in a second band group in the transmission with the second band group, the local frequency to be generated being the same as the local frequency generated in the transmission with the first band group.

With the above configuration, a signal subjected to frequency hopping between a plurality of bands in each band group is transmitted at a local frequency apart from the center frequency of each band. A local frequency lower than the center frequency of each band in a first band group is generated in the transmission with the first band group. A local frequency that is higher than the center frequency of each band in a second band group and that is the same as the local frequency generated in the transmission with the first band group is generated in the transmission with the second band group. Accordingly, it is possible to support the frequency hopping between the multiple band groups and to minimize the number of the necessary local frequencies, thus simplifying the configuration of the radio transmission apparatus.

The center frequency of one band in the first band group may be the same as the center frequency of one band in a third band group whose bandwidth is adjacent to that of the first band group. The local frequency generating unit may include a frequency synthesizer that receives a first frequency at a first input and receives a second frequency corresponding to the distance between adjacent two bands or a third frequency corresponding to the distance between the bands at both ends among adjacent three bands at a second input. The first frequency corresponds to the frequency that is the same as the local frequency generated in the transmission with the first band group and is the local frequency apart from the center frequency of each band. With this configuration, in a system in which the center frequencies of the bands is equally spaced, the first frequency can be synthesized with the second and third frequencies to generate necessary local frequencies for the first band group and the third band group.

The frequency synthesizer may receive the first frequency at the first input as a fixed value. With this configuration, when the first frequency is input in the frequency synthesizer as a higher frequency, it is possible to simplify the configuration of an oscillator generating the first frequency.

The first frequency may be 7,920 MHz, the second frequency may be 528 MHz, and the third frequency may be 1,056 MHz. With this configuration, when the communication is performed with the band groups #3, #4, and #6 in the high band defied by the WiMedia, it is possible to minimize the number of the necessary local frequencies.

The local frequency generating unit may include a first frequency generator generating the second frequency by digital waveform synthesis and a second frequency generator generating the third frequency by the digital waveform synthesis. With this configuration, it is possible to generate the second and third frequencies by the digital waveform synthesis.

The first frequency generator may be a first digital sine generator generating the second frequency by five-component synthesis and the second frequency generator may be a second digital sine generator generating the third frequency by three-component synthesis. With this configuration, since the digital sine generators generate the second frequency by the five-component synthesis and generate the third frequency by the three-component synthesis, it is possible to prevent any interference wave closer to a desired wave from being included in the output from the frequency synthesizer.

The first digital sine generator may include a phase controller controlling the phase of the second frequency and an amplitude controller controlling the amplitude of the second frequency, and the second digital sine generator may include a phase controller controlling the phase of the third frequency and an amplitude controller controlling the amplitude of the third frequency. With this configuration, the phases and the amplitudes of the second frequency and third frequency can be separately adjusted by the phase controllers and the amplitude controllers in the digital sine generators. Accordingly, even if the orthogonality of the first frequency input in the frequency synthesizer is degraded, the phases and amplitudes of the second and third frequencies can be separately adjusted to improve the accuracy of the output from the frequency synthesizer.

The radio transmission apparatus may further include a baseband signal generator generating a baseband signal, which is a digital signal; a digital frequency converter performing digital frequency conversion to the baseband signal; a digital-to-analog converter converting an output from the digital frequency converter into an analog signal; a filter filtering an output from the digital-to-analog converter; and an analog frequency converter performing analog frequency conversion to an output from the filter at the local frequency generated by the local frequency generating unit. In the transmission with the first band group, the digital frequency conversion may be performed after the arrangement of the baseband signals is reversed. The local frequency of the same sign may be used for the digital frequency conversion both in the transmission with the first band group and in the transmission with the second band group and the sign of the local frequency for the analog frequency conversion in the transmission with the first band group may be inverted in the transmission with the second band group to use the filter of the same characteristics both in the transmission with the first band group and in the transmission with the second band group. With this configuration, since the filter of the same characteristics can be used both when the first band group is used and when the second band group is used, it is possible to greatly simplify the configuration of the filter.

A switching part for inverting an input signal may be provided at least one input of the analog frequency converter in order to invert the sign of the local frequency for the analog frequency conversion. With this configuration, the sign of the local frequency can be easily inverted.

According to another embodiment of the present invention, a radio reception apparatus that receives a signal subjected to frequency hopping between a plurality of bands in each band group at a local frequency apart from the center frequency of each band includes a local frequency generating unit that generates a local frequency lower than the center frequency of each band in a first band group in the reception with the first band group. The local frequency generating unit generates a local frequency higher than the center frequency of each band in a second band group in the reception with the second band group, the local frequency to be generated being the same as the local frequency generated in the reception with the first band group.

With the above configuration, a signal subjected to frequency hopping between a plurality of bands in each band group is received at a local frequency apart from the center frequency of each band. A local frequency lower than the center frequency of each band in a first band group is generated in the transmission with the first band group. A local frequency that is higher than the center frequency of each band in a second band group and that is the same as the local frequency generated in the transmission with the first band group is generated in the transmission with the second band group. Accordingly, it is possible to support the frequency hopping between the multiple band groups and to minimize the number of the necessary local frequencies, thus simplifying the configuration of the radio reception apparatus.

The center frequency of one band in the first band group may be the same as the center frequency of one band in a third band group whose bandwidth is adjacent to that of the first band group. The local frequency generating unit may include a frequency synthesizer that receives a first frequency at a first input and receives a second frequency corresponding to the distance between adjacent two bands or a third frequency corresponding to the distance between the bands at both ends among adjacent three bands at a second input. The first frequency corresponds to the frequency that is the same as the local frequency generated in the reception with the first band group and is the local frequency apart from the center frequency of each band. With this configuration, in a system in which the center frequencies of the bands is equally spaced, the first frequency can be synthesized with the second and third frequencies to generate necessary local frequencies for the first band group and the third band group.

The frequency synthesizer may receive the first frequency at the first input as a fixed value. With this configuration, when the first frequency is input in the frequency synthesizer as a higher frequency, it is possible to simplify the configuration of an oscillator generating the first frequency.

The first frequency may be 7,920 MHz, the second frequency may be 528 MHz, and the third frequency may be 1,056 MHz. With this configuration, when the communication is performed with the band groups #3, #4, and #6 in the high band defied by the WiMedia, it is possible to minimize the number of the necessary local frequencies.

The local frequency generating unit may include a first frequency generator generating the second frequency by digital waveform synthesis and a second frequency generator generating the third frequency by the digital waveform synthesis. With this configuration, it is possible to generate the second and third frequencies by the digital waveform synthesis.

The first frequency generator may be a first digital sine generator generating the second frequency by five-component synthesis and the second frequency generator may be a second digital sine generator generating the third frequency by three-component synthesis. With this configuration, since the digital sine generators generate the second frequency by the five-component synthesis and generate the third frequency by the three-component synthesis, it is possible to prevent any interference wave closer to a desired wave from being included in the output from the frequency synthesizer.

The first digital sine generator may include a phase controller controlling the phase of the second frequency and an amplitude controller controlling the amplitude of the second frequency, and the second digital sine generator may include a phase controller controlling the phase of the third frequency and an amplitude controller controlling the amplitude of the third frequency. With this configuration, the phases and the amplitudes of the second frequency and third frequency can be separately adjusted by the phase controllers and the amplitude controllers in the digital sine generators. Accordingly, even if the orthogonality of the first frequency input in the frequency synthesizer is degraded, the phases and amplitudes of the second and third frequencies can be separately adjusted to improve the accuracy of the output from the frequency synthesizer.

The radio reception apparatus may further include an analog frequency converter performing analog frequency conversion to an input radio-frequency signal at the local frequency generated by the local frequency generating unit; a filter filtering an output from the analog frequency converter; an analog-to-digital converter converting an output from the filter into a digital signal; and a digital frequency converter performing digital frequency conversion to an output from the analog-to-digital converter. The local frequency inverted by the analog frequency converter may be used in the reception with the first band group. The local frequency of the same sign may be used for the digital frequency conversion both in the reception with the first band group and in the reception with the second band group and the arrangement of the signals output from the digital frequency converter may be reversed to use the filter of the same characteristics both in the reception with the first band group and in the reception with the second band group. With this configuration, since the filter of the same characteristics can be used both when the first band group is used and when the second band group is used, it is possible to greatly simplify the configuration of the filter.

The radio reception apparatus may further include an analog frequency converter performing analog frequency conversion to an input radio-frequency signal at the local frequency generated by the local frequency generating unit; a filter filtering an output from the analog frequency converter; an analog-to-digital converter converting an output from the filter into a digital signal; and a digital frequency converter performing digital frequency conversion to an output from the analog-to-digital converter. The local frequency inverted by the analog frequency converter may be used in the reception with the first band group. The sign of the local frequency for the digital frequency conversion in the reception with the first band group may be inverted in the reception with the second band group and the filtering may be performed to an output from the digital frequency converter to use the filter of the same characteristics both in the reception with the first band group and in the reception with the second band group. With this configuration, since the filter of the same characteristics can be used both when the first band group is used and when the second band group is used, it is possible to greatly simplify the configuration of the filter.

A switching part for inverting an input signal may be provided at least one input of the analog frequency converter in order to invert the sign of the local frequency in the analog frequency converter. With this configuration, the sign of the local frequency can be easily inverted.

A switching part for inverting an output signal may be provided at one output of the analog frequency converter in order to invert the sign of the local frequency in the analog frequency converter. With this configuration, the sign of the local frequency can be easily inverted.

According to another embodiment of the present invention, a transceiver including the radio transmission apparatus and the radio reception apparatus is provided. With this configuration, it is possible to support the frequency hopping between the multiple band groups and to minimize the number of the necessary local frequencies, thus simplifying the configuration of the transceiver.

According to another embodiment of the present invention, a radio communication method that uses a plurality of band groups and that transmits and receives a signal subjected to frequency hopping between a plurality of bands in each band group at a local frequency apart from the center frequency of each band includes the steps of generating a local frequency lower than the center frequency of each band in a first band group in the communication with the first band group and generating a local frequency higher than the center frequency of each band in a second band group in the communication with the second band group, the local frequency to be generated being the same as the local frequency generated in the communication with the first band group.

With the above configuration, a signal subjected to frequency hopping between a plurality of bands in each band group is transmitted and received at a local frequency apart from the center frequency of each band. A local frequency lower than the center frequency of each band in a first band group is generated in the transmission with the first band group. A local frequency that is higher than the center frequency of each band in a second band group and that is the same as the local frequency generated in the transmission with the first band group is generated in the transmission with the second band group. Accordingly, it is possible to support the frequency hopping between the multiple band groups and to minimize the number of the necessary local frequencies.

According to the present invention, it is possible to support the frequency hopping between the multiple band groups and to generate the multiple low-frequencies with a simple configuration.

BRIEF DESCRIPTION OF THE DRAWINGS

FIG. 1 is a block diagram showing an example of the configuration of a Low IF transmission system;

FIGS. 2A to 2H schematically show spectra of signals at different stages when upper local frequencies are adopted in the Low IF transmission system in FIG. 1;

FIGS. 3A to 3H schematically show spectra of signals at different stages when lower local frequencies are adopted in the Low IF transmission system in FIG. 1;

FIGS. 5A to 5G schematically show spectra of signals at different stages when the upper local frequencies are adopted in the Low IF reception system in FIG. 4;

FIGS. 6A to 6G schematically show spectra of signals at different stages when the lower local frequencies are adopted in the Low IF reception system in FIG. 4;

FIGS. 8A to 8J schematically show spectra of signals at different stages when the upper local frequencies are adopted in the real IF reception system in FIG. 7;

FIG. 10 is a table showing in detail the frequencies of band groups #3, #4, and #6 in a high band, among the band groups defined by the WiMedia;

FIG. 15 is a table showing the phases and ratios of signals to be synthesized in three-component synthesis, five-component synthesis, and seven-component synthesis;

FIG. 18 is a frequency analysis list showing simulation results when signals are synthesized at integer ratios by the digital sine generator;

FIG. 20 includes characteristic diagrams when signals that are desirable both for the higher frequencies and the lower frequencies and that have no degradation of the orthogonality are input in an SSB mixer;

FIG. 21 includes characteristic diagrams when the orthogonality of signals input in the SSB mixer is degraded;

FIG. 22A shows a result of comparison between a desired output wave (7.5 GHz) and a first unnecessary wave (8.5 GHz) in the examples in FIG. 20 and FIG. 22B shows a result of comparison between the desired output wave (7.5 GHz) and the first unnecessary wave (8.5 GHz) in the examples in FIG. 21;

FIG. 23 shows examples in which the phase and amplitude of the lower-frequency input signal are varied by the digital sine generator to compensate for the unbalance of the output in the examples in FIG. 21;

FIG. 24A shows a result of comparison between the desired output wave (7.5 GHz) and the first unnecessary wave (8.5 GHz) in the examples in FIG. 21 and FIG. 24B shows a result of comparison between the desired output wave (7.5 GHz) and the first unnecessary wave (8.5 GHz) in the examples in FIG. 23;

FIGS. 25A to 25I show examples in which the Hilbert BPF of the same characteristics is used in the communication apparatus in FIG. 11 both when the upper local frequencies are adopted and when the lower local frequencies are adopted;

FIGS. 34A to 34H schematically show spectra of signals at different stages when frequency conversion is performed by the analog frequency converter unit to use the Hilbert BPF having the same characteristics as in the upper local frequencies in the processing in FIGS. 6A to 6G;

DESCRIPTION OF THE PREFERRED EMBODIMENTS

Figure 4:
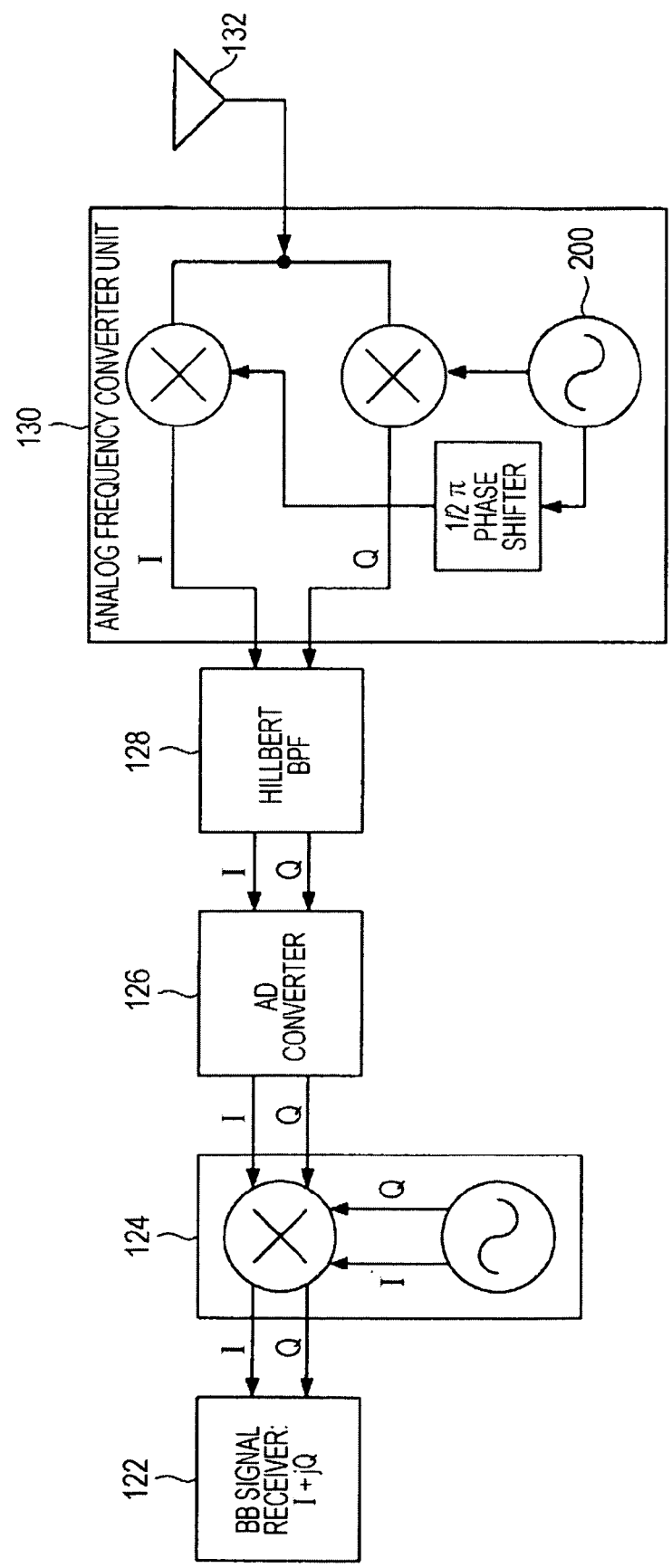
FIG. 4 is a block diagram showing an example of the configuration of a Low IF reception system.

Embodiments of the present invention will herein be described with reference to the attached drawings. The same reference numerals are used to identify the same components in the specification and the drawings.

Configuration of Low IF System

Before describing the embodiments of the present invention, exemplary configurations of Low IF systems and a real IF system will be described first. A simplified Low IF transmission system will now be described with reference to FIGS. 1 to 3. The main function of the Low IF transmission system is to modulate a baseband signal (I+jQ), which is a complex signal, into a desired carrier wave while removing unnecessary components outside the bandwidth and to output the carrier wave. The Low IF conversion means frequency conversion into an intermediate frequency corresponding to the half of the bandwidth in frequency hopping. FIG. 1 is a block diagram showing an example of the configuration of a Low IF transmission system. Referring to FIG. 1, the Low IF transmission system includes a baseband (BB) signal generator 102, a digital frequency converter 104, a digital-to-analog (DA) converter 106, a Hilbert bandpass filter (BPF) 108, an analog frequency converter unit 110, and an antenna 112. The analog frequency converter unit 110 includes a complex-to-real converter.

FIGS. 2A to 2H schematically show spectra of signals at different stages when upper local frequencies are adopted in the Low IF transmission system in FIG. 1. Since only real signals are transmitted in the natural world, the frequency conversion is performed in the analog block to finally convert complex signals into the real signals.

FIG. 2A shows a waveform of a baseband signal (I+jQ) generated by the BB signal generator 102. FIG. 2B shows a state in which the baseband signal (I+jQ) in FIG. 2A is converted into the lower frequency side by the digital frequency converter 104. The frequency conversion is performed by multiplication of a complex sine wave $(\exp(-j\omega it))$. As a result, the frequency conversion into an intermediate frequency at the lower frequency side, corresponding to the half of the bandwidth in the frequency hopping, is performed as shown in FIG. 2C. FIG. 2D shows a state in which filtering is performed by the Hilbert BPF 108 after DA conversion by the DA converter 106 to remove, for example, an aliasing noise by the DA conversion. FIG. 2E shows a waveform after the filtering by the Hilbert BPF 108. FIG. 2F shows a state in which multiplication of a complex sine wave $(\exp(+j\omega ct))$ having the upper local frequency is performed by the analog frequency converter unit 110 for analog frequency conversion. FIG. 2G shows a waveform resulting from the analog frequency conversion. FIG. 2H shows a result of conversion of the complex signal in FIG. 2G into a real signal that can be transmitted in the real space. In practical, the multiplication of the complex local frequency is performed by the analog frequency converter unit 110 concurrently with the conversion into the real signal. As described above, when the upper local frequencies are adopted, the upper limit frequency of the bandwidth after the frequency conversion corresponds to the frequency of the complex sine wave used in the analog frequency conversion, as shown in FIG. 2G.

FIGS. 3A to 3H schematically show spectra of signals at different stages when lower local frequencies are adopted in the Low IF transmission system in FIG. 1. The stages in FIGS. 3A to 3H correspond to the stages in FIGS. 2A to 2H. In the processing in FIGS. 3A to 3H, FIG. 3B shows a state in which multiplication by a complex sine wave $(\exp(+j\omega it))$ is performed to convert the baseband signal (I+jQ) in FIG. 3A into the upper frequency side. As a result, the frequency conversion into an intermediate frequency at the higher frequency side, corresponding to the half of the bandwidth in the frequency hopping, is performed as shown in FIG. 3C. FIG. 3D shows a state in which the filtering by the Hilbert BPF 108 is performed at the positive-value side. FIG. 3F shows a state in which multiplication of a complex sine wave $(\exp(+j\omega ct))$ having the lower local frequency is performed by the analog frequency converter unit 110 for the analog frequency conversion. FIG. 3G shows a waveform resulting from the analog frequency conversion. As described above, when the lower local frequencies are adopted, the lower limit frequency of the bandwidth after the frequency conversion corresponds to the frequency of the complex sine wave used in the analog frequency conversion, as shown in FIG. 3G.

A simplified Low IF reception system will now be described with reference to FIGS. 4 to 6. The main function of the Low IF reception system is to extract a baseband signal (I+jQ), which is a complex signal, from a desired modulation wave while removing unnecessary components outside the bandwidth. FIG. 4 is a block diagram showing an example of the configuration of a Low IF reception system. Referring to FIG. 4, the Low IF reception system includes a baseband (BB) signal receiver 122, a digital frequency converter 124, an analog-to-digital (AD) converter 126, a Hilbert BPF 128, an analog frequency converter unit 130, and an antenna 132.

FIGS. 5A to 5G schematically show spectra of signals at different stages when the upper local frequencies are adopted in the Low IF reception system in FIG. 4. As shown in FIGS. 5A to 5G, the processing reverse to that in FIGS. 2A to 2H is basically performed in the Low IF reception system adopting the upper local frequencies. FIG. 5A shows a waveform of an radio-frequency (RF) signal received by the antenna 132. FIG. 5B shows a state in which multiplication of a complex sine wave $(\exp(-j\omega ct))$ having the upper local frequency is performed by the analog frequency converter unit 130 for the frequency conversion. FIG. 5C shows a waveform resulting from the frequency conversion. FIG. 5D shows a state in which the filtering is performed by the Hilbert BPF 128. FIG. 5E shows a waveform resulting from the filtering by the Hilbert BPF 128. FIG. 5F shows a state in which the signal in FIG. 5E is converted into higher frequencies by the digital frequency converter 124. The frequency conversion is performed by multiplication of the complex sine wave $(\exp(+j\omega it))$. FIG. 5G shows a waveform of a baseband signal (I+jQ) resulting from the frequency conversion.

FIGS. 6A to 6G schematically show spectra of signals at different stages when the lower local frequencies are adopted in the Low IF reception system in FIG. 4. As shown in FIGS. 6A to 6G, the processing reverse to that in FIGS. 3A to 3H is basically performed in the Low IF reception system adopting the lower local frequencies. The stages in FIGS. 6A to 6G correspond to the stages in FIGS. 5A to 5G. In the processing in FIGS. 6A to 6G, FIG. 6B shows a state in which multiplication of a complex sine wave $(\exp(-j\omega ct))$ having the lower local frequency is performed by the analog frequency converter unit 130 for the frequency conversion. FIG. 6D shows a state in which the filtering by the Hilbert BPF 128 is performed at the positive-value side. FIG. 6F shows a state in which multiplication of a complex sine wave $(\exp(-j\omega it))$ is performed for the frequency conversion in the digital block. FIG. 6G shows a waveform of a baseband signal (I+jQ) resulting from the frequency conversion.

As described above, the Low IF reception system removes interfering waves outside the bandwidth before the AD conversion by performing the filtering by the Hilbert BPF 128 in the analog block.

Configuration of Real IF System

Figure 7:
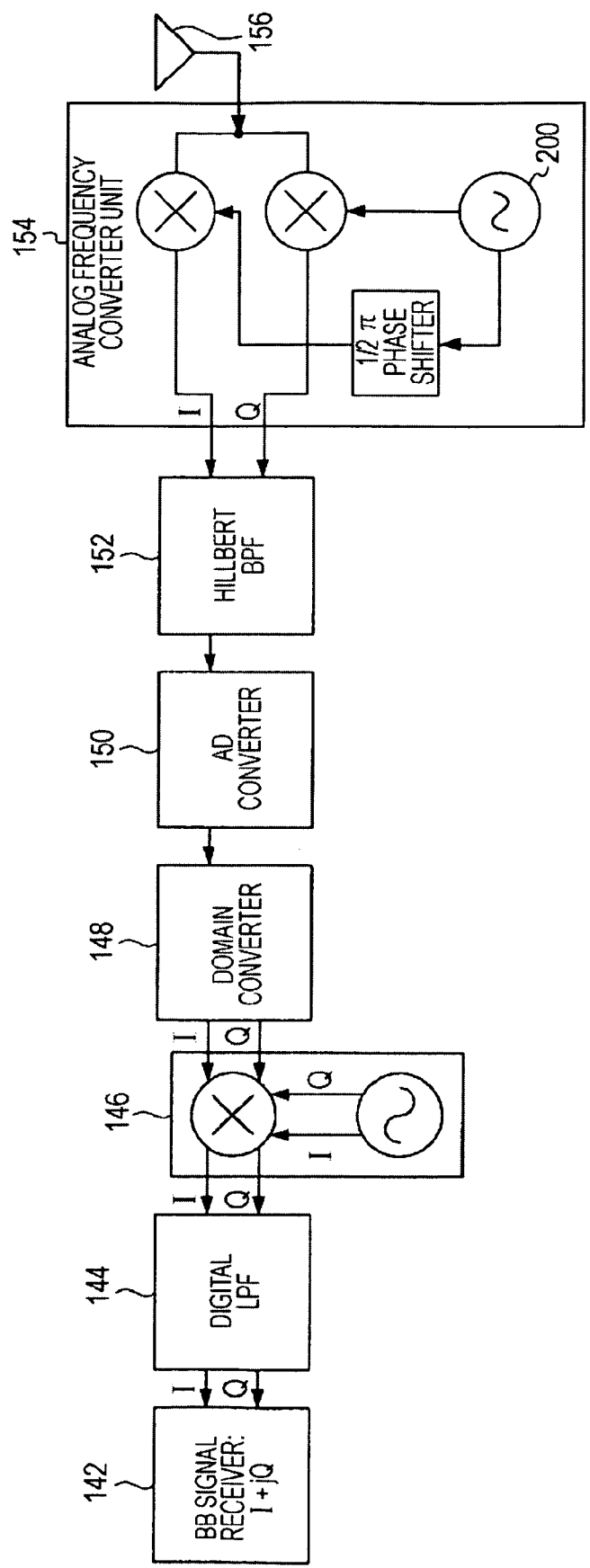
FIG. 7 is a block diagram showing an example of the configuration of a real IF reception system.

A real IF reception system will now be described with reference to FIGS. 7 to 9. FIG. 7 is a block diagram showing an example of the configuration of a real IF reception system. Referring to FIG. 7, the real IF reception system includes a baseband (BB) signal receiver 142, a digital LPF 144, a digital frequency converter 146, a domain converter 148, an AD converter 150, a Hilbert BPF 152, an analog frequency converter unit 154, and an antenna 156. The real IF reception system in FIG. 7 is characterized in that either of the I signal component and the Q signal component output from the Hilbert BPF 152 is extracted and the extracted signal is subjected to the AD conversion by the AD converter 150. The real IF system utilizes the fact that a high-precision digital filter can be realized in the digital block.

FIGS. 8A to 8J schematically show spectra of signals at different stages when the upper local frequencies are adopted in the real IF reception system in FIG. 7. FIG. 8A shows a waveform of an radio-frequency (RF) signal received by the antenna 156. FIG. 8E shows a state in which multiplication of a complex sine wave $(\exp(-j\omega ct))$ having the upper local frequency is performed by the analog frequency converter unit 154 for the frequency conversion. FIG. 8C shows a waveform resulting from the frequency conversion. FIG. 8D shows a state in which the filtering is performed by the Hilbert BPF 152. FIG. 8E shows a waveform resulting from the filtering by the Hilbert BPF 152. FIG. 8F shows a result of domain conversion of the complex signal, which results from the stage in FIG. 8E, into a real signal. This operation is practically performed by extracting either of the outputs from the Hilbert BPF 152. The result is subjected to the AD conversion by the AD converter 150 and is supplied to the domain converter 148. FIG. 8G shows a state in which the signal in FIG. 8F is converted into higher frequencies in the digital block by the digital frequency converter 146. The frequency conversion is performed by multiplication of the complex sine wave ($\exp(+j\omega it)$). FIG. 8H shows a waveform resulting from the frequency conversion. FIG. 8I shows a state in which the filtering is performed by the digital LPF 144. FIG. 8J shows a waveform resulting from the filtering.

Figure 9A:
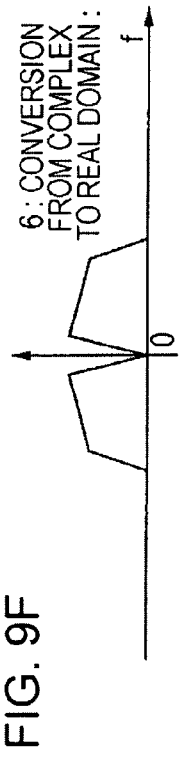
FIGS. 9A to 9J schematically show spectra of signals at different stages when the lower local frequencies are adopted in the real IF reception system in FIG. 7.
Figure 9B:
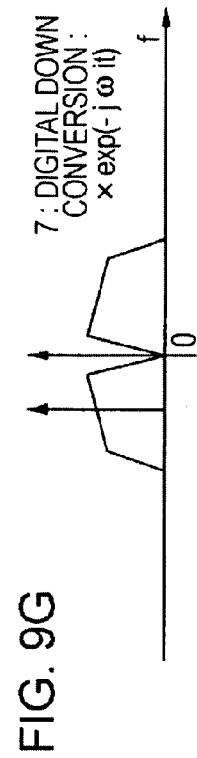
Figure 9C:
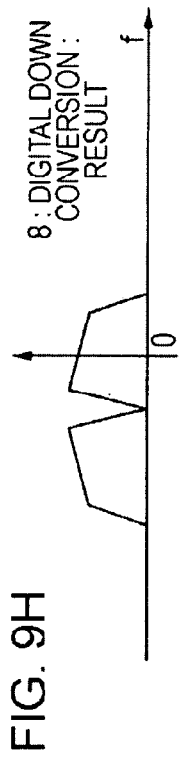
Figure 9D:
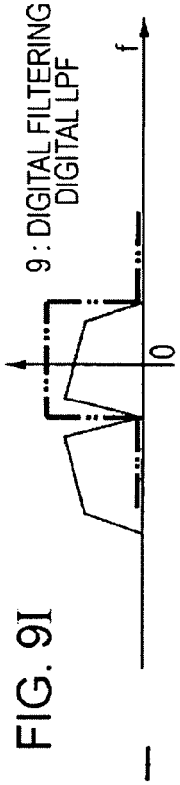
Figure 9E:
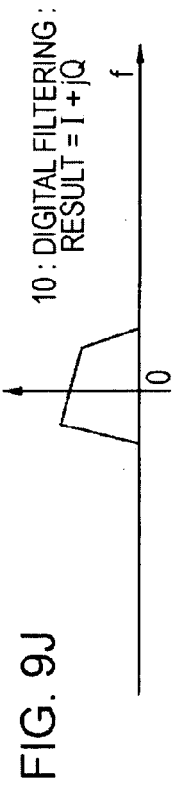
Figure 9F:
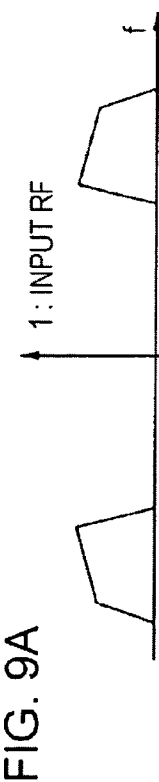
Figure 9G:
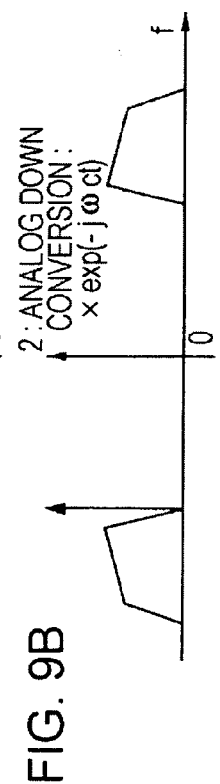
Figure 9H:
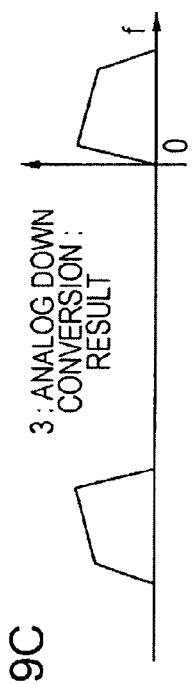
Figure 9I:
Figure 9J:
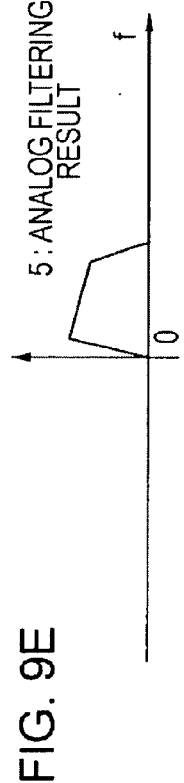

FIGS. 9A to 9J schematically show spectra of signals at different stages when the lower local frequencies are adopted in the real IF reception system in FIG. 7. The stages in FIGS. 9A to 9J correspond to the stages in FIGS. 8A to 8J. In the processing in FIGS. 9A to 9J, FIG. 9B shows a state in which multiplication of a complex sine wave ($\exp(-j\omega ct)$) having the lower local frequency is performed for the frequency conversion. FIG. 9D shows a state in which the filtering by the Hilbert BPF 152 is performed at the positive-value side. FIG. 9G shows a state in which multiplication of a complex sine wave ($\exp(-j\omega it)$) is performed toward lower frequencies by the digital frequency converter 146 for the frequency conversion.

Since the Hilbert BPF 152 is connected to the AD converter 150 via one signal line in such a real IF reception system, a simple system configuration can be realized. Accordingly, when the Hilbert BPF 152 and the AD converter 150 are installed in different integrated circuits (ICs), it is possible to desirably reduce the power consumption in the interface between the AD converter 150 and the Hilbert BPF 152.

EXEMPLARY EMBODIMENTS

Figure 41:
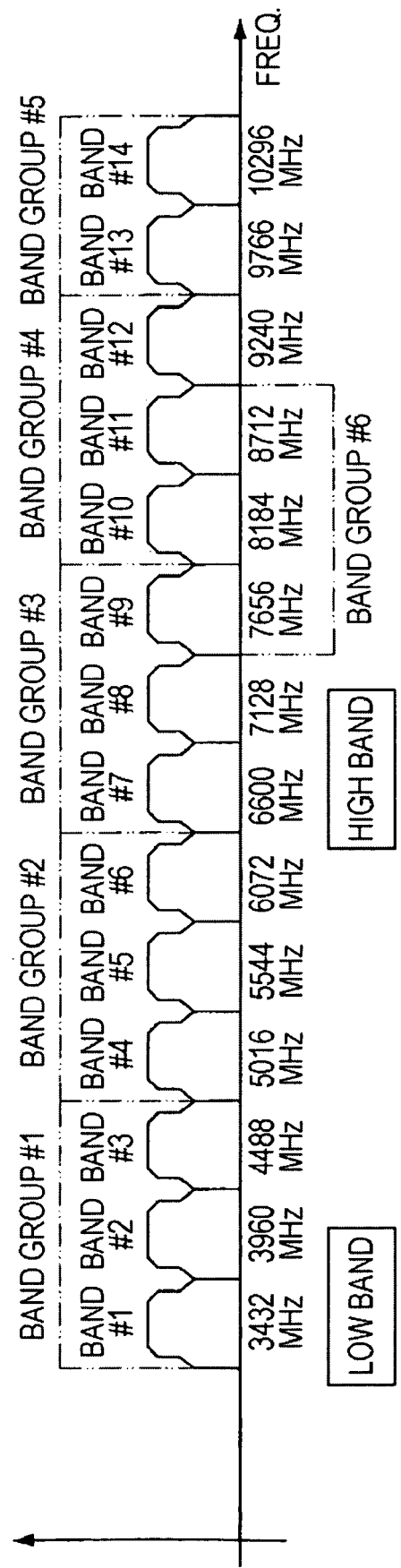
FIG. 41 illustrates band groups defined by the WiMedia.

Embodiments of the present invention will now be described in detail. FIG. 10 is a table showing in detail the frequencies of the band groups #3, #4, and #6 in the high band, among the band groups defined by the WiMedia described above with reference to FIG. 41. As shown in FIG. 10, three bands having band IDs #7, #8, and #9 belong to the band group #3 and the bands #7, #8, and #9 have center frequencies of 6,600 MHz, 7,123 MHz, and 7,656 MHz, respectively. Three bands having band IDs #10, #11, and #12 belong to the band group #4 and the bands #10, #11, and #12 have center frequencies of 8,124 MHz, 8,712 MHz, and 9,240 MHz, respectively. Three bands having band IDs #9, #10, and #11 belong to the band group #6 and the bands #9, #10, and #11 have center frequencies of 7,656 MHz, 8,184 MHz, and 8,712 MHz, respectively.

Each band belonging to each band group has a bandwidth of 528 MHz. Accordingly, as shown in FIG. 10, the band #7 in the band group #3 has an upper frequency of 6,864 MHz and a lower frequency of 6,336 MHz. Similarly, the band #8 in the band group #3 has an upper frequency of 7,392 MHz and a lower frequency of 6,864 MHz, and the band #9 in the band group #3 has an upper frequency of 7,920 MHz and a lower frequency of 7,392 MHz.

Similarly, the bands #10, #11, and #12 in the band group #4 have upper frequencies of 8,448 MHz, 8,976 MHz, and 9,504 MHz and lower frequencies of 7,920 MHz, 8,448 MHz, and 8,976 MHz, respectively. The bands #9, #10, and #11 in the band group #6 have upper frequencies of 7,920 MHz, 8,448 MHz, and 8,976 MHz and lower frequencies of 7,392 MHz, 7,920 MHz, and 8,448 MHz, respectively.

When an apparatus supporting the band groups #3, #4, and #6 is configured in order to conform to the WiMedia standard and their center frequencies are used as local frequencies, it is necessary to generate six frequencies and, therefore, the configuration of the oscillators becomes very complicated.

As described above, the Low IF system uses the intermediate frequency corresponding to the half of the bandwidth in the frequency hopping.

The bands #10, #11, and #12 in the band group #4 have lower local frequencies of 7,920 MHz, 8,448 MHz, and 8,976 MHz, respectively, in the Low IF system. The bands #9, #10, and #11 in the band group #6 have upper local frequencies of 7,920 MHz, 8,448 MHz, and 8,976 MHz, respectively, in the Low IF system, which coincide with the lower local frequencies of the band groups #10, #11, and #12 in the band group #4.

Accordingly, according to the present embodiment, the lower local frequencies of the Low IF system are adopted when the band group #4 is used and the upper local frequencies of the Low IF system are adopted when the band group #6 is used. Switching between the lower local frequencies and the upper local frequencies is performed to minimize the number of the necessary local frequencies. As a result, the local frequencies necessary in the band group #4 can be made the same as those necessary in the band group #6, so that the configuration of the multiband generators generating the local frequencies can be greatly simplified. Consequently, it is possible to build an apparatus supporting the hopping between multiple bands with a simple configuration when the hopping is performed between the band groups #3, #4, and #6.

In order to perform the switching between the upper local frequencies and the lower local frequencies, the transmission system switches the local frequencies used in the analog frequency converter unit 110. In addition, as apparent from comparison between FIGS. 2A to 2H and FIGS. 3A to 3H, it is sufficient for the transmission system to switch the complex sine wave used in the multiplication in the frequency conversion by the digital frequency converter 104 in the digital block between "$\exp(-j\omega it)$" and "$\exp(+j\omega it)$" and to switch the passband in the filtering by the Hilbert BPF 108 between the negative side and the positive side.

Similarly, the reception system switches the local frequencies used in the analog frequency converter unit 130. In addition, as apparent from comparison between FIGS. 5A to 5G and FIGS. 6A to 6G, it is sufficient for the reception system to switch the complex sine wave used in the multiplication in the frequency conversion by the digital frequency converter 124 in the digital block between "$\exp(-j\omega it)$" and "$\exp(+j\omega it)$" and to switch the passband in the filtering by the Hilbert BPF 128 between the negative side and the positive side.

Similarly, it is sufficient for the real IF reception system to switch the complex sine wave used in the multiplication in the frequency conversion by the digital frequency converter 146 in the digital block between "$\exp(+j\omega it)$" and "$\exp(-j\omega it)$" and to switch the passband in the filtering by the Hilbert BPF 152 between the negative side and the positive side.

Figure 11:
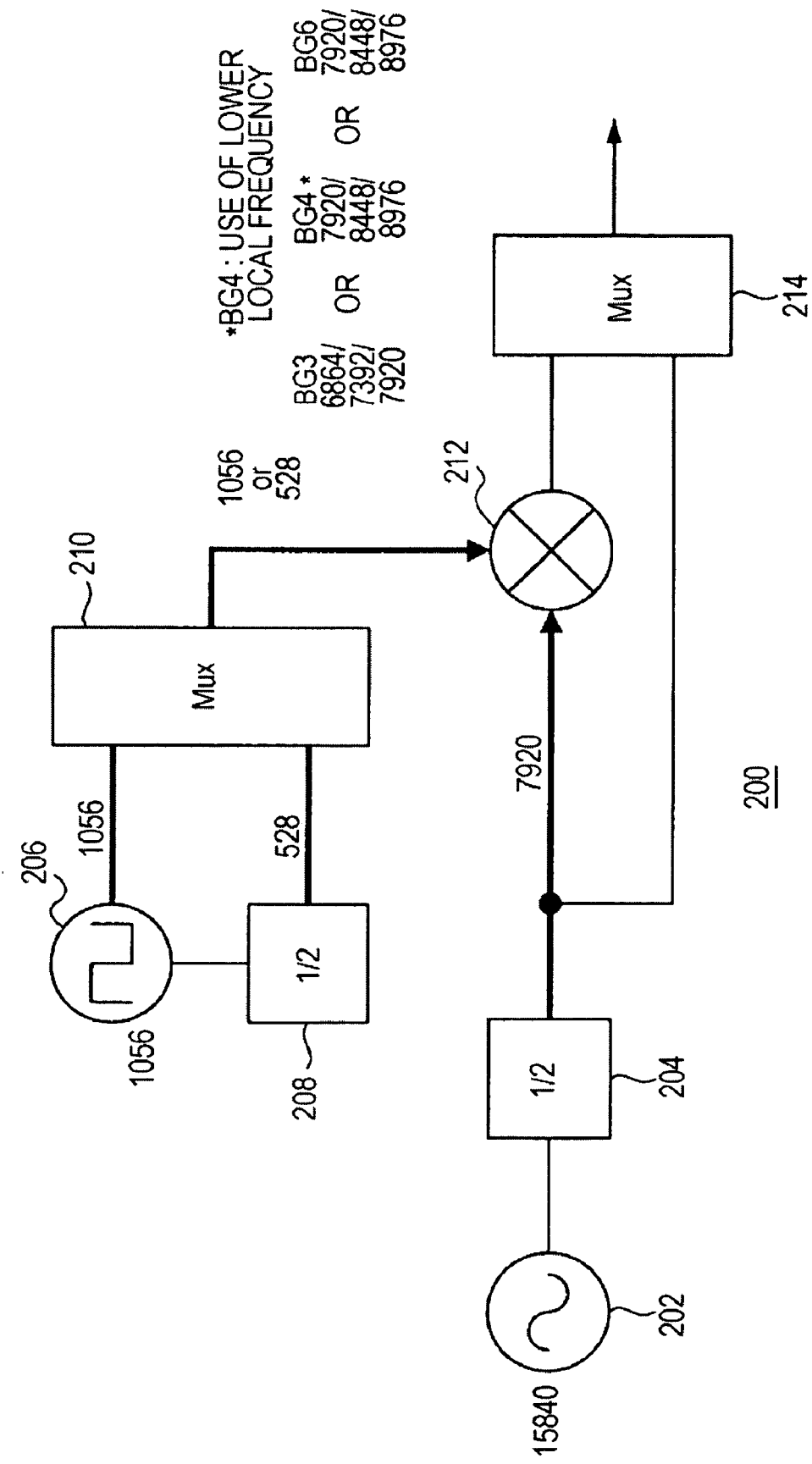
FIG. 11 is a block diagram showing an example of the configuration of a communication apparatus according to an embodiment of the present invention.

FIG. 11 is a block diagram showing an example of the configuration of a communication apparatus according to an embodiment of the present invention. A multiband generator (MBG) 200 serving as a local frequency generating circuit for the band groups #3, #4, and #6 is applied to the communication apparatus. The multiband generator (MBG) 200 is applicable to both a radio transmission apparatus and a radio reception apparatus and is also applicable to a transceiver serving as both the radio transmission apparatus and the radio reception apparatus. The multiband generator (MBG) 200 generates local frequencies used for the frequency conversion in the digital frequency converter 104, digital frequency converter 124, or the digital frequency converter 146 shown in FIG. 1, 4, or 7, respectively. As described above, it is possible to minimize the number of the necessary local frequencies by adopting the lower local frequencies for the band group #4 and the upper local frequencies for the band group #6.

The necessary local frequencies of the bands #7 and #8 in the band group #3 are calculated by subtracting 528 MHz and 1,056 MHz from the necessary local frequency of the band #9 in the band group #3 and the necessary local frequencies of the bands #10 and #11 in the band group #6 are calculated by adding 528 MHz and 1,056 MHz to the necessary local frequency of the band #9 in the band group #6 both in the Low IF systems and a Zero IF system.

The multiband generator 200 shown in FIG. 11 can generate all the necessary local frequencies of the band group #3 and #6 by mixing 528 MHz and 1,056 MHz with 7,920 MHz. With the configuration in FIG. 11, it is possible to generate the necessary local frequencies of the band groups #3 and #6 with the oscillator circuits of the minimum number. Since the lower local frequencies of the band group #4 coincide with the upper local frequencies of the band group #6, all the necessary local frequencies of the band group #3, #4, and #6 can be generated in the configuration in FIG. 11 by adopting the lower local frequencies for the band group #4, the upper local frequencies for the band group #6, and the upper local frequencies for the band group #3.

In particular, it is very difficult to vary the oscillation frequency in the high band (8-GHz band). However, since the oscillation frequency supplied from an inductance-capacitance oscillator (LC OSC) 202 is fixed to 7,920 MHz in the configuration in FIG. 11, there is no need to vary the oscillation frequency in the high band, thus simplifying the implementation.

The multiband generator 200 in FIG. 11 adopts a single sideband (SSB) mixer 212. One input into the SSB mixer 212 is switched between the 528-MHz signal and the 1,096-MHz signal and the frequency of the other input into the SSB mixer 212 is fixed to generate the frequencies of the band group #3, #4, and #6.

Referring to FIG. 11, the multiband generator 200 includes the LC OSC 202, a frequency divider 204, a ring oscillator (RING OSC) 206, a frequency divider 208, a multiplexer (MUX) 210, the SSB mixer 212, and a multiplexer 214. The LC OSC 202 has a fixed frequency of 15,840 MHz. The frequency of 15,840-MHz signal is divided into half by the frequency divider 204 and a signal having a frequency of 7,920 MHz resulting from the frequency division is supplied to the SSB mixer 212.

The RING OSC 206 generates a signal having a frequency of 1,056 MHz and supplies the signal to the multiplexer 210. The frequency of the 1,056-MHz signal oscillated by the RING OSC 206 is divided into half by the frequency divider 208 and the 528-MHz signal resulting from the frequency division is also supplied to the multiplexer 210. The multiplexer 210 selects either of the 1,0560-MHz signal and the 528-MHz signal and supplies the selected signal to the SSB mixer 212.

The SSB mixer 212 mixes the 7,920 MHz signal supplied from the LC OSC 202 with either of the 1,056 MHz signal and the 528-MHz signal supplied from the multiplexer 210. As a result, the SSB mixer 212 outputs a signal having a frequency of ±528 MHz or ±1,056 MHz with respect to 7,920 MHz. The multiplexer 214 switches among the 7,920 MHz-signal supplied from the frequency divider 204 and the four signals having frequencies of 7,920±528 MHz and 7,920±1,056 MHz and outputs the signal resulting from the switching. Accordingly, the multiband generator 200 can output the five local frequencies having frequencies of 6,864 MHz, 7,392 MHz, 7,920 MHz, 8,448 MHz, and 8,976 MHz. As a result, all the necessary local frequencies can be generated by the multiband generator 200 by adopting the upper local frequencies for the band group #3, the lower local frequencies for the band group #4, and the upper local frequencies for the band group #6. One input into the SSB mixer 212 may be switched between the DC 528-MHz signal and the DC 1,096-MHz signal to omit the multiplexer 214.

The use of the SSB mixer 212 allows the phase continuity of local frequencies in the frequency hopping to be ensured. Since the multiband generator 200 includes the SSB mixer 212 and one input into the SSB mixer 212 is switched between the 528-MHz signal and the 1,096-MHz signal in the present embodiment, the other input into the SSB mixer 212 can be fixed to the 7,920-MHz signal, thus reliably ensuring the phase continuity. The 528-MHz signal supplied to the SSB mixer 212 can be easily generated by dividing the frequency of the 1,056-MHz signal into half by the frequency divider 208.

The frequency of the other input into the SSB mixer 212 is fixed to 7,920 MHz, so that the multiband generator 200 has a very simple configuration. In general, the 7,920-MHz signal is not directly generated and the signal having a frequency of 15,840 MHz twice 7,920 MHz is generated, as shown in FIG. 11. However, it is difficult to vary the high-frequency 15,840-MHz signal because the effect of any parasitic component on the oscillator circuit is increased. Since the frequency of the higher-frequency signal input into the SSB mixer 212 can be fixed to 7,920-MHz in the configuration in FIG. 11, it is possible to suppress the effect of the parasitic component on the oscillator circuit.

A phase locked loop (PLL) is normally used to generate the 15,840-MHz signal. Since the frequency 15,840 MHz is fixed, the PLL of a very simple configuration can be used. It is necessary to input an in-phase (I) signal component and a quadrature (Q) signal component, which are out of phase by 90°, in the SSB mixer 212 and the orthogonality of the phase of the I and Q signal components poses a problem in terms of the characteristics. Since the higher frequency among the frequencies input in the SSB mixer 212 is fixed in the configuration in FIG. 11, the orthogonality of the phase of the I and Q signal components in the higher-frequency input signal is not varied in the frequency hopping. Accordingly, it is sufficient to consider the variation in the orthogonality of the phase of the I and Q signal components involved in the frequency hopping only in the signal having the lower frequency supplied from the multiplexer 210, so that the implementation can be simplified.

Figure 12:
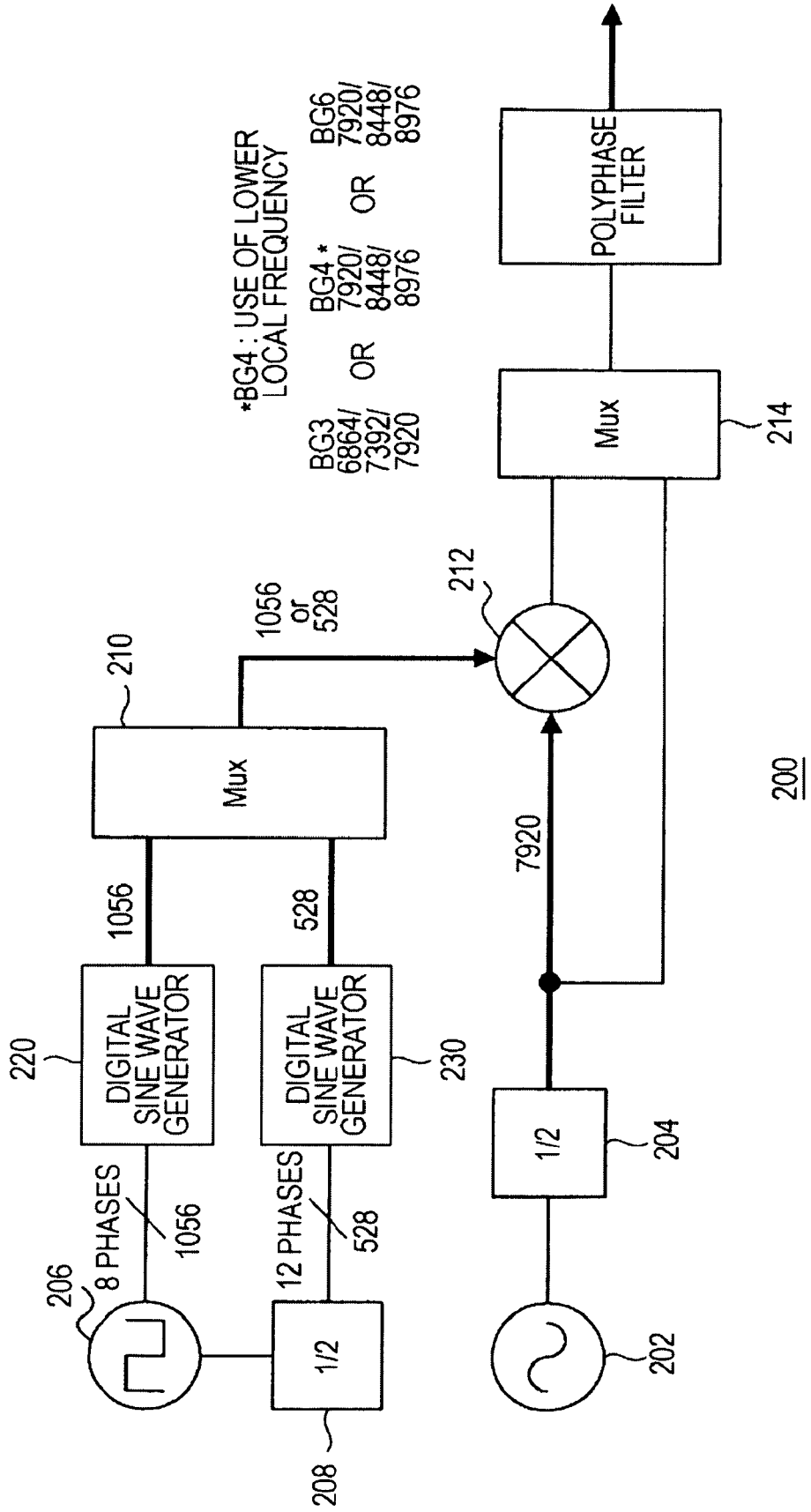
FIG. 12 is a block diagram showing an exemplary configuration in which a five-component synthesis digital sine generator (DSG) is used to generate a 528-MHz signal and a three-component synthesis digital sine generator (DSG) is used to generate a 1,056-MHz signal.

FIG. 12 is a block diagram showing an exemplary configuration in which a five-component synthesis digital sine generator (DSG) 230 is used to generate the 528-MHz signal and a three-component synthesis digital sine generator (DSG) 220 is used to generate the 1,056-MHz signal in order to reduce the harmonic components in the 528-MHz signal and the 1,056-MHz signal supplied to the SSB mixer 212. The SSB mixer 212 can generate various unnecessary frequencies if the input signals include the harmonic components. However, the five-component synthesis digital sine generator (DSG) 230 can be used for the 528-MHz signal and the three-component synthesis digital sine generator (DSG) 220 can be used for the 1,056-MHz signal to prevent the unnecessary frequencies from being generated.

Figure 13:
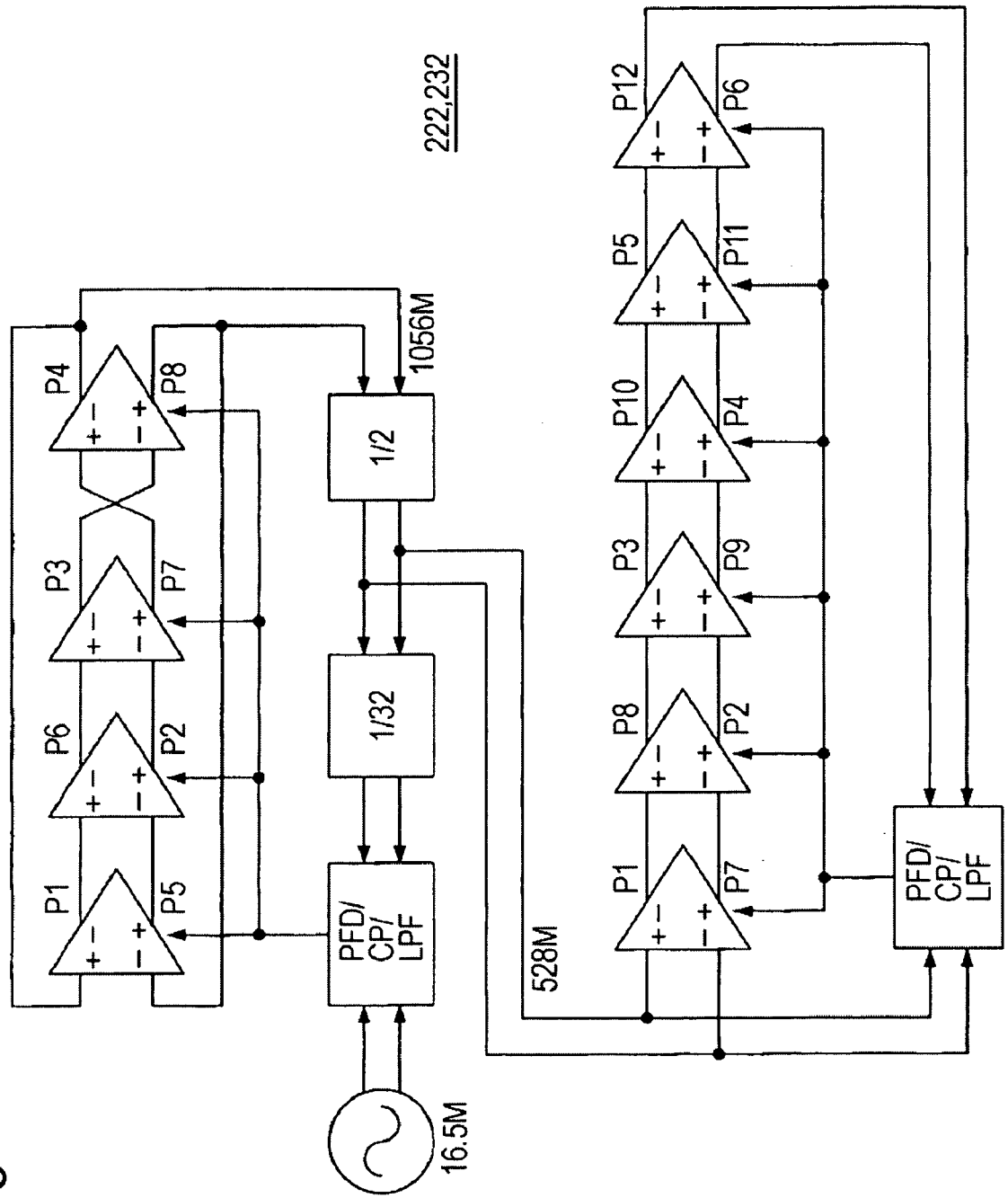
FIG. 13 is a block diagram schematically showing an example of the configuration of a polyphase signal generator included in the digital sine generator.
Figure 14B:
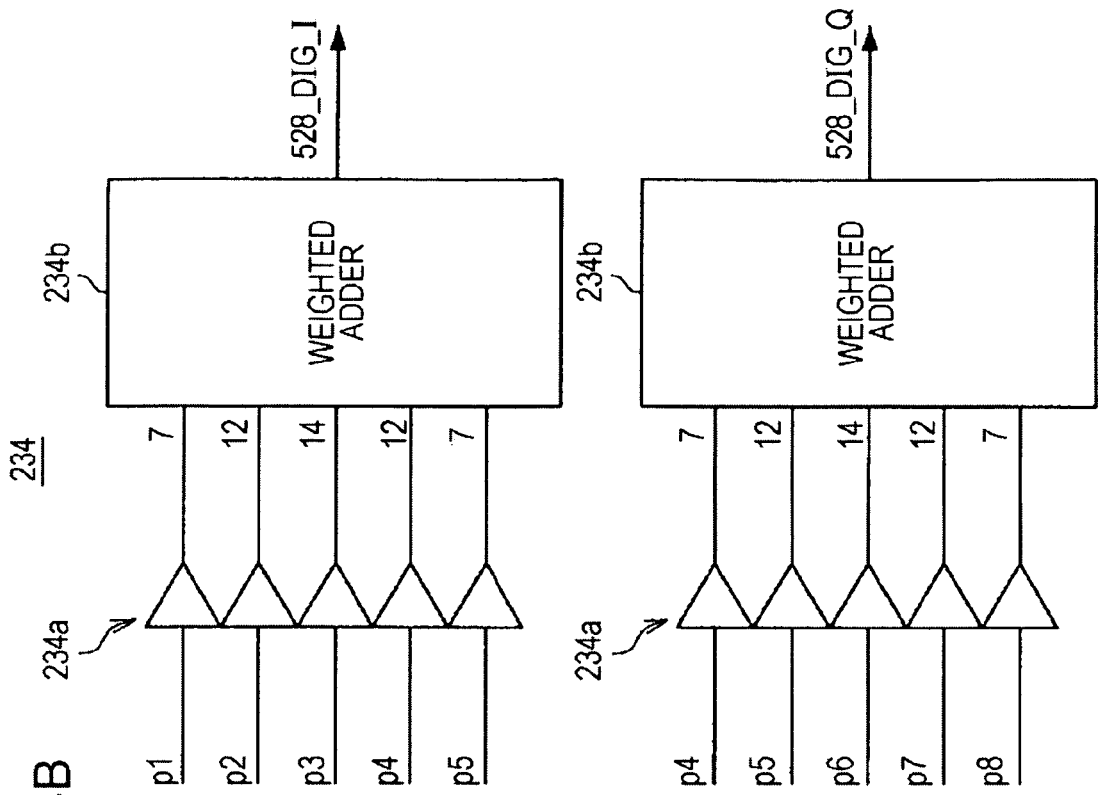
FIGS. 14A and 14B are block diagrams schematically showing examples of the configuration of synthesizers included in the digital sine generators.
Figure 14A:
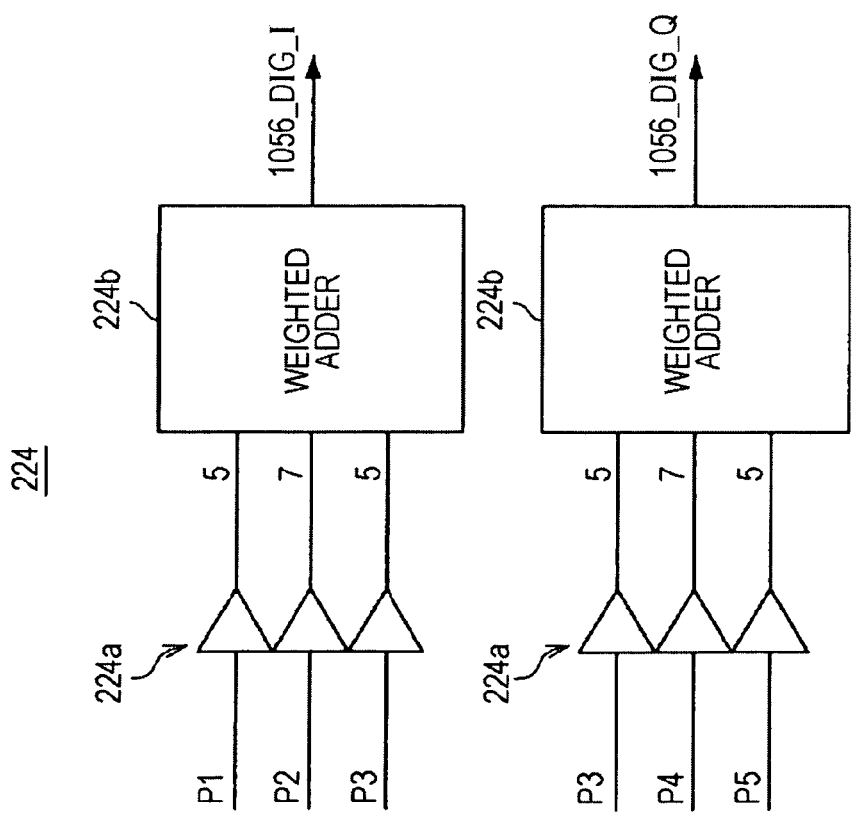

It is necessary to input multiple signals out of phase with each other (polyphase signals) in the digital sine generators 220 and 230. It is assumed that the digital sine generators each include a polyphase signal generator in the following description. The digital sine generator 220 includes a polyphase signal generator 222 generating multiple signals out of phase with each other and a synthesizer 224 synthesizing the signals generated in the polyphase signal generator 222. The digital sine generator 230 includes a polyphase signal generator 232 generating multiple signals out of phase with each other and a synthesizer 234 synthesizing the signals generated in the polyphase signal generator 232. FIG. 13 is a block diagram schematically showing an example of the configuration of the polyphase signal generators 222 and 232 included in the digital sine generators 220 and 230, respectively. Referring to FIG. 13, polyphase signals P1 to P8 of 1,056 MHz are generated by a ring oscillator (corresponding to the RING OSC 206) including inverters and delay devices. Polyphase signals p1 to p12 of 528 MHz are generated by the inverters and delay devices included in the ring oscillator in FIG. 13. A divide-by-two frequency divider is provided between the 1,056-MHz signal generating section and the 528-MHz generating section. FIG. 14A is a block diagram schematically showing an example of the configuration of the synthesizer 224 included in the three-component synthesis digital sine generator 220. FIG. 14B is a block diagram schematically showing an example of the configuration of the synthesizer 234 included in the five-component synthesis digital sine generator 230. The principle of the digital sine generator is described in, for example, Japanese Unexamined Patent Application Publication No. 2005-129993 mentioned above.

For example, when the 8,448-MHz signal (7,920 MHz+528 MHz) is to be generated, the SSB mixer 212 generates the 6,336-MHz signal (7,920 MHz−3*528 MHz) concurrently with the 8,448-MHz signal if a third harmonic is included in the 528-MHz signal. Since the unnecessary components having frequencies sufficiently apart from the frequency to be generated do not greatly affect the system, it is necessary to sufficiently reduce the lower-order harmonics.

The importance of the reduction of the harmonic components for the 528-MHz signal is different from that for the 1,056-MHz signal because the 1,056-MHz signal has a frequency twice the frequency of the 528-MHz signal. Since the five-component synthesis is used for the 528-MHz signal and the three-component synthesis is used for the 1,056-MHz signal in the present embodiment, it is possible to sufficiently reduce the lower-order harmonics having an effect on the system. Since it is difficult to use addition at an arbitrary ratio in the waveform synthesis in the actual IC, it is desirable to use addition at an integer ratio.

FIG. 15 is a table showing the phases and ratios of signals in the three-component synthesis, the five-component synthesis, and the seven-component synthesis. Although the digital sine generators 220 and 230 perform the three-component synthesis and the five-component synthesis, the phases and ratios in the seven-component synthesis are also shown in FIG. 15. In the table shown in FIG. 15, three signals out of phase by 45° are generated and synthesized in the three-component synthesis. The synthesis ratio among the signal having a phase of −45°, the signal having a phase of 0, and the signal having a phase of +45° is 5:7:5. Five signals out of phase by 30° are generated and synthesized in the five-component synthesis. The synthesis ratio among the signal having a phase of −60°, the signal having a phase of −30°, the signal having a phase of 0, the signal having a phase of +30°, and the signal having a phase of +60° is 7:12:14:12:7. Seven signals out of phase by 22.5° are generated and synthesized in the seven-component synthesis. The synthesis ratio among the signal having a phase of −67.5°, the signal having a phase of −45°, the signal having a phase of −22.5°, the signal having a phase of 0, the signal having a phase of +22.5°, the signal having a phase of +45°, and the signal having a phase of +67.5° is 5:9:12:13:12:9:5.

In the example shown in FIG. 14A, each of the I signal component and the Q signal component is generated by the three-component synthesis. As shown in FIG. 14A, the synthesizer 224 includes a delay controller 224a and a weighted adder 224b. In order to output the I signal component, the signals P1, P2, and P3 out of phase by 45° are input in the weighted adder 224b at a ratio of 5:7:5 to be synthesized. In order to output the Q signal component, the signals P3, P4, and P5 out of phase by 45° are input in the weighted adder 224b at a ratio of 5:7:5 to be synthesized. Since the I signal component is out of phase with the Q signal component by 90°, the phase difference between the center phase of the three waves used in the synthesis of the I signal component (the phase of the signal P2) and the center phase of the three waves used in the synthesis of the Q signal component (the phase of the signal P4) is 90°.

Similarly, in the example shown in FIG. 14B, each of the I signal component and the Q signal component is generated by the five-component synthesis. As shown in FIG. 14B, the synthesizer 234 includes a delay controller 234a and a weighted adder 234b. In order to output the I signal component, the signals p1, p2, p3, p4, and p5 out of phase by 30° are input in the weighted adder 234b at a ratio of 7:12:14:12:7 to be synthesized. In order to output the Q signal component, the signals p4, p5, p6, p7, and p8 out of phase by 30° are input in the weighted adder 234b at a ratio of 7:12:14:12:7 to be synthesized. The phase difference between the center phase of the five waves used in the synthesis of the I signal component (the phase of the signal p3) and the center phase of the five waves used in the synthesis of the Q signal component (the phase of the signal p6) is 90°. As described above, the signals P1 to P5 and the signals p1 to p8 in FIGS. 14A and 14B are generated by the polyphase signal generators 222 and 232 in FIG. 13.

Figure 16:
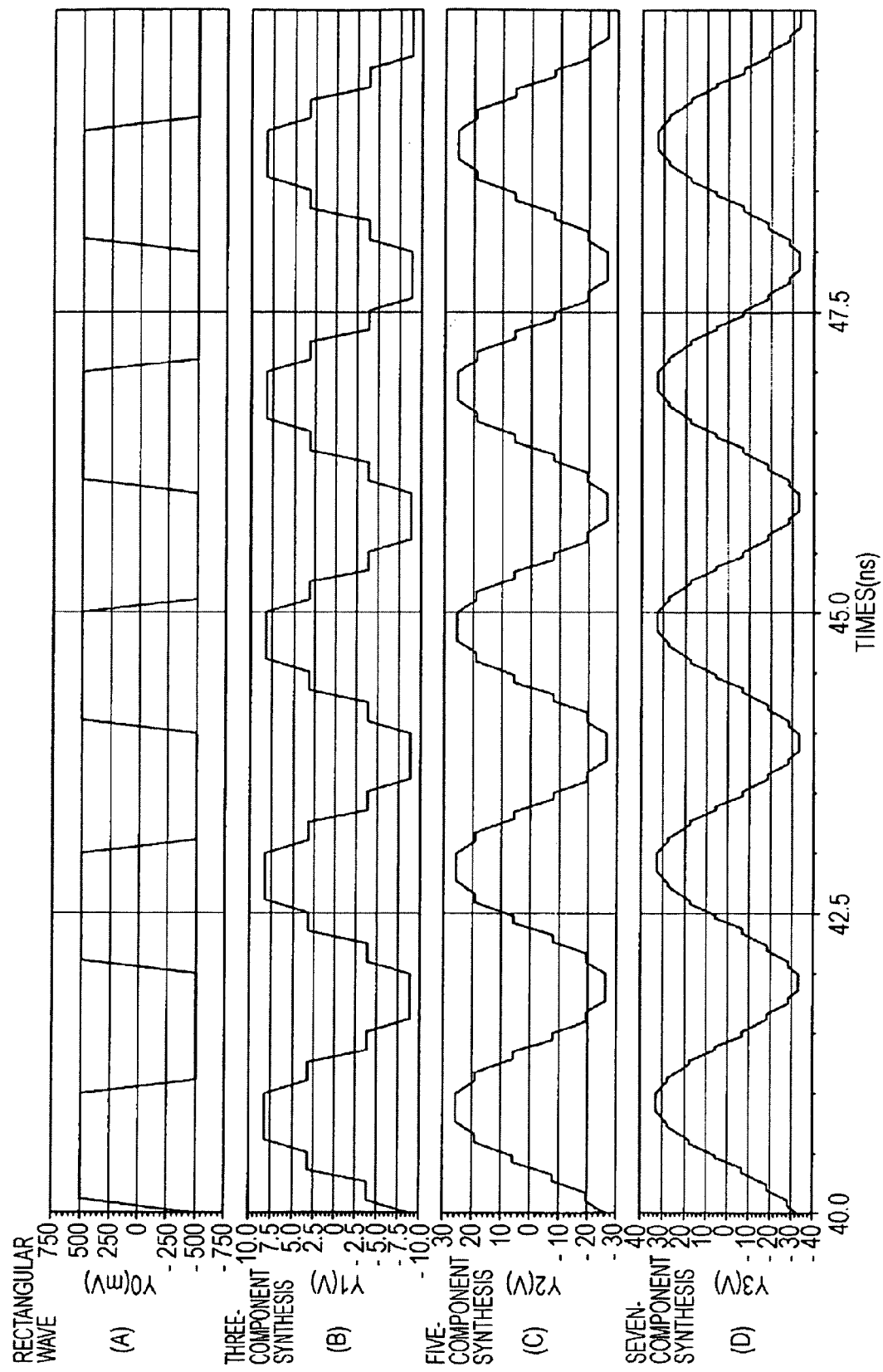
FIG. 16 shows simulation results when signals are synthesized at integer ratios by the digital sine generator.
Figure 17:
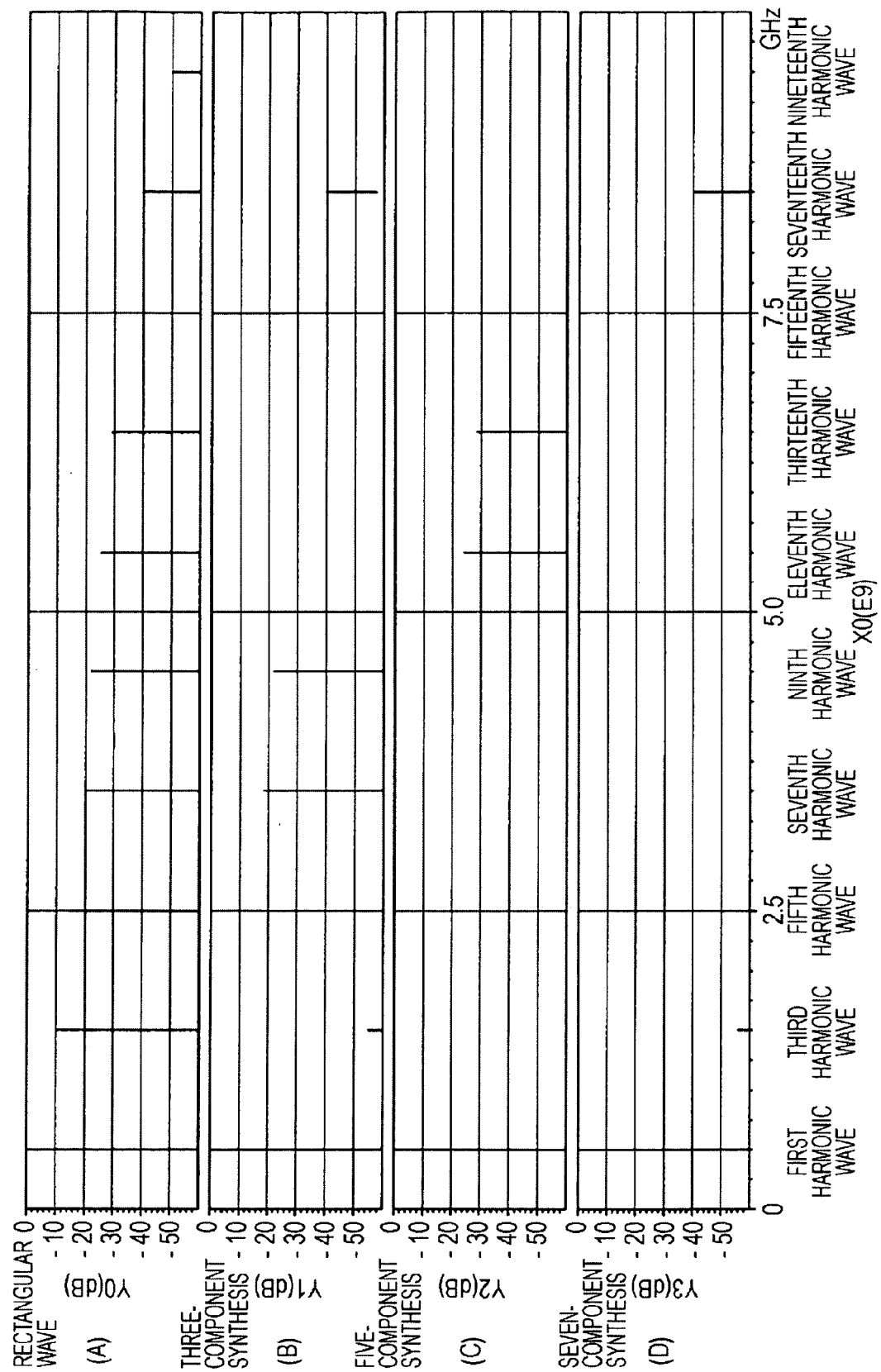
FIG. 17 shows simulation results when signals are synthesized at integer ratios by the digital sine generator.

FIGS. 16, 17, and 18 show simulation results of the synthesis at integer ratios of each signal by the digital sine generators 220 and 230. Although the digital sine generators 220 and 230 perform the three-component synthesis and the five-component synthesis, the simulation results in the seven-component synthesis are also shown in FIGS. 16 to 18.

Referring to FIG. 16, FIG. 16(A) shows rectangular waves P1, P2, . . . on which the wave synthesis is based. The polyphase signal generator 222 in the digital sine generator 220 and the polyphase signal generator 232 in the digital sine generator 230 generate multiple rectangular waves in FIG. 16(A), which are out of phase with each other. FIG. 16(B), FIG. 16(C), and FIG. 16(D) show waveforms resulting from the synthesis of the multiple rectangular waves in FIG. 16(A) at the phases and the integer ratios shown in FIG. 15. FIG. 16(B) shows the waveform resulting from the three-component synthesis, FIG. 16(C) shows the waveform resulting from the five-component synthesis, and FIG. 16(D) shows the waveform resulting from the seven-component synthesis. As apparent from FIGS. 16(A) to 16(D), the waveform closer to the sine wave can be gained as the number of the signals to be synthesized is increased.

FIG. 17 shows the results of frequency analyses in harmonic tests by the digital sine generators 220 and 230. FIG. 17(A) shows the result of the frequency analysis of the rectangular wave shown in FIG. 16(A), FIG. 17(B) shows the result of the frequency analysis in the three-component synthesis shown in FIG. 16(B), FIG. 17(C) shows the result of the frequency analysis in the five-component synthesis shown in FIG. 16(C), and FIG. 17(D) shows the result of the frequency analysis in the seven-component synthesis shown in FIG. 16(D). FIG. 18 is a frequency analysis list showing the results of the harmonic tests.

As shown in FIGS. 17 and 18, the digital sine generators 220 and 230 of the present embodiment sufficiently attenuate the third harmonic wave and the fifth harmonic wave in the three-component synthesis. The digital sine generators 220 and 230 sufficiently attenuate the third harmonic wave, the fifth harmonic wave, the seventh harmonic wave, and the ninth harmonic wave in the five-component synthesis. Particularly in the five-component synthesis, the digital sine generators 220 and 230 greatly attenuate the third harmonic wave. Accordingly, the digital sine generators 220 and 230 can sufficiently attenuate the lower-order harmonics, which cause problems. In the case of the five-component synthesis, the third harmonic wave can be greatly attenuated because the attenuation of the third harmonic wave is not affected by the approximation in the synthesis at the integer ratio. As described above, the use of the five-component synthesis for the 528-MHz signal and the use of the three-component synthesis for the 1,056-MHz signal allow the lower-order harmonics to be sufficiently attenuated, thus preventing the waveforms of the unnecessary frequencies from being included in the output from the SSB mixer 212.

A method of adjusting the phases and amplitudes in the digital sine generators 220 and 230 to reduce the difference in output due to the difference in the orthogonality between the two input signals into the SSB mixer 212 will now be described.

As described above, the higher-frequency 7,920-MHz signal is input into the SSB mixer 212 at one side and the lower-frequency 528-MHz or 1,056-MHz signal is input into the SSB mixer 212 at the other side. Each of the input signals is composed of the I signal component and the Q signal component out of phase by 90°. In the SSB mixer 212, the accuracy of the orthogonality of the input I and Q signal components out of phase by 90° is critical. Specifically, if the orthogonality of the input signals is degraded, the 7,392-MHz (7,920 MHz-528 MHz) signal, which is the first unnecessary wave, is generated when the 8,338-MHz (7,920 MHz+528 MHz) signal is to be generated. The accuracy of the orthogonality should be attained both in the higher-frequency input and in the lower-frequency input. Particularly in the higher-frequency input, it is very difficult to ensure the orthogonality in the phase direction, among the orthogonalities in the amplitude direction and in the phase direction. Accordingly, according to the present embodiment, the amplitude and the phase of the lower-frequency input signal, that is, of the 528-MHz signal or the 1,056-MHz signal shown in FIG. 11 are adjusted to reduce any spurious component in the output from the SSB mixer 212.

It is normally difficult to separately adjust the phase and the amplitude in analog circuits. In the digital sine generators 220 and 230 of the present embodiment, the signals before the waveforms are synthesized in the weighted adders 224b and 234b do not have amplitude information and the amplitude information is added in the synthesis. Accordingly, the phase and amplitude can be separately varied with the digital sine generators 220 and 230.

Figure 19B:
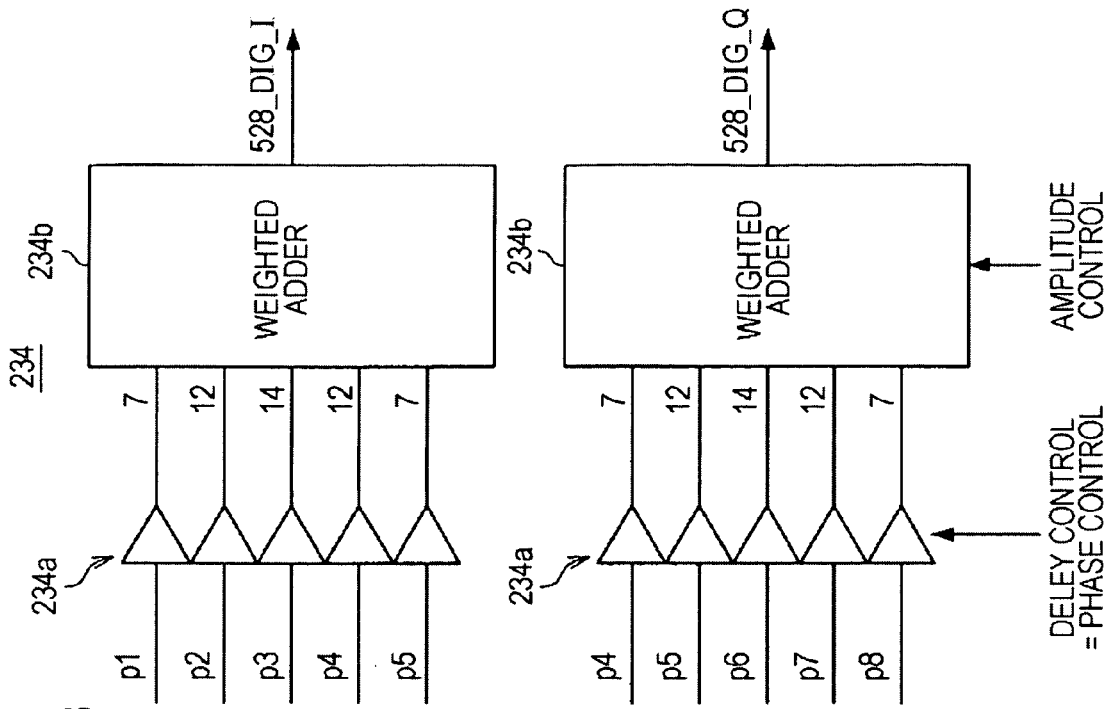
FIGS. 19A and 19B show exemplary methods of separately adjusting the amplitude and the phase by the digital sine generators.
Figure 19A:
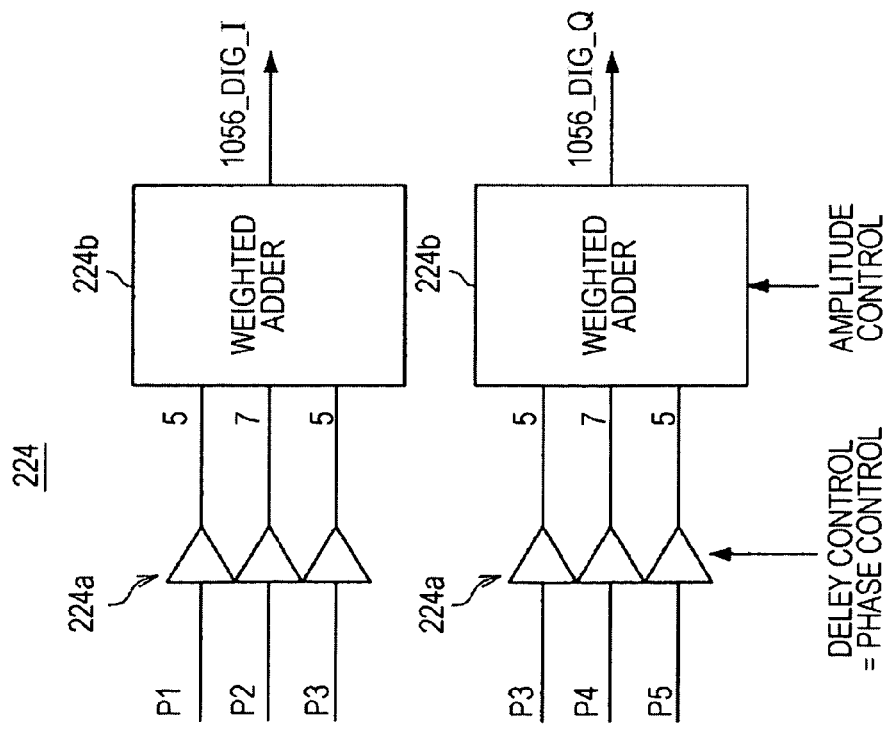

FIGS. 19A and 19B show exemplary methods of separately adjusting the amplitude and the phase by the digital sine generators 220 and 230. FIG. 19A shows the synthesizer 224 in the three-component synthesis digital sine generator 220 and FIG. 19B shows the synthesizer 234 in the five-component synthesis digital sine generator 230. As shown in FIGS. 19A and 19B, before the waveform synthesis is performed by the weighted adders 224b and 234b, the delay controllers 224a and 234a adjust the phases of the signals and, then, the weighted adders 224b and 234b adjust the amplitudes thereof. Accordingly, with the digital sine generators 220 and 230 of the present embodiment, it is possible to separately adjust the amplitudes and the phases of the signals generated by the polyphase signal generators 222 and 232.

FIGS. 20, 21, 22A, 22B, 23, 24A, and 24B show examples in which any degradation (unbalance) of the orthogonality in the I and Q signal components having the higher frequency supplied from the LC OSC 202 is compensated for with the input having the lower frequency supplied from the RING OSC 206 to reduce the first unnecessary wave from the output from the multiband generator 200. In the examples in FIGS. 20, 21, 22A, 22B, 23, 24A, and 24B, an 8-GHz signal is used as the higher-frequency input into the SSB mixer 212, a 500-MHz signal is used as the lower-frequency input thereinto, the frequency of a desired output wave is 7.5 GHz, and the frequency of a first unnecessary wave is 8.5 GHz.

Referring to FIG. 20, FIG. 20(A) shows the I and Q signal components, which are higher-frequency input signals. FIG. 20(B) shows the I and Q signal components, which are lower-frequency input signals. FIG. 20(C) shows an output from the multiband generator 200 when the signals in FIG. 20(A) are mixed with the signals in FIG. 20(B) by the SSB mixer 212. Similarly, referring to FIG. 21, FIG. 21(A) shows the I and Q signal components, which are higher-frequency input signals. FIG. 21(B) shows the I and Q signal components, which are lower-frequency input signals. FIG. 21(C) shows an output from the multiband generator 200 when the signals in FIG. 21(A) are mixed with the signals in FIG. 21(B) by the SSB mixer 212.

In the examples in FIG. 20, the orthogonality is not degraded and signals desirable both for the higher frequency side and the lower frequency side are input in the SSB mixer 212. When the orthogonality is not degraded as in the example in FIG. 20, a desirable waveform is output from the multiband generator 200 and the variation in phase and amplitude of the output waveform can be minimized.

In contrast, in the examples in FIG. 21, the orthogonality of the I and Q signal components in the higher-frequency input signal (7,920 MHz) supplied from the LC OSC 202 is degraded. As shown in FIG. 21(A), the I signal component of the higher-frequency input signal is out of phase with the Q signal component thereof by 10°, and the I signal component of the lower-frequency input signal is out of phase with the Q signal component thereof by 100°. The amplitude of the I signal component of the higher-frequency input signal is shifted from the amplitude of the Q signal component thereof by 10%. In such a case, as shown in FIG. 21(C), the output from the multiband generator 200 is greatly shifted from the desired wave both in the amplitude and in the phase. FIG. 22A shows a result of comparison between the desired output wave (7.5 GHz) and the first unnecessary wave (8.5 GHz) in the examples in FIG. 20. FIG. 22B shows a result of comparison between the desired output wave (7.5 GHz) and the first unnecessary wave (8.5 GHz) in the examples in FIG. 21. As shown in FIG. 22A, in the case of the desired wave in FIG. 20, the difference between the desired output wave (7.5 GHz) and the first unnecessary wave (8.5 GHz) is −45.0 dB. In contrast, when the orthogonality is degraded as in the example in FIG. 21, the difference between the desired output wave (7.5 GHz)

and the first unnecessary wave (8.5 GHz) becomes −19.9 dB and the effect of the unnecessary wave is increased.

FIG. 23 shows examples in which the phase and amplitude of the lower-frequency input signal are varied by the digital sine generators 220 and 230 to compensate for the unbalance of the output in the examples in FIG. 21. FIG. 23(A) shows the I and Q signal components, which are higher-frequency input signals. As in FIG. 21(A), the I signal component is out of phase with the Q signal component by 10°, and the amplitude of the I signal component of the higher-frequency input signal is shifted from the amplitude of the Q signal component thereof by 10%. FIG. 23(B) shows the I and Q signal components, which are lower-frequency input signals. The phase and amplitude of the I and Q signal components in FIG. 23(B) are adjusted to compensate for the difference in FIG. 21(A). FIG. 23(C) shows an output from the multiband generator 200 when the signals in FIG. 23(A) are mixed with the signals in FIG. 23(B) by the SSB mixer 212.

It is preferred that the phase and amplitude of the lower-frequency input signal be adjusted so as to offset the difference of the higher-frequency input signal. For example, when the phase is shifted by +10° in the higher-frequency input signal, the phase of the lower-frequency input signal is shifted by −10°. When the amplitude is shifted by +10% in the higher-frequency input signal, the amplitude of the lower-frequency input signal is shifted by −10%. With such a method, as shown in FIG. 23(C), it is possible to make the output from the multiband generator 200 closer to the desired wave.

FIG. 24A shows a result of comparison between the desired output wave (7.5 GHz) and the first unnecessary wave (8.5 GHz) in the examples in FIG. 21. FIG. 24B shows a result of comparison between the desired output wave (7.5 GHz) and the first unnecessary wave (8.5 GHz) in the examples in FIG. 23. As shown in FIG. 24A, when the orthogonality is degraded as in the example in FIG. 21, the difference between the desired output wave (7.5 GHz) and the first unnecessary wave (8.5 GHz) is −19.9 dB. In contrast, as shown in FIG. 24B, the difference between the desired output wave (7.5 GHz) and the first unnecessary wave (8.5 GHz) can be increased by adjusting the phase and amplitude of the lower-frequency input signal and, in this case, the difference between the desired output wave (7.5 GHz) and the first unnecessary wave (8.5 GHz) becomes −40.3 dB. Accordingly, even if the orthogonality is degraded in the higher-frequency input signal, the output from the multiband generator 200 can be compensated for by varying the phase and amplitude of the lower-frequency input signal with the digital sine generators 220 and 230 to make the output closer to the desired wave. As described above, the degradation of the output due to the degradation of the orthogonality of the higher-frequency signal input into the SSB mixer 212 can be compensated for with the lower-frequency input signal by using the digital sine generators 220 and 230.

A configuration of the Low IF system will now be described, in which the Hilbert BPF of the same characteristics can be used both for the upper local frequencies and for the lower local frequencies. As described above, in the configuration in FIG. 11, the switching between the upper local frequencies and the lower local frequencies is performed for the switching between the band group #4 and the band group #6. In the transmission system, the arrangement of the frequencies may be reversed in advance in the digital block, the sign of the frequency used in the multiplication by the digital frequency converter 104 in the digital block may not be inverted, and the sign of the frequency used in the multiplication by the analog frequency converter unit 110 in the analog block may be inverted to use the Hilbert BPF of the same characteristics both for the upper local frequencies and for the lower local frequencies.

As described above, in order to perform the switching between the upper local frequencies and the lower local frequencies in the Low IF system, it is necessary to switch the center frequency of the Hilbert BPF between, for example, −264 MHz and +264 MHz. Although it is relatively easy to perform the switching when the Hilbert BPF is implemented as a digital circuit, the degradation of the filter characteristics can be caused when the Hilbert BPF is provided in the analog block, as in the present embodiment.

FIGS. 25A to 25I show examples in which the Hilbert BPF of the same characteristics is used in the multiband generator 200 in FIG. 11 both when the upper local frequencies are adopted and when the lower local frequencies are adopted. In the transmission system, the arrangement of the frequencies is reversed in advance in the digital block, the sign of the complex sine wave ($\exp(+j\omega it)$ or $\exp(-j\omega it)$) used in the multiplication by the digital frequency converter 104 in the digital block is not switched when the switching between the upper local frequencies and the lower local frequencies is performed, and the sign of the complex sine wave ($\exp(+j\omega ct)$ or $\exp(-j\omega ct)$) used in the multiplication by the analog frequency converter unit 110 in the analog block is inverted to use the Hilbert BPF of the same characteristics both for the upper local frequencies and for the lower local frequencies.

Specifically, FIGS. 25A to 25I schematically show spectra of signals at different stages when the lower local frequencies are adopted. The reverse of the arrangement of the frequencies of the baseband signal (I+jQ) in FIG. 25B is added to the processing shown in FIGS. 3A to 3H. The stages in FIGS. 25C to 25F are performed in a manner similar to that in FIGS. 2B to 2E. The multiplication of the lower local frequency ($\exp(-j\omega ct)$) is performed in the stage in FIG. 25G to perform the analog frequency conversion and, then, the conversion into the real domain is performed to gain the spectrum in FIG. 25I.

As described above, when the upper local frequencies in FIGS. 2A to 2H are switched to the lower local frequencies in FIGS. 3A to 3H, it is necessary to switch the sign of the complex sine wave ($\exp(-j\omega ct) \rightarrow \exp(+j\omega it)$) used in the multiplication by the digital frequency converter 104 in the digital block, as apparent from comparison between FIG. 2B and FIG. 3B. In contrast, when the upper local frequencies in FIGS. 2A to 2H are switched to the lower local frequencies in FIGS. 25A to 25I, it is not necessary to switch the sign of the complex sine wave used in the multiplication by the digital frequency converter 104 in the digital block, as apparent from comparison between FIG. 2B and FIG. 25C, and the frequency conversion in the digital block can be performed by using the complex sine wave ($\exp(-j\omega it)$) both for the upper local frequencies and for the lower local frequencies. Accordingly, as shown in FIG. 2D and FIG. 25E, the Hilbert BPF 108 of the same characteristics can be used both for the upper local frequencies and for the lower local frequencies. The positive complex sine wave ($\exp(+j\omega ct)$) is used in the frequency conversion in the analog block in FIG. 2F and FIG. 3F whereas the negative complex sine wave ($\exp(-j\omega ct)$) is multiplied in FIG. 25G to gain the final result in FIG. 25I, which is the same as the one in FIG. 3H.

In order to switch the sign of the local frequency used in the analog frequency conversion, a switching device for inverting the input signal may be provided at least one input of the analog frequency converter unit. With this configuration, it is possible to easily invert the sign of the local frequency.

Figure 26:
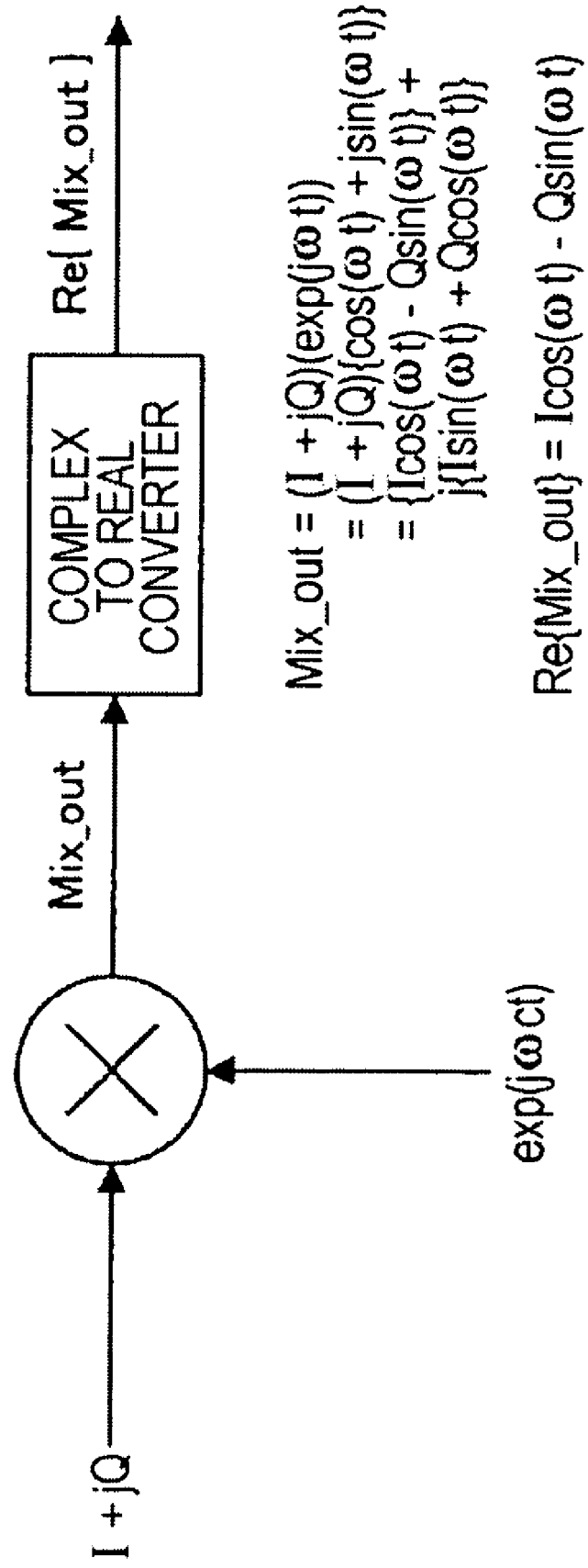
FIG. 26 is a diagram schematically showing an exemplary configuration and processing of an analog frequency converter unit.
Figure 27:
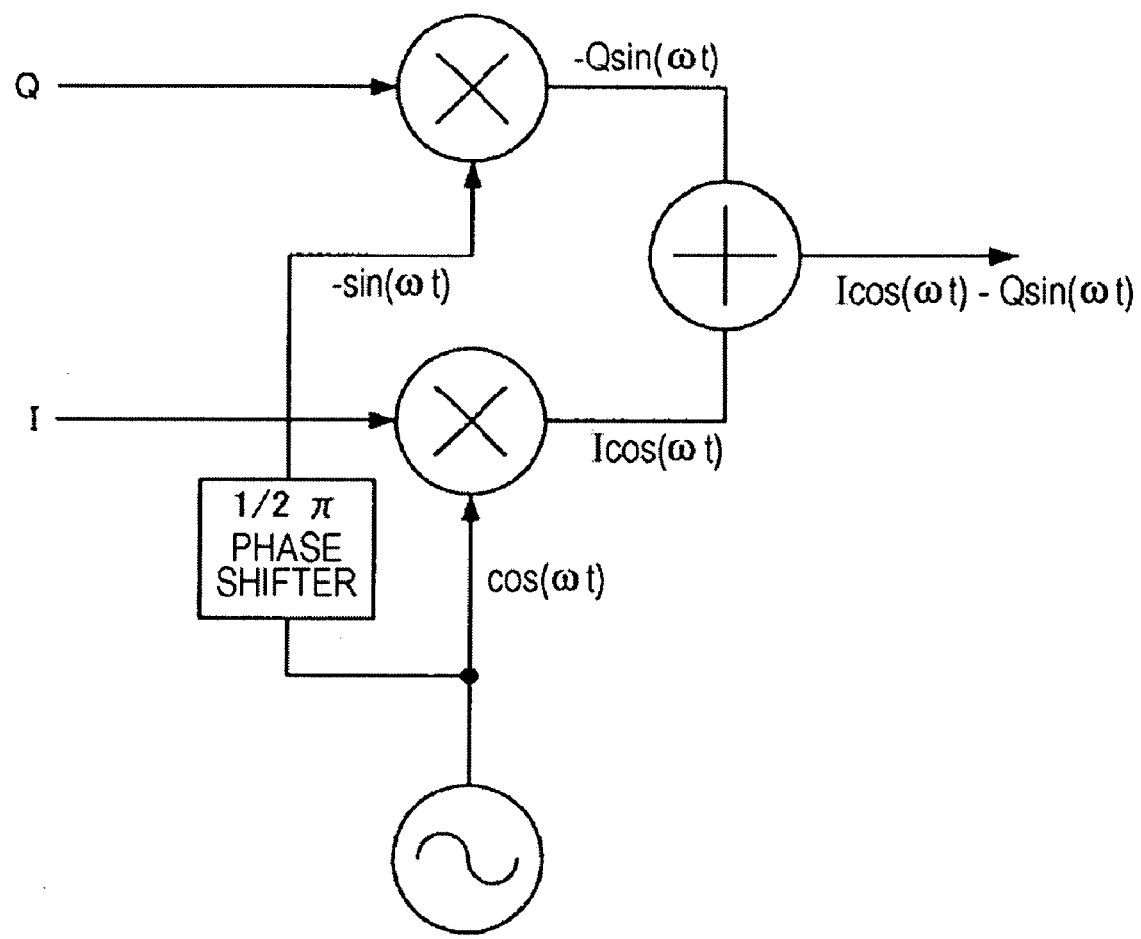
FIG. 27 is a block diagram schematically showing an exemplary configuration in which the operation in FIG. 26 is performed in the real domain.

An exemplary configuration and processing of the analog frequency converter unit 110 will now be described with reference to FIG. 26. The analog frequency converter unit 110 includes a complex-to-real converter and performs the operation shown in FIG. 26. Specifically, the analog frequency converter unit 110 multiplies a complex signal I+jQ that is input by a complex sine wave (exp(+jωct)) and extracts the real part of the multiplication result. Although the complex multiplication is performed in the example in FIG. 26, the operation in FIG. 26 should be performed in the real domain. FIG. 27 is a block diagram schematically showing an exemplary configuration in which the operation in FIG. 26 is performed in the real domain and corresponds to the configuration of the analog frequency converter unit 110 in FIG. 1. As shown in FIG. 27, the analog frequency converter unit 110 includes an oscillator generating a signal cos(ωt), a ½π phase shifter, two multipliers, and an adder. As apparent from comparison between FIG. 26 and FIG. 27, the analog frequency converter unit receives the I signal component and the Q signal component of the input complex signal I+jQ and outputs a signal I cos(ωt)−Q sin(ωt) also in the example in FIG. 27. Accordingly, the operation in FIG. 26 is equivalent to the operation in FIG. 27.

Figure 28:
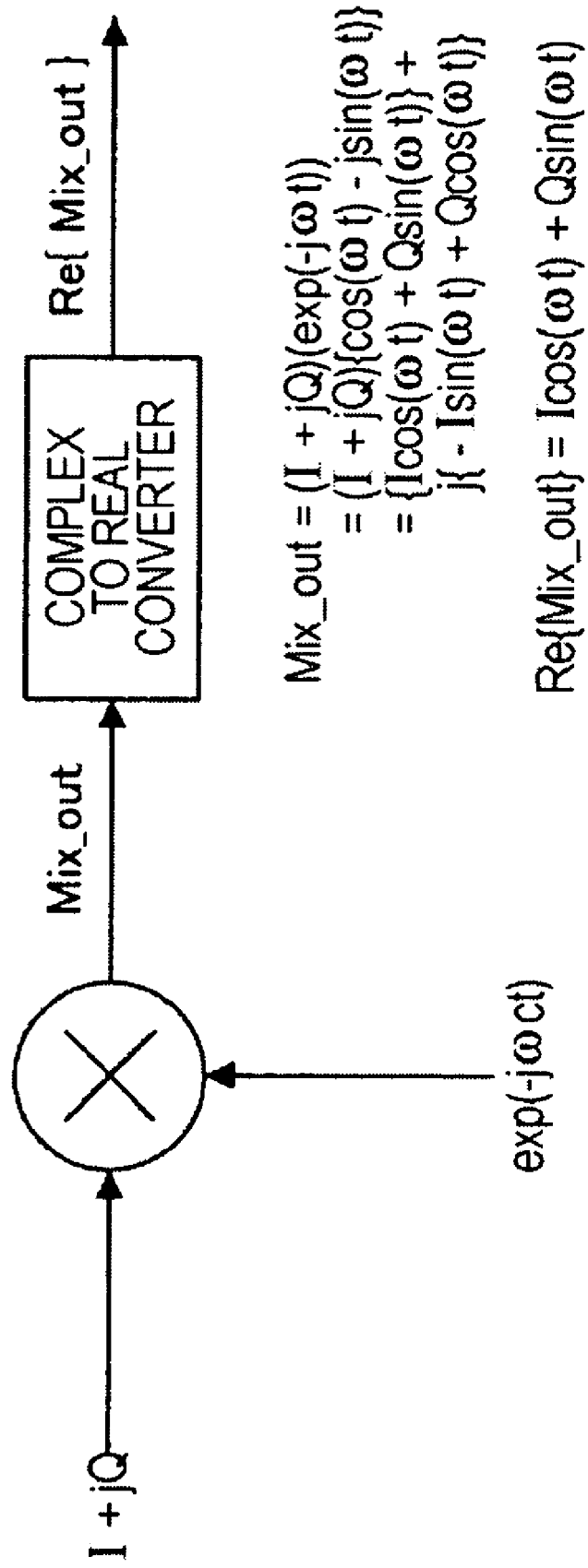
FIG. 28 is a diagram schematically showing an exemplary configuration in which the sign of a complex sine wave (exp (+jωct)) in FIG. 26 is inverted and a complex sine wave (exp(−jωct)) is input.
Figure 29:
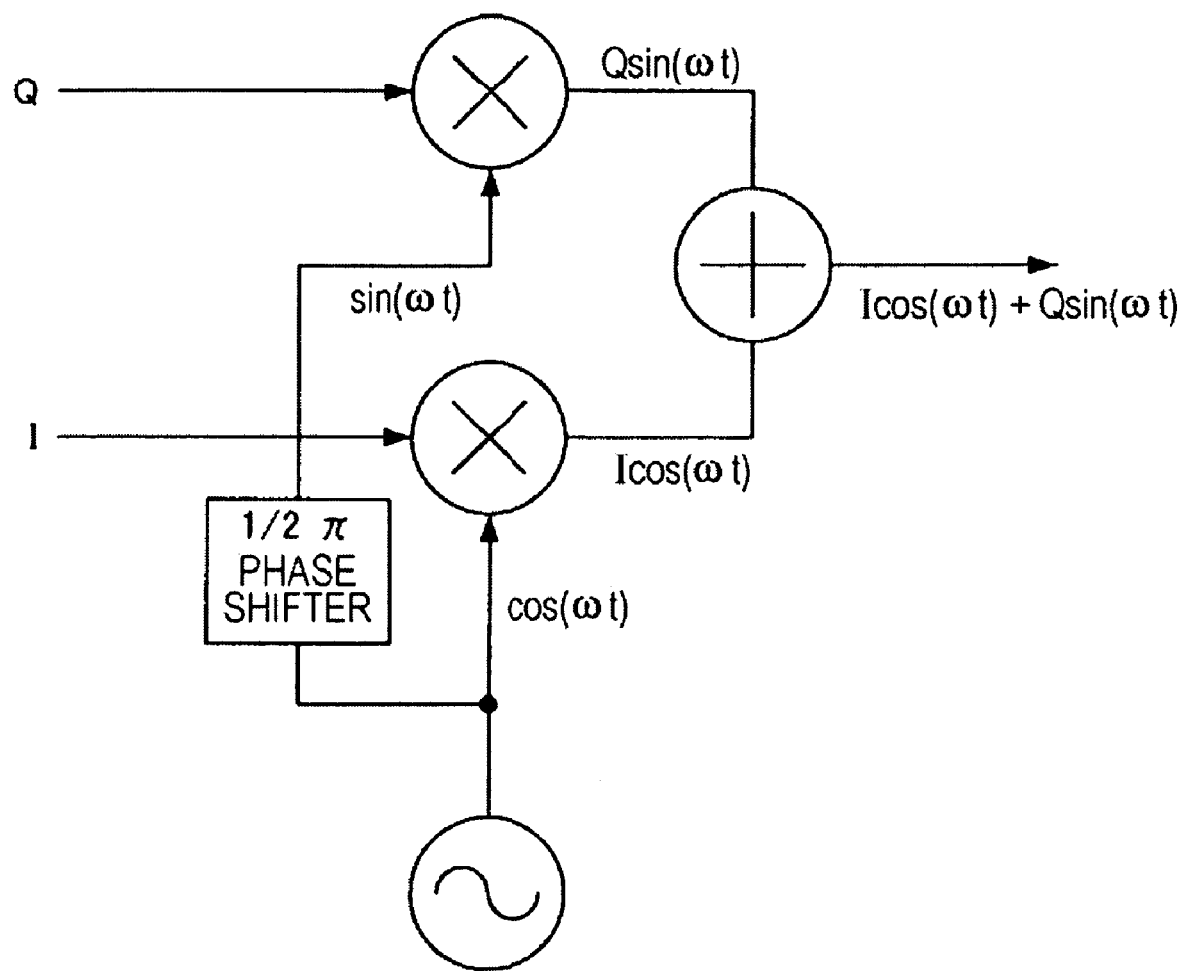
FIG. 29 is a block diagram schematically showing an exemplary configuration in which the operation in FIG. 28 is performed in the real domain.

FIG. 28 shows an exemplary configuration in which the complex sine wave (exp(−jωct)) resulting from the inversion of the sign of the input complex sine wave (exp(+jωct)) in FIG. 26 is input. FIG. 29 is a block diagram schematically showing an exemplary configuration in which the operation in FIG. 28 is performed in the real domain. The operation in FIG. 29 is equivalent to the operation in FIG. 28. One multiplier, which receives the Q signal component and the signal −sin(ωt) in FIG. 27, receives a signal +sin(ωt) resulting from the inversion of the sign of the signal −sin(ωt). In this case, a signal I cos(ωt)+Q sin(ωt) is output from the analog frequency converter unit 110 in FIG. 29. Accordingly, the same output can be gained as in the frequency conversion by using the complex sine wave (exp(−jωct)) shown in FIG. 28 only by inverting the sign of the signal −sin(ωt) input in the multiplier in the configuration in FIG. 27 to realize the inversion of the sign of the local frequency. As a result, the switching between the case in FIGS. 2A to 2H in which the upper local frequencies are adopted and the case in FIG. 25A to FIG. 25I in which the lower local frequencies are adopted can be performed. Specifically, the sign of the output from the ½π phase shifter in FIG. 27 is inverted.

Figure 30:
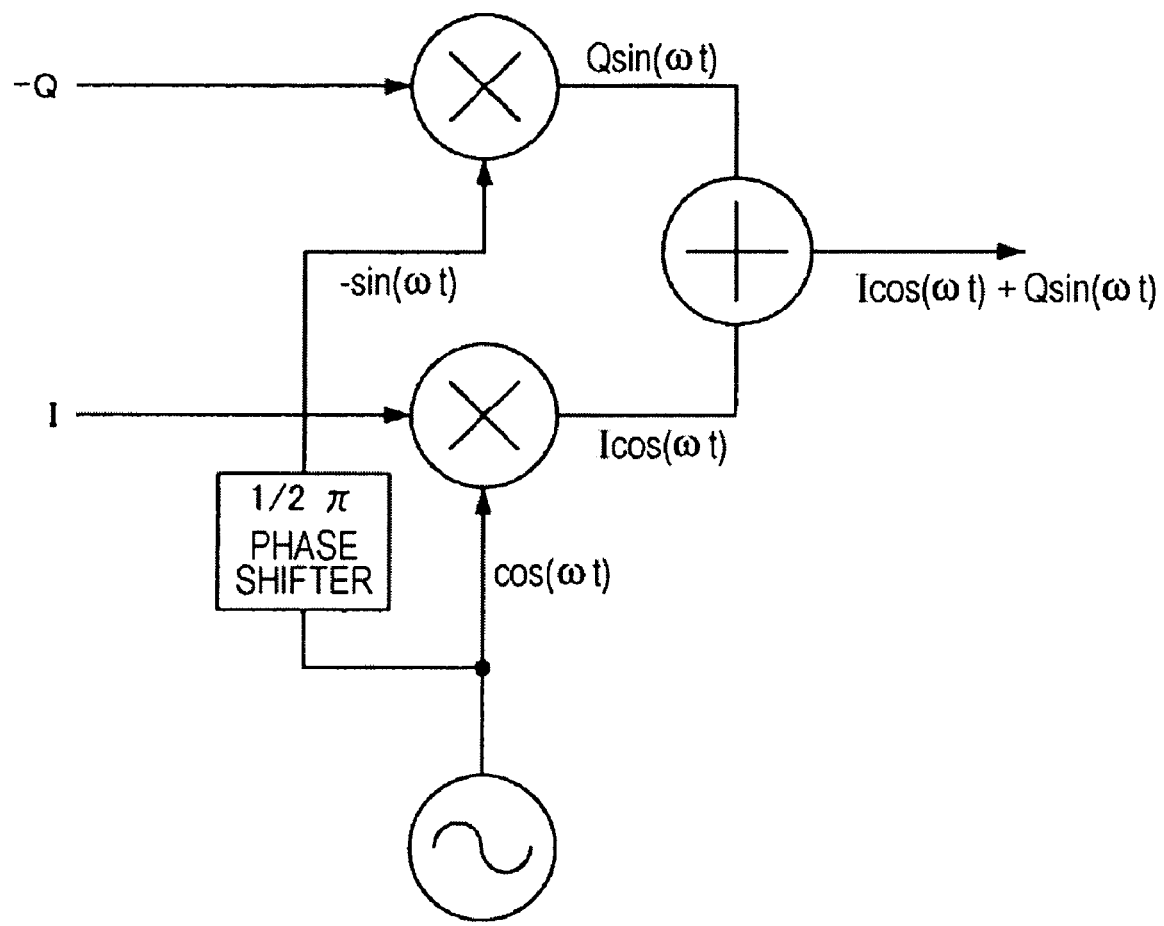
FIG. 30 is a block diagram schematically showing an exemplary configuration in which the sign of a Q signal component, which is input into one multiplier along with a signal −sin(ωt), is inverted.

In addition, as shown in a configuration in FIG. 30, in one multiplier receiving the Q signal component and the signal −sin(ωt) in FIG. 27, a similar function is realized by inverting the sign of the Q signal component to input a −Q signal component in the multiplier. As described above, it is sufficient to provide the switching device for inverting the input signal at least one input of the analog frequency converter unit 110 in order to invert the sign of the local frequency used in the analog frequency conversion.

Figure 31A:
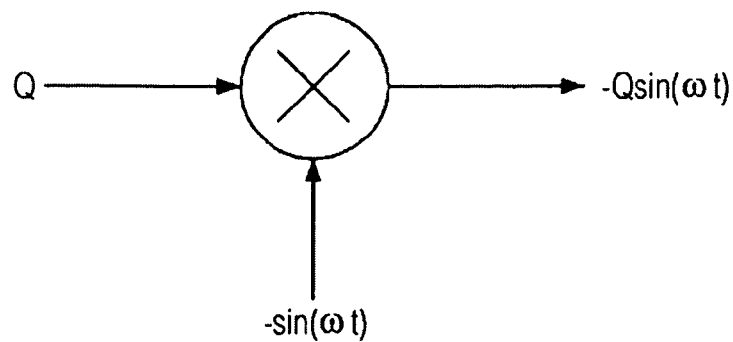
FIGS. 31A to 31C illustrate an example of the configuration of a switching device for inverting the signal input in the multiplier when differential signals are used.
Figure 31B:
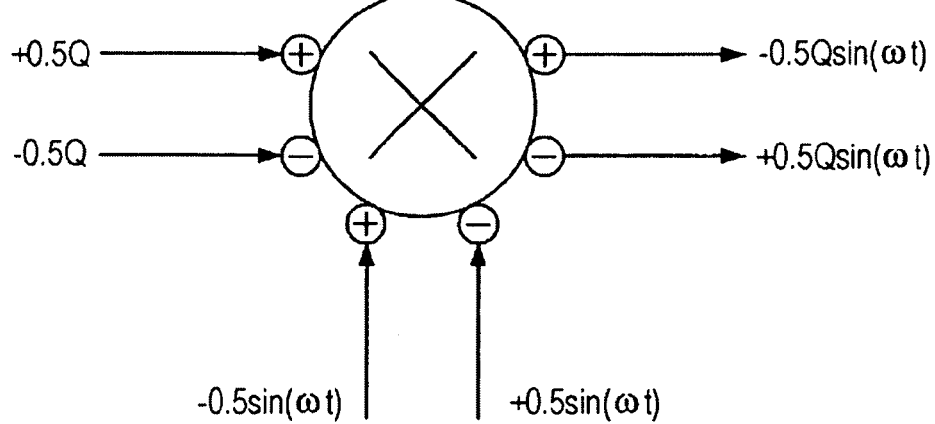
Figure 31C:
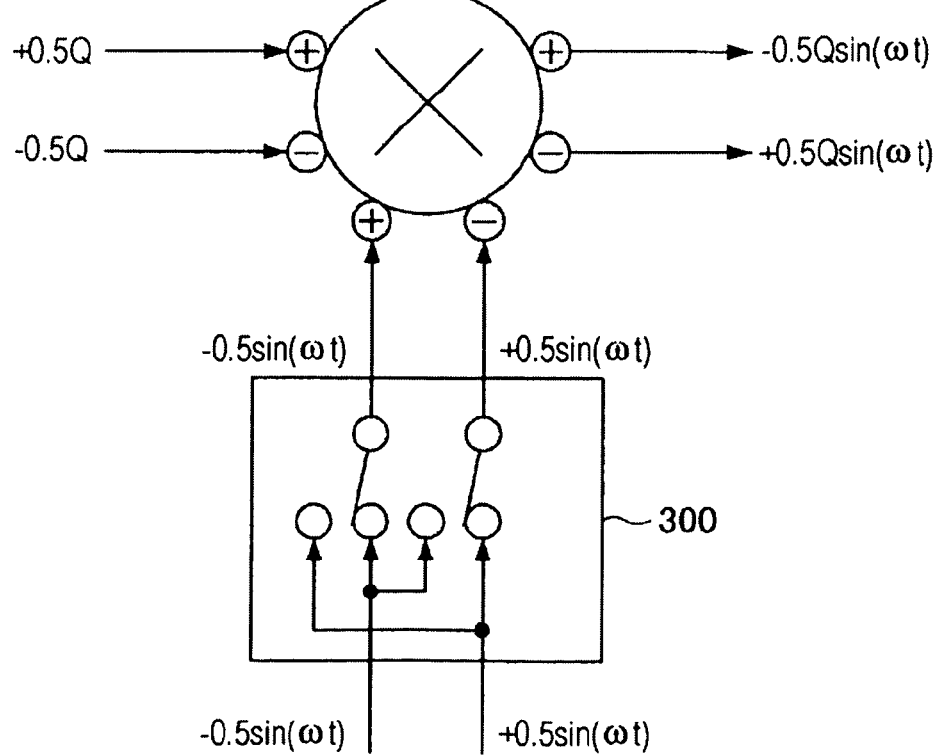
Figure 32A:
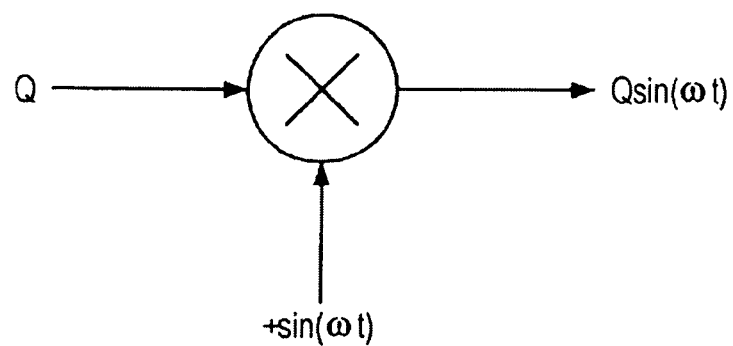
FIGS. 32A to 32C illustrate another example of the configuration of the switching device for inverting the signal input in the multiplier when the differential signals are used.
Figure 32B:
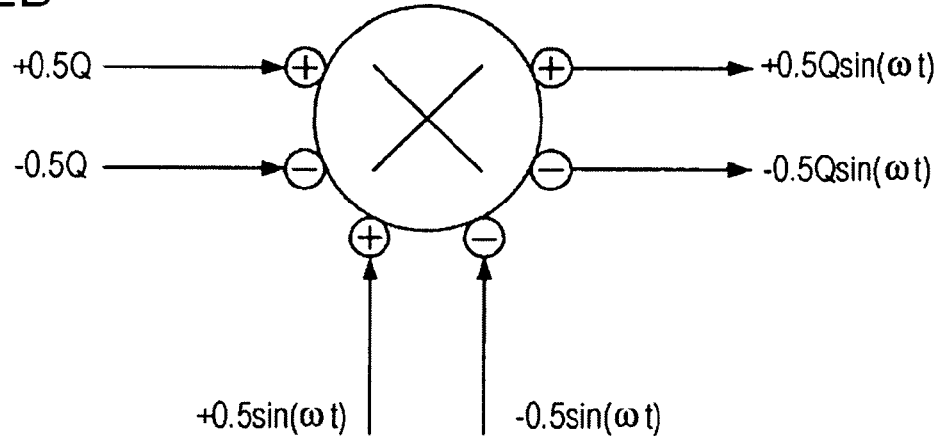
Figure 32C:
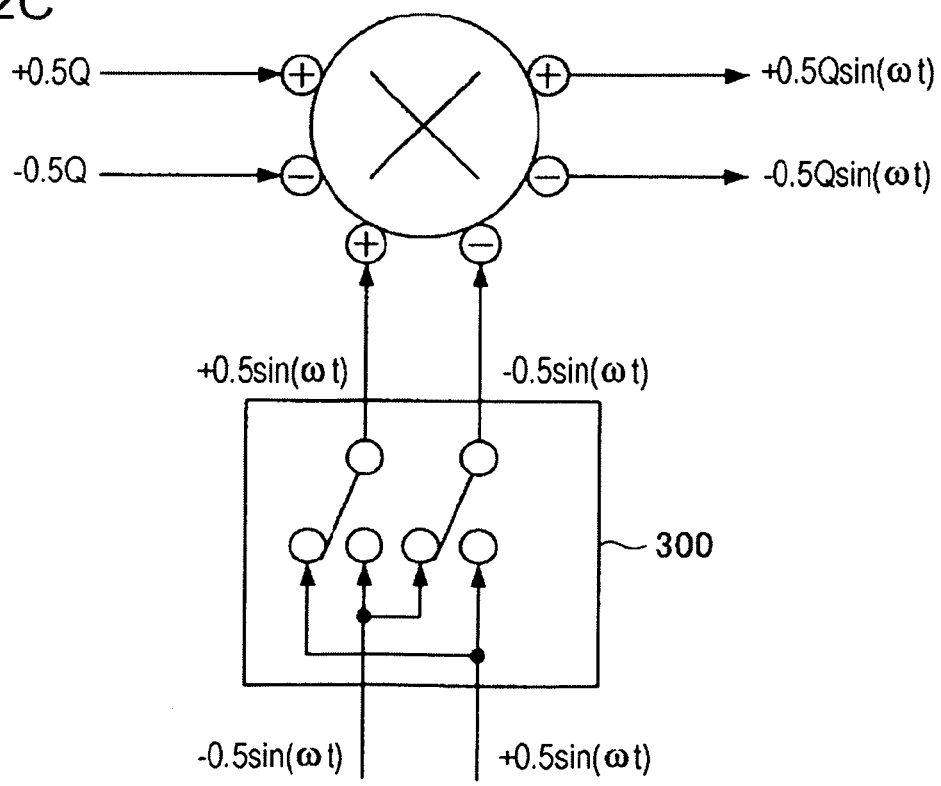
Figure 33A:
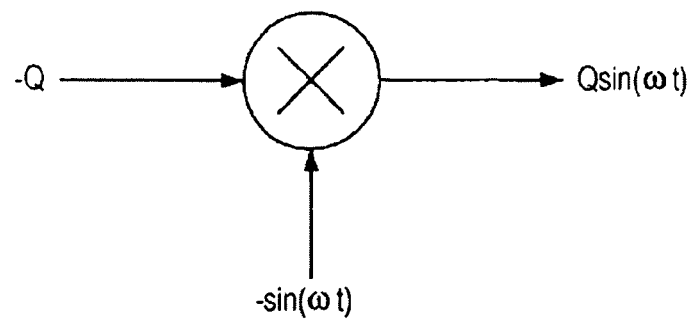
FIGS. 33A to 33C illustrate another example of the configuration of the switching device for inverting the signal input in the multiplier when the differential signals are used.
Figure 33B:
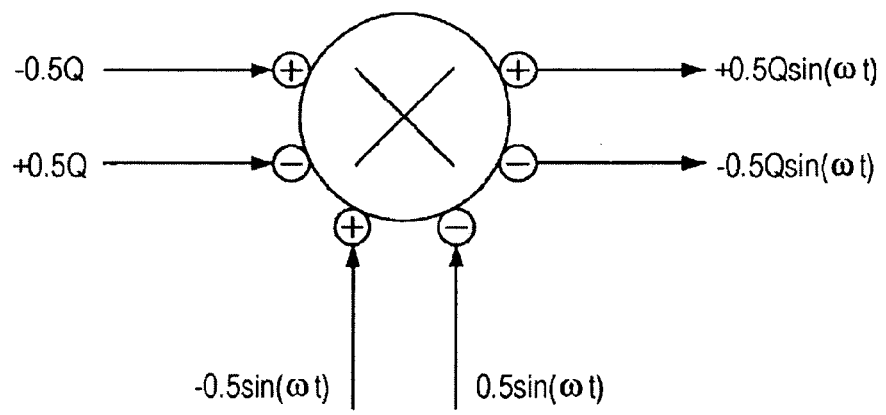
Figure 33C:
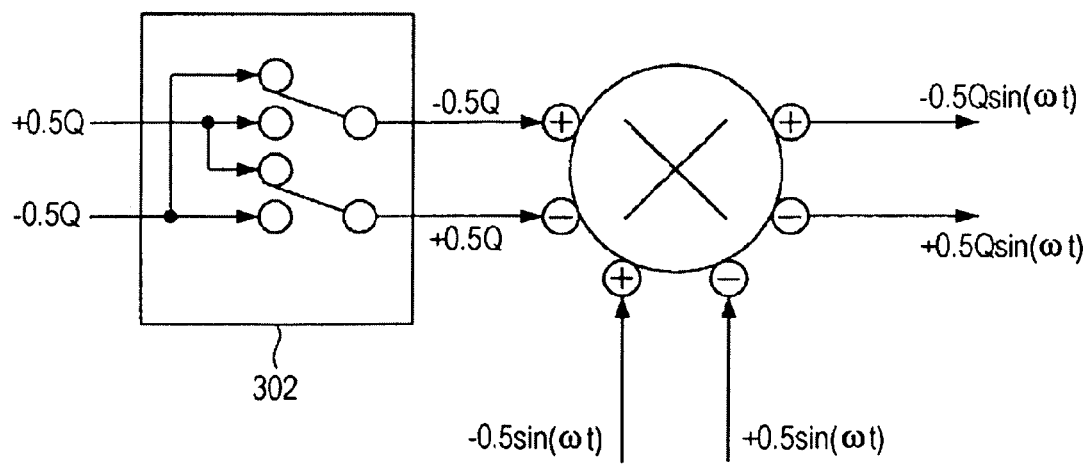

Exemplary configurations of the switching device for inverting the sign of the local frequency used in the analog frequency conversion when differential signals are used will now be described with reference to FIGS. 31A to 31C, FIGS. 32A to 32C, and FIGS. 33A to 33C. FIG. 31A shows the multiplier receiving the Q signal component and the signal −sin(ωt), shown in FIG. 27. FIG. 31B shows a case in which differential signals are input in the multiplier. FIG. 31C shows an exemplary configuration in which a switching device 300 for inverting the sign of the signal −sin(ωt) input in the multiplier is added to the configuration in FIG. 31B. FIGS. 32A to 32C correspond to FIGS. 31A to 31C, respectively. In the examples in FIGS. 32A to 32C, the sign of the signal −sin(ωt) input in the multiplier is inverted and a signal +sin(ωt) is input in the multiplier. FIGS. 33A to 33C correspond to FIGS. 31A to 31C, respectively. In the examples in FIGS. 33A to 33C, the sign of the Q signal component input in the multiplier is inverted and a −Q signal is input in the multiplier.

As shown in FIG. 31C, the switching device 300 is provided with two terminals through which differential signals +0.5 sin(ωt) and −0.5 sin(ωt) are input and two terminals through which the input signals are supplied to the multiplier.

When the switching device 300 shown in FIG. 31C is provided, the sign of the signal −sin(ωt) input in the multiplier can be inverted by switching the connection state of the terminals of the switching device 300 to the state shown in FIG. 32C and the inversion of the sign of the local frequency in the analog frequency converter unit 110 can be realized. In addition, the provision of a switching device 302 at the side where the Q signal component is input in the multiplier, as in the example in FIG. 33C, allows a similar function to be realized. The configuration in FIGS. 33A to 33C is effective when the frequency of the Q signal component is lower than the local frequency.

Specifically, various problems can generally occur when the switching device is provided at the position in FIG. 33C because the local frequency is around 8 GHz. However, since the baseband signal input in the analog frequency converter unit 110 has a maximum frequency of 528 MHz, the provision of the switching device 302 does not cause a big problem. For example, when the differential signals are input as the baseband signals, the differential signal lines can be switched to easily implement the configuration.

Figure 35F:
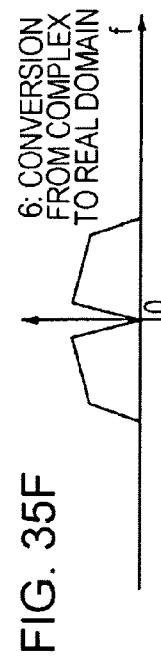
FIGS. 35A to 35K schematically show spectra of signals at different stages when the sign of a frequency used in multiplication by the analog frequency converter unit is inverted in the real IF reception system in FIG. 9 adopting the lower local frequencies.
Figure 35G:
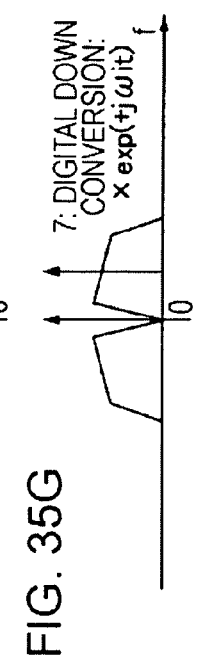
Figure 35H:
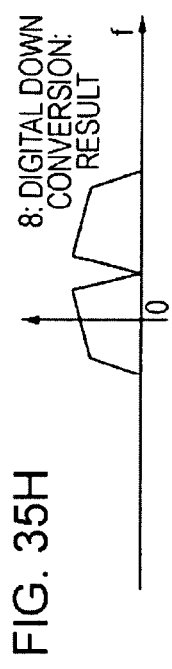
Figure 35I:
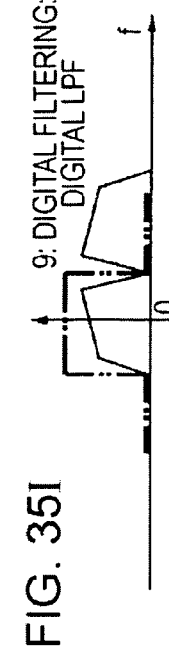
Figure 35J:
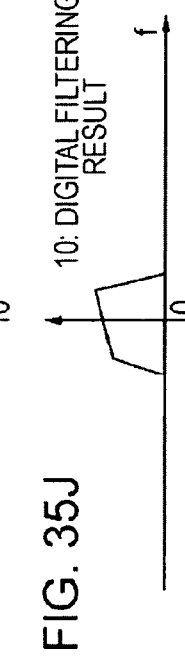
Figure 35K:
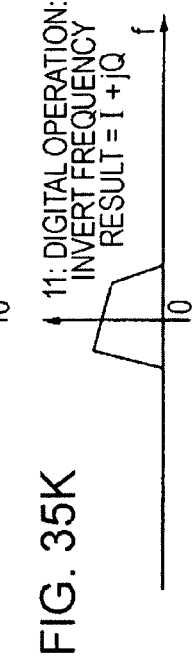
Figure 35A:
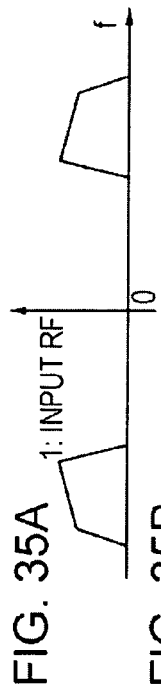
Figure 35B:
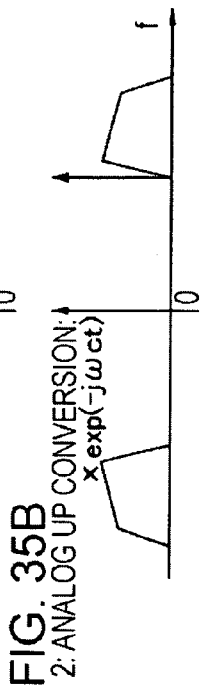
Figure 35C:
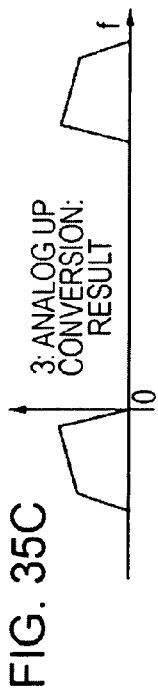
Figure 35D:
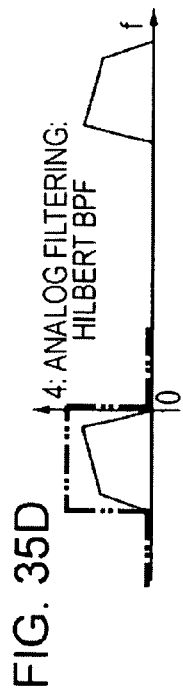
Figure 35E:
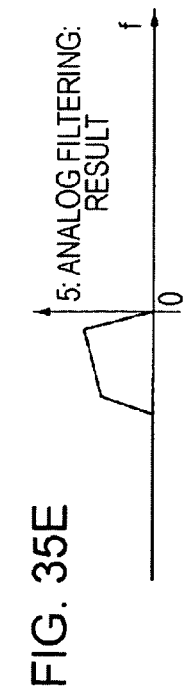

In the reception system, when the switching between the upper local frequencies and the lower local frequencies is performed, the sign of the local frequency used in the multiplication by the analog frequency converter unit 130 in the analog block can be inverted and the arrangement of the baseband signals can be reversed in the digital block without inverting the sign of the local frequency used in the multiplication by the digital frequency converter in the digital block to use the Hilbert BPF of the same characteristics both for the upper local frequencies and for the lower local frequencies. FIGS. 34A to 34H schematically show spectra of signals at different stages when the lower local frequencies are adopted in the reception system. The multiplication of the local frequency exp(+jωct) is performed by the analog frequency converter unit 130 in the stage in FIG. 34B for the frequency conversion. The sign of the local frequency (exp(+jωct)) is inverted from that of the local frequency exp(−jωct) in the stage in FIG. 6B. As a result, the Hilbert BPF 108 having the same characteristics as those in FIG. 5D can be used in the stage in FIG. 34D. In the stage in FIG. 34H, the arrangement of the frequencies is reversed in the digital block to extract the baseband signal (I+jQ). As apparent from comparison between FIG. 5F and FIG. 34F, the frequency exp(+jωit) used for the frequency conversion in the digital block when the upper local frequencies are adopted can be used also when the lower local frequencies are adopted and, therefore, it is not necessary to switch the sign of the local frequency. The above processing is applicable to the real IF system, instead of the complex IF system, as shown in FIGS. 35A to 35K. FIGS. 35A to 35K show examples in which the sign of the local frequency used in the multiplication by the analog frequency converter unit 154 is inverted when the lower local frequencies are adopted in the real IF reception system shown in FIGS. 9A to 9J. As apparent from comparison between FIGS. 35A to 35K and FIGS. 8A to 8J, the frequency exp(+jωit) used for the frequency conversion in the digital block when the upper local frequencies are adopted can be used also when the lower local frequencies are adopted and, therefore, it is not necessary to switch the sign of the local frequency. As shown in FIG. 35D and FIG. 8D, it is not necessary to switch the sign in the filtering by the Hilbert BPF 152.

Figure 36A:
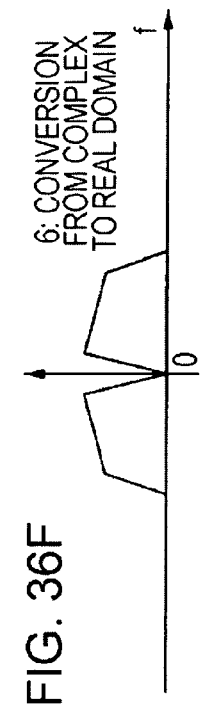
FIGS. 36A to 36J schematically show spectra of signals at different stages when the frequency conversion is performed by the analog frequency converter unit to use the Hilbert BPF having the same characteristics as in the upper local frequencies in the processing in FIGS. 9A to 9J.
Figure 36B:
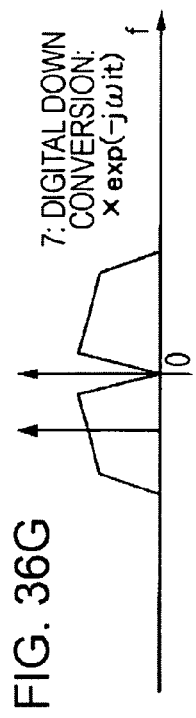
Figure 36C:
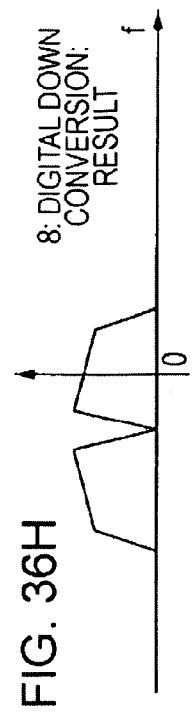
Figure 36D:
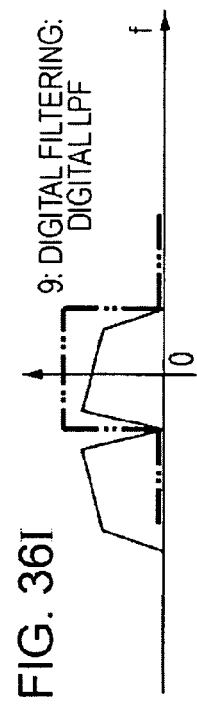
Figure 36E:
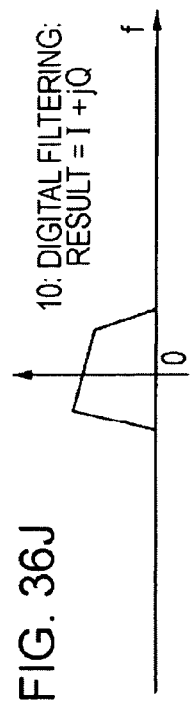
Figure 36F:
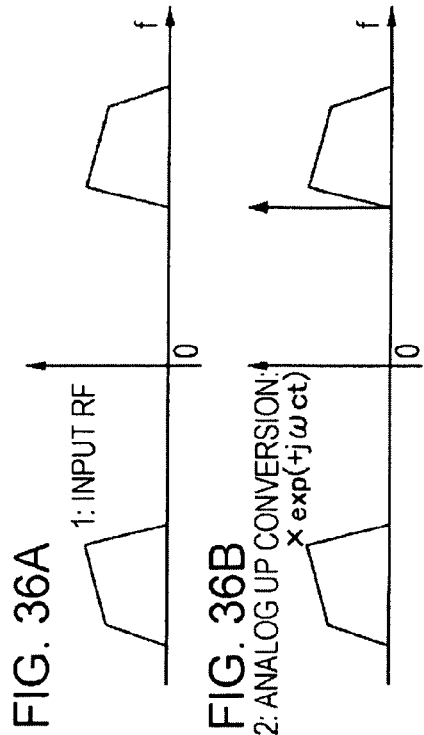
Figure 36G:
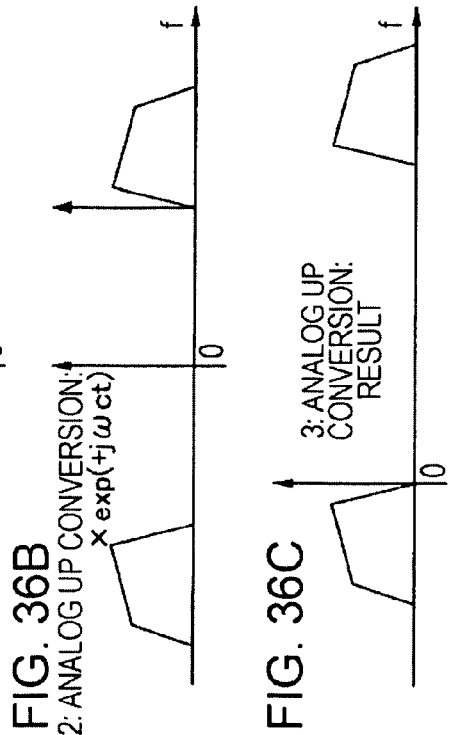
Figure 36H:
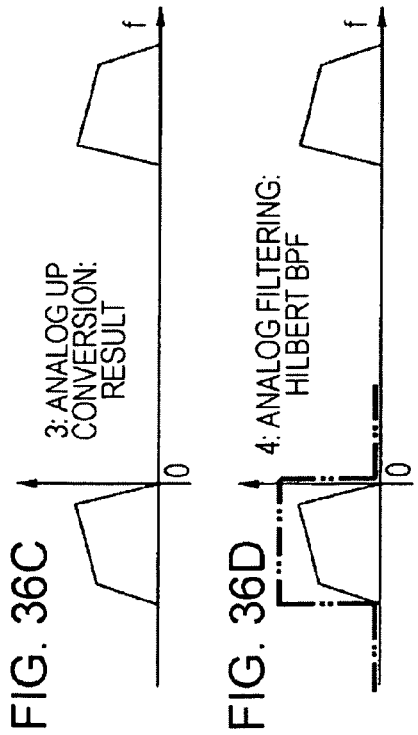
Figure 36I:
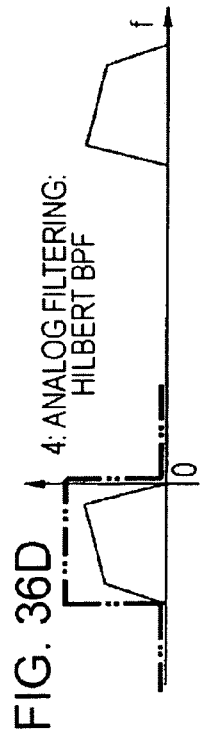
Figure 36J:
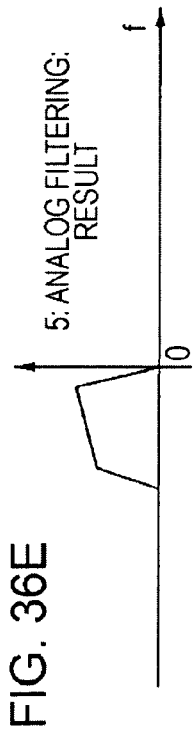

A more effective method according an embodiment of the present invention when the real IF system is used, instead of the complex IF system, will now be described. In the case of the real IF reception system, in order to switch the upper local frequencies to the lower local frequencies, the sign of the local frequency used in the multiplication by a down converter in the analog block can be inverted and the sign of the local frequency used in the multiplication by a down converter in the digital block can be switched to use the Hilbert BPF 108 having the same characteristics both for the upper local frequencies and for the lower local frequencies. This method is more effective than the methods described above because it is not necessary to reverse the arrangement of the frequencies in the digital block. FIGS. 36A to 36J schematically show spectra of signals at different stages when the lower local frequencies are adopted in the real IF reception system. The multiplication of the local frequency exp(+jωct) is performed by the analog frequency converter unit 154 in the stage in FIG. 36B for the frequency conversion. The sign of the local frequency (exp(+jωct)) in FIG. 36B is inverted from that of the local frequency exp(−jωct) in the stage in FIG. 9B. As a result, the Hilbert BPF 152 having the same characteristics as in the upper local frequencies in FIG. 8D can be used in the stage in FIG. 36D. As described above, the filter in the digital block expected to provide a higher accuracy can be effectively used to perform the switching between the upper local frequencies and the lower local frequencies without reversing the arrangement of the frequencies.

FIGS. 37 to 40 show exemplary configurations and processing of the analog frequency converter unit 130 in the reception system. The analog frequency converter unit 130 multiplies a real signal (I cos(ωt)+Q sin(ωt)) that is input by the complex sine wave (exp(−jωt) or exp(+jωt)) to output a signal in the complex domain.

Figure 37:
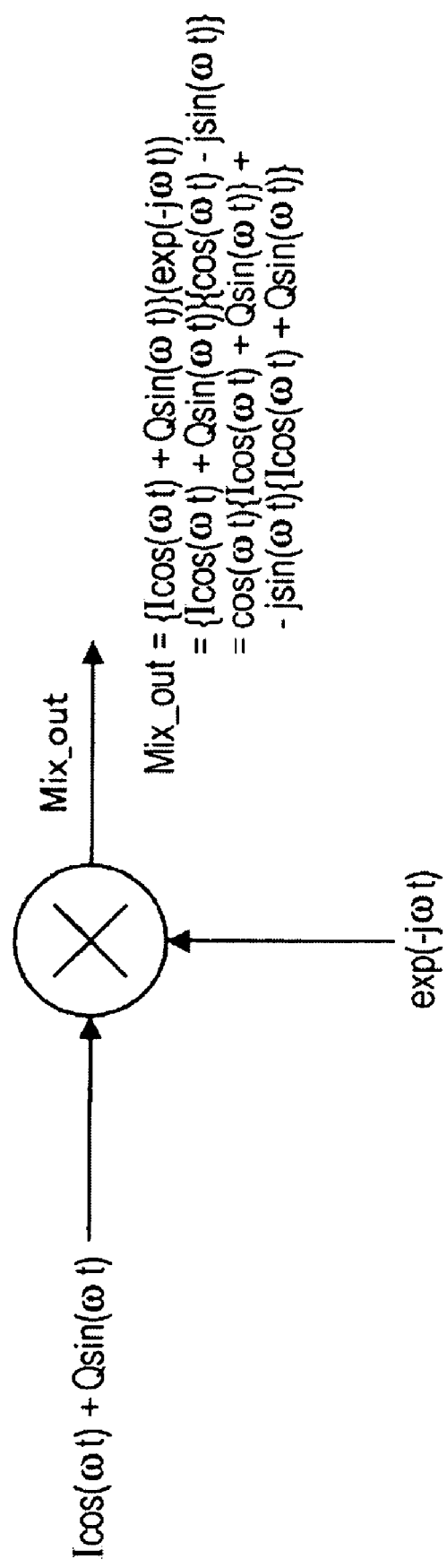
FIG. 37 is a diagram schematically showing an exemplary configuration and processing of an analog frequency converter unit in the reception system.
Figure 38:
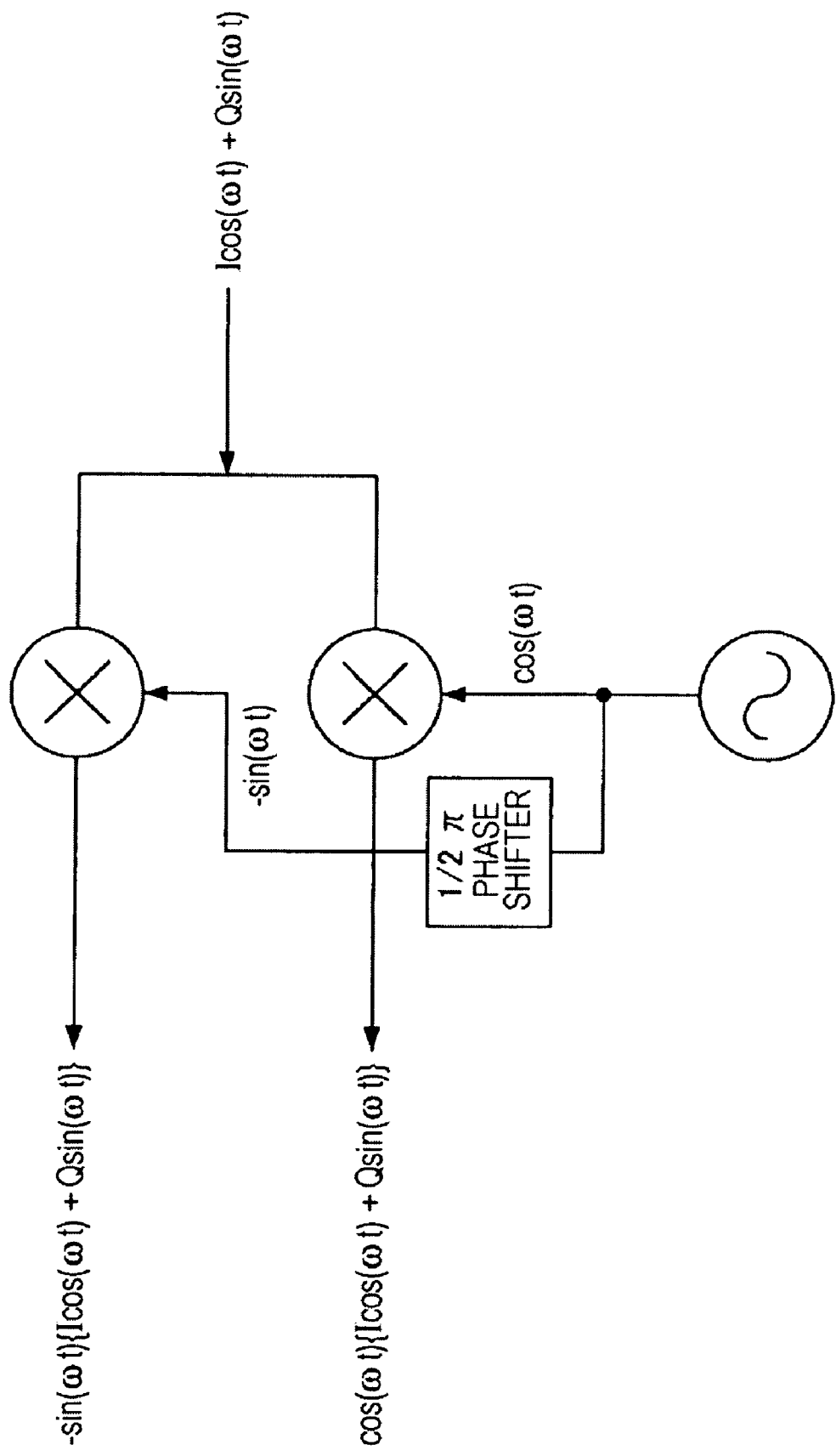
FIG. 38 is a block diagram schematically showing the exemplary configuration and processing of the analog frequency converter unit in the reception system.
Figure 39:
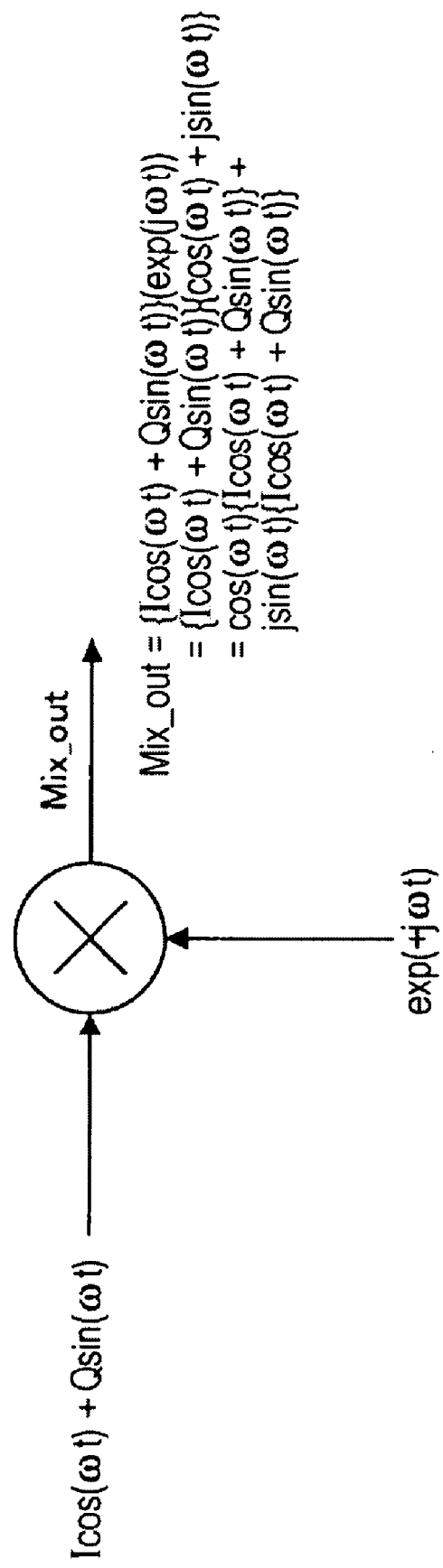
FIG. 39 is a diagram schematically showing another exemplary configuration and processing of the analog frequency converter unit in the reception system.
Figure 40:
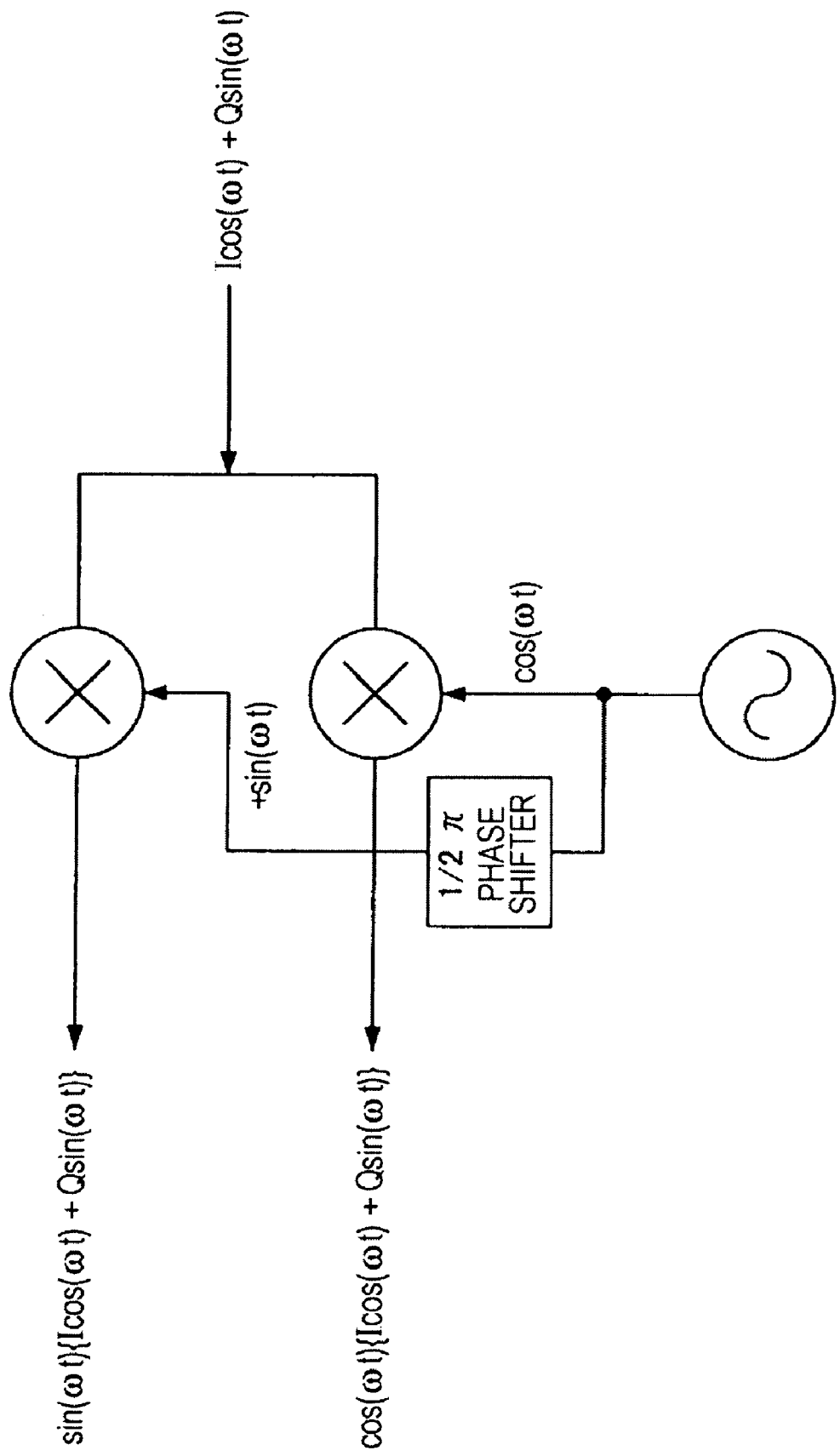
FIG. 40 is a block diagram schematically showing the other exemplary configuration and processing of the analog frequency converter unit in the reception system.

FIGS. 37 and 38 show examples in which the input real signal (I cos(ωt)+Q sin(ωt)) is multiplied by the complex sine wave (exp(−jωt)). FIGS. 39 and 40 show examples in which the input real signal (I cos(ωt)+Q sin(ωt)) is multiplied by the complex sine wave (exp(+jωt)). FIGS. 37 and 39 show complex number operations. FIG. 38 is a block diagram schematically showing an exemplary configuration in which the operation in FIG. 37 is performed in the real domain and FIG. 40 is a block diagram schematically showing an exemplary configuration in which the operation in FIG. 39 is performed in the real domain. The configuration in FIG. 37 corresponds to the configuration of the analog frequency converter unit 130 in FIG. 4.

As apparent from comparison between FIG. 38 and FIG. 40, as in the processing in the transmission system described above with reference to FIGS. 26 to 29, it is sufficient to provide the switching device for inverting the input signal at least one input of the analog frequency converter unit in order to invert the sign of the local frequency used in the analog frequency conversion. A signal +sin(ωt) resulting from the inversion of the signal −sin(ωt) input in the multiplier in FIG. 38 can be input in the multiplier to gain an output similar to the one in FIG. 39 in which the input real signal (I cos(ωt)+Q sin(ωt)) is multiplied by the complex sine wave exp(+jωt) for the frequency conversion.

In addition, in the reception system, as apparent from comparison between FIG. 38 and FIG. 40, a similar function can be realized by inverting the sign of one output (sin(ωt){I cos(ωt)+Q sin(ωt))}. Since the frequency of the output from the frequency converter is lower than that of the input in the frequency converter in the reception system, it is easy to invert the sign of the output and the method is effective.

It should be understood by those skilled in the art that various modifications, combinations, sub-combinations and alterations may occur depending on design requirements and other factors insofar as they are within the scope of the appended claims or the equivalents thereof.

What is claimed is:

1. A radio transmission apparatus that uses a plurality of band groups and that transmits a signal subjected to frequency hopping between a plurality of bands in each band group at a local frequency apart from the center frequency of each band, the radio transmission apparatus comprising:
   a local frequency generating unit that generates a local frequency lower than the center frequency of each band in a first band group in a transmission with the first band group,
   wherein the local frequency generating unit generates a local frequency higher than the center frequency of each band in a second band group in a transmission with the second band group, the local frequency to be generated being the same as the local frequency generated in the transmission with the first band group,
   wherein the center frequency of one band in the first band group is the same as the center frequency of one band in a third band group whose bandwidth is adjacent to the one band of the first band group;
   wherein the local frequency generating unit includes a frequency synthesizer that receives a first frequency at a first input and receives a second frequency corresponding to the distance between two adjacent bands or a third frequency corresponding to the distance between the bands at both ends among three adjacent bands at a second input, the first frequency corresponding to the frequency that is the same as the local frequency generated in the transmission with the first band group and being the local frequency apart from the center frequency of each band; and
   wherein the local frequency generating unit includes a first frequency generator generating the second frequency by digital waveform synthesis and a second frequency generator generating the third frequency by the digital waveform synthesis.

2. The radio transmission apparatus according to claim 1, wherein the frequency synthesizer receives the first frequency at the first input as a fixed value.

3. The radio transmission apparatus according to claim 1, wherein the first frequency is 7,920 MHz, the second frequency is 528 MHz, and the third frequency is 1,056 MHz.

4. The radio transmission apparatus according to claim 1, wherein the first frequency generator is a first digital sine generator generating the second frequency by five-component synthesis and the second frequency generator is a second digital sine generator generating the third frequency by three-component synthesis.

5. The radio transmission apparatus according to claim 1, wherein the first digital sine generator includes a phase controller controlling the phase of the second frequency and an amplitude controller controlling the amplitude of the second frequency, and the second digital sine generator includes a phase controller controlling the phase of the third frequency and an amplitude controller controlling the amplitude of the third frequency.

6. A radio transmission apparatus that uses a plurality of band groups and that transmits a signal subjected to frequency hopping between a plurality of bands in each band group at a local frequency apart from the center frequency of each band, the radio transmission apparatus comprising:

a local frequency generating unit that generates a local frequency lower than the center frequency of each band in a first band group in a transmission with the first band group, wherein the local frequency generating unit generates a local frequency higher than the center frequency of each band in a second band group in a transmission with the second band group, the local frequency to be generated being the same as the local frequency generated in the transmission with the first band group;

a baseband signal generator generating a baseband signal, which is a digital signal;

a digital frequency converter performing digital frequency conversion to the baseband signal;

a digital-to-analog converter converting an output from the digital frequency converter into an analog signal;

a filter filtering an output from the digital-to-analog converter; and an analog frequency converter performing analog frequency conversion to an output from the filter at the local frequency generated by the local frequency generating unit, wherein, in the transmission with the first band group, the digital frequency conversion is performed after the arrangement of the baseband signals is reversed, and wherein the local frequency of the same sign is used for the digital frequency conversion both in the transmission with the first band group and in the transmission with the second band group and the sign of the local frequency for the analog frequency conversion in the transmission with the first band group is inverted in the transmission with the second band group to use the filter of the same characteristics both in the transmission with the first band group and in the transmission with the second band group.

7. The radio transmission apparatus according to claim 6, wherein a switching part for inverting an input signal is provided at least one input of the analog frequency converter in order to invert the sign of the local frequency for the analog frequency conversion.

8. A radio reception apparatus that receives a signal subjected to frequency hopping between a plurality of bands in each band group at a local frequency apart from the center frequency of each band, the radio reception apparatus comprising:

a local frequency generating unit that generates a local frequency lower than the center frequency of each band in a first band group in the reception with the first band group, wherein the local frequency generating unit generates a local frequency higher than the center frequency of each band in a second band group in the reception with the second band group, the local frequency to be generated being the same as the local frequency generated in the reception with the first band group, wherein the center frequency of one band in the first band group is the same as the center frequency of one band in a third band group whose bandwidth is adjacent to that of the first band group;

wherein the local frequency generating unit includes a frequency synthesizer that receives a first frequency at a first input and receives a second frequency corresponding to the distance between two adjacent bands or a third frequency corresponding to the distance between the bands at both ends among three adjacent bands at a second input, the first frequency corresponding to the frequency that is the same as the local frequency generated in the reception with the first band group and being the local frequency apart from the center frequency of each band; and wherein the local frequency generating unit includes a first frequency generator generating the second frequency by digital waveform synthesis and a second frequency generator generating the third frequency by the digital waveform synthesis.

9. The radio reception apparatus according to claim 8, wherein the frequency synthesizer receives the first frequency at the first input as a fixed value.

10. The radio reception apparatus according to claim 8, wherein the first frequency is 7,920 MHz, the second frequency is 528 MHz, and the third frequency is 1,056 MHz.

11. The radio reception apparatus according to claim 8, wherein the first frequency generator is a first digital sine generator generating the second frequency by five-component synthesis and the second frequency generator is a second digital sine generator generating the third frequency by three-component synthesis.

12. The radio reception apparatus according to claim 8, wherein the first digital sine generator includes a phase controller controlling the phase of the second frequency and an amplitude controller controlling the amplitude of the second frequency, and the second digital sine generator includes a phase controller controlling the phase of the third frequency and an amplitude controller controlling the amplitude of the third frequency.

13. A radio reception apparatus that receives a signal subjected to frequency hopping between a plurality of bands in each band group at a local frequency apart from the center frequency of each band, the radio reception apparatus comprising:

a local frequency generating unit that generates a local frequency lower than the center frequency of each band in a first band group in the reception with the first band group, wherein the local frequency generating unit generates a local frequency higher than the center frequency of each band in a second band group in the reception with the second band group, the local frequency to be generated being the same as the local frequency generated in the reception with the first band group an analog frequency converter performing analog frequency conversion to an input radio-frequency signal at the local frequency generated by the local frequency generating unit;

a filter filtering an output from the analog frequency converter;

an analog-to-digital converter converting an output from the filter into a digital signal; and a digital frequency converter performing digital frequency conversion to an output from the analog-to-digital converter, wherein the local frequency inverted by the analog frequency converter is used in the reception with the first band group, and wherein the local frequency of the same sign is used for the digital frequency conversion both in the reception with the first band group and in the reception with the second band group and the arrangement of the signals output from the digital frequency converter is reversed to use the filter of the same characteristics both in the reception with the first band group and in the reception with the second band group.

14. A radio reception apparatus that receives a signal subjected to frequency hopping between a plurality of bands in each band group at a local frequency apart from the center frequency of each band, the radio reception apparatus comprising:
- a local frequency generating unit that generates a local frequency lower than the center frequency of each band in a first band group in the reception with the first band group,
- wherein the local frequency generating unit generates a local frequency higher than the center frequency of each band in a second band group in the reception with the second band group, the local frequency to be generated being the same as the local frequency generated in the reception with the first band group;
- an analog frequency converter performing analog frequency conversion to an input radio-frequency signal at the local frequency generated by the local frequency generating unit;
- a filter filtering an output from the analog frequency converter;
- an analog-to-digital converter converting an output from the filter into a digital signal; and
- a digital frequency converter performing digital frequency conversion to an output from the analog-to-digital converter,
- wherein the local frequency inverted by the analog frequency converter is used in the reception with the first band group, and
- wherein the sign of the local frequency for the digital frequency conversion in the reception with the first band group is inverted in the reception with the second band group and the filtering is performed to an output from the digital frequency converter to use the filter of the same characteristics both in the reception with the first band group and in the reception with the second band group.

15. The radio reception apparatus according to claim 13 or 14,
- wherein a switching part for inverting an input signal is provided at least one input of the analog frequency converter in order to invert the sign of the local frequency in the analog frequency converter.

16. The radio reception apparatus according to claim 13 or 14,
- wherein a switching part for inverting an output signal is provided at one output of the analog frequency converter in order to invert the sign of the local frequency in the analog frequency converter.

17. A radio communication method that uses a plurality of band groups and that transmits and receives a signal subjected to frequency hopping between a plurality of bands in each band group at a local frequency apart from the center frequency of each band, the radio communication method comprising the steps of:
- generating a local frequency lower than the center frequency of each band in a first band group in a communication with the first band group;
- generating a local frequency higher than the center frequency of each band in a second band group in a communication with the second band group, the local frequency to be generated being the same as the local frequency generated in the communication with the first band group, wherein the center frequency of one band in the first band group is the same as the center frequency of one band in a third band group whose bandwidth is adjacent to that of the first band group;
- receiving a first frequency at a first input; and
- receiving a second frequency corresponding to the distance between two adjacent bands or a third frequency corresponding to the distance between the bands at both ends among three adjacent bands at a second input, the first frequency corresponding to the frequency that is the same as the local frequency generated in the reception with the first band group and being the local frequency apart from the center frequency of each band;
- wherein a first frequency generator generates the second frequency by digital waveform synthesis and a second frequency generator generates the third frequency by the digital waveform synthesis.

* * * * *